(12) United States Patent
Sugita et al.

(10) Patent No.: US 11,706,523 B2
(45) Date of Patent: *Jul. 18, 2023

(54) IMAGING APPARATUS, ACCESSORY APPARATUS, AND COMMUNICATION CONTROL METHOD

(71) Applicant: CANON KABUSHIKI KAISHA, Tokyo (JP)

(72) Inventors: Atsushi Sugita, Yokohama (JP); Kazumichi Sugiyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/528,728

(22) Filed: Nov. 17, 2021

(65) Prior Publication Data
US 2022/0078331 A1 Mar. 10, 2022

Related U.S. Application Data

(63) Continuation of application No. 16/454,535, filed on Jun. 27, 2019, now Pat. No. 11,303,796.

(30) Foreign Application Priority Data

Jun. 28, 2018 (JP) .................. 2018-123758
Jul. 31, 2018 (JP) .................. 2018-143940
(Continued)

(51) Int. Cl.
*H04N 23/66* (2023.01)
*G03B 17/14* (2021.01)
*H04N 23/55* (2023.01)

(52) U.S. Cl.
CPC ............. *H04N 23/66* (2023.01); *G03B 17/14* (2013.01); *H04N 23/55* (2023.01)

(58) Field of Classification Search
CPC ............. H04N 5/2254; H04N 5/23203; H04N 5/23206; H04N 5/23209; H04N 23/55;
(Continued)

(56) References Cited

U.S. PATENT DOCUMENTS 6,993,605 B2 * 1/2006 Fabre .................... G06F 13/124
710/33
2001/0016884 A1 8/2001 Sato
(Continued)

FOREIGN PATENT DOCUMENTS

CN 101984586 A 3/2011
CN 106105310 A 11/2016
(Continued)

OTHER PUBLICATIONS

The above U.S. Patent Application Publication #1 and Foreign Patent Documents #2-4 were cited in a Mar. 15, 2021 Chinese Office Action, which is enclosed with an English Translation, that issued in Chinese Patent Application No. 201910561404.0.
(Continued)

*Primary Examiner* — Lin Ye
*Assistant Examiner* — Chriss S Yoder, III
(74) *Attorney, Agent, or Firm* — Cowan, Liebowitz & Latman, P.C.

(57) ABSTRACT

An imaging apparatus to which an accessory apparatus is attachable includes a camera controller configured to communicate with the accessory apparatus. The camera controller receives first information on a data size receivable by the accessory apparatus, performs a setting for a data size to be transmitted to the accessory apparatus based on the first information, and communicate with the accessory apparatus based on the setting.

39 Claims, 36 Drawing Sheets

(30) Foreign Application Priority Data

Sep. 4, 2018 (JP) ................................. 2018-165141
Jun. 14, 2019 (JP) ................................. 2019-110936
Jun. 14, 2019 (JP) ................................. 2019-111474

(58) Field of Classification Search
CPC ...... H04N 23/65; H04N 23/66; H04N 23/661; H04N 23/663; H04N 23/667; H04N 23/81; G03B 17/14; G03B 2206/00; G03B 2205/0007; G03B 2205/0046
See application file for complete search history.

(56) References Cited

U.S. PATENT DOCUMENTS

| | | | | |
|---|---|---|---|---|
| 2008/0278586 | A1* | 11/2008 | Kazami | H04N 1/00129 358/1.15 |
| 2012/0033955 | A1* | 2/2012 | Okada | G02B 7/14 396/71 |
| 2015/0181092 | A1* | 6/2015 | Tamura | H04N 5/23209 348/360 |
| 2015/0194131 | A1 | 7/2015 | Kim et al. | |
| 2018/0224721 | A1* | 8/2018 | Pan | G03B 17/565 |

FOREIGN PATENT DOCUMENTS

| | | |
|---|---|---|
| CN | 107786809 A | 3/2018 |
| CN | 108139654 A | 6/2018 |
| JP | 2008-233192 A | 10/2008 |
| JP | 2013-025172 A | 2/2013 |
| JP | 5208169 B2 | 6/2013 |
| JP | 2017-181980 A | 10/2017 |
| WO | 2009/147785 A | 12/2009 |

OTHER PUBLICATIONS

The above document was cited in a Sep. 5, 2022 Chinese Office Action, which is enclosed with an English Translation, that issued in Chinese Patent Application No. 201910561404.0.

The above foreign patent documents were cited in the Feb. 21, 2023 Japanese Office Action, a copy of which is enclosed without an English Translation, that issued in Japanese Patent Application No. 2019-110936.

\* cited by examiner

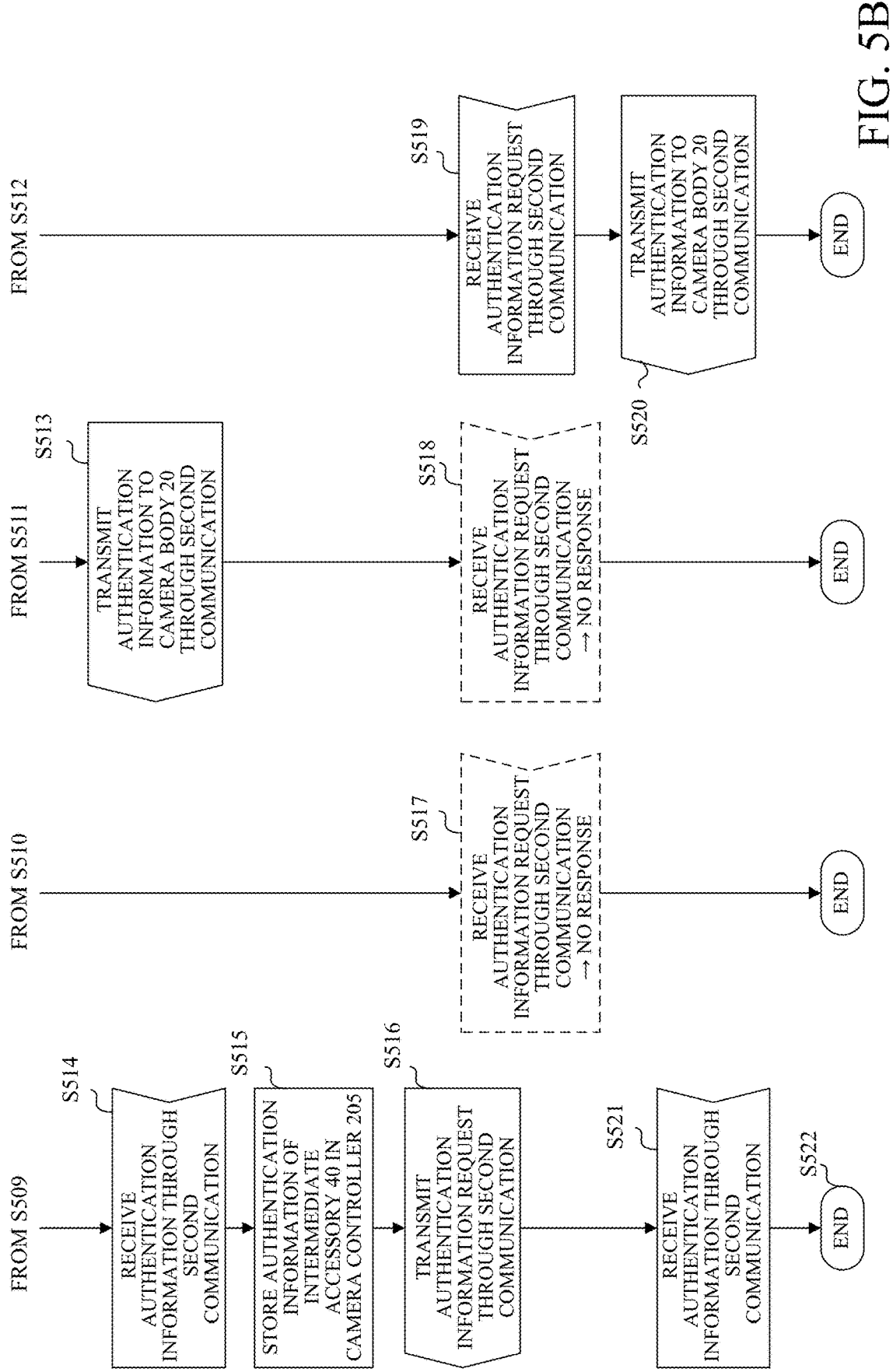

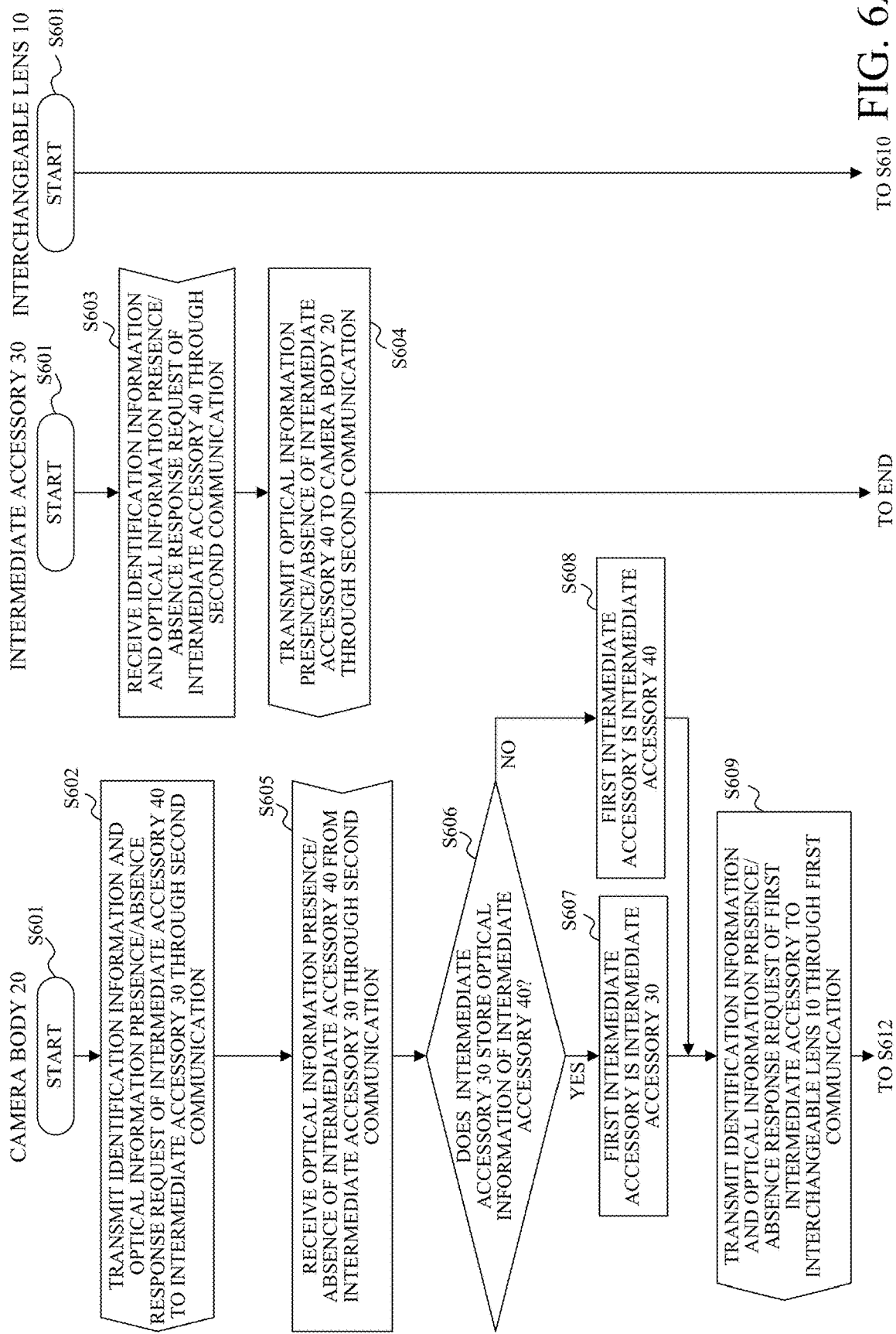

| CAMERA→LENS (FIRST COMMUNICATION) | |
|---|---|
| AUTHENTICATION INFORMATION REQUEST | IDENTIFICATION INFORMATION REQUEST |
| | OPERATION STATE INFORMATION REQUEST |

FIG. 9A

| LENS→CAMERA (FIRST COMMUNICATION) | |
|---|---|
| AUTHENTICATION INFORMATION | IDENTIFICATION INFORMATION |
| | OPERATION STATE INFORMATION |

FIG. 9B

| CAMERA→ACCESSORY (SECOND COMMUNICATION) | |
|---|---|
| AUTHENTICATION INFORMATION REQUEST | IDENTIFICATION INFORMATION REQUEST |
| | OPERATION STATE INFORMATION REQUEST |
| | CORRECTION PROCESSING NECESSITY INFORMATION REQUEST |
| | TERMINAL INFORMATION REQUEST |

FIG. 9C

| ACCESSORY (INTERMEDIATE ACCESSORY)→CAMERA (SECOND COMMUNICATION) | |
|---|---|
| AUTHENTICATION INFORMATION | IDENTIFICATION INFORMATION |
| | OPERATION STATE INFORMATION |
| | CORRECTION PROCESSING NECESSITY INFORMATION |
| | TERMINAL INFORMATION |

FIG. 9D

| ACCESSORY (INTERCHANGEABLE LENS)→CAMERA (SECOND COMMUNICATION) | |
|---|---|
| AUTHENTICATION INFORMATION | SECOND IDENTIFICATION INFORMATION |
| | OPERATION STATE INFORMATION |
| | CORRECTION PROCESSING NECESSITY INFORMATION (UNNECESSARY) |
| | TERMINAL INFORMATION (TERMINAL) |

FIG. 9E

■MEMORY MAP FORMAT

| address | DATA | VALUE |
|---------|------|-------|
| 0 | DATA0 | XX |
| 1 | DATA1 | XX |
| 2 | DATA2 | XX |
| 3 | DATA3 | XX |
| 4 | DATA4 | XX |
| ... | ... | ... |
| N-1 | DATAN-1 | XX |

Columns labeled 51000, 51001, 51002, 51003.

FIG. 25

■EXTENDED FORMAT OF MEMORY MAP

| ADDRESS (51300) | DATA (51301, 51302) | VALUE (51303) |
|---|---|---|
| 0 | DATA0 | XX |
| 1 | DATA1 | XX |
| 2 | DATA2 | XX |
| 3 | DATA3 | XX |
| 4 | DATA4 | XX |
| ... | ... | ... |
| N-1 | DATA N-1 | XX |
| N+0 | EXTENDED DATA 0 | XX |
| N+1 | EXTENDED DATA 1 | XX |
| N+2 | EXTENDED DATA 2 | XX |
| ... | ... | ... |
| N+M-1 | EXTENDED DATA M-1 | XX |

FIG. 29

IMAGING APPARATUS, ACCESSORY APPARATUS, AND COMMUNICATION CONTROL METHOD

CROSS-REFERENCE TO RELATED APPLICATIONS

This application is a continuation of application Ser. No. 16/454,535 filed Jun. 27, 2019, the entire disclosure of which is hereby incorporated by reference.

BACKGROUND OF THE INVENTION

Field of the Invention

The present invention relates to an imaging system that includes an imaging apparatus (referred to as a camera body hereinafter) and an accessory apparatus (simply referred to as an accessory hereinafter), such as an interchangeable lens and an adapter, which can communicate with each other.

Description of the Related Art

A lens interchangeable type imaging system may connect an adapter (intermediate accessory), such as a wide-angle/telephoto converter, a mount conversion adapter, and an ND filter adapter, between the camera body and the interchangeable lens. In this case, for high-quality imaging, smooth lens controlling, etc., a large amount of data needs to be transmitted and received at a high speed. In addition, a combination of a camera body and an accessory needs a higher speed and optimization of communication speed while their mutual compatibilities are guaranteed.

Japanese Patent No. 5208169 discloses an imaging system for correcting optical information of an interchangeable lens based on optical information of an intermediate accessory that is connected between a camera body that communicates with the interchangeable lens and the interchangeable lens. This imaging system starts correction processing of the optical information since the intermediate accessory as the communication master acquires the identification (ID) information of the interchangeable lens which is the communication slave.

The I2C communication method as a communication method for realizing the one-to-many communication between the communication master and a plurality of communication slaves utilizes two lines of a serial clock line and a serial data line.

However, when the intermediate accessory serves as the communication master as in the imaging system disclosed in Japanese Patent No. 5208169, proper processing cannot start when a plurality of intermediate accessories are connected between the camera body and the interchangeable lens. This imaging system is unsuitable for the high-speed communication, because the "one-to-one" communication is performed while switching between the camera body and the accessory and between the accessories.

On the other hand, the I2C communication method is a clock synchronous open drain communication in which the reception side needs to return an acknowledgment (ACK) to the transmission side for each single data communication, and has difficulties in high-speed communications.

SUMMARY OF THE INVENTION

The present invention provides an imaging apparatus and an accessory apparatus, which can provide a communication between them at a higher or optimal communication speed.

An imaging apparatus according to one aspect of the present invention to which an accessory apparatus is attachable includes a camera controller configured to communicate with the accessory apparatus. The camera controller receives first information on a data size receivable by the accessory apparatus, performs a setting for a data size to be transmitted to the accessory apparatus based on the first information, and communicate with the accessory apparatus based on the setting.

Further features of the present invention will become apparent from the following description of exemplary embodiments with reference to the attached drawings.

BRIEF DESCRIPTION OF THE DRAWINGS

FIGS. 5A and 5B illustrate a flowchart of initial communication processing between the camera and an accessory according to the first embodiment.

FIGS. 6A and 6B illustrate a flowchart of a processing flow of determining a first accessory according to the first embodiment.

FIGS. 9A to 9E illustrate illustrative information communicated in the initial communication.

FIG. 25 is a diagram showing a memory map format for each communication command according to the fifth embodiment.

FIG. 29 illustrates an expanded format of a memory map for each communication command according to a sixth embodiment of the present invention.

DESCRIPTION OF THE EMBODIMENTS

Figure 1:
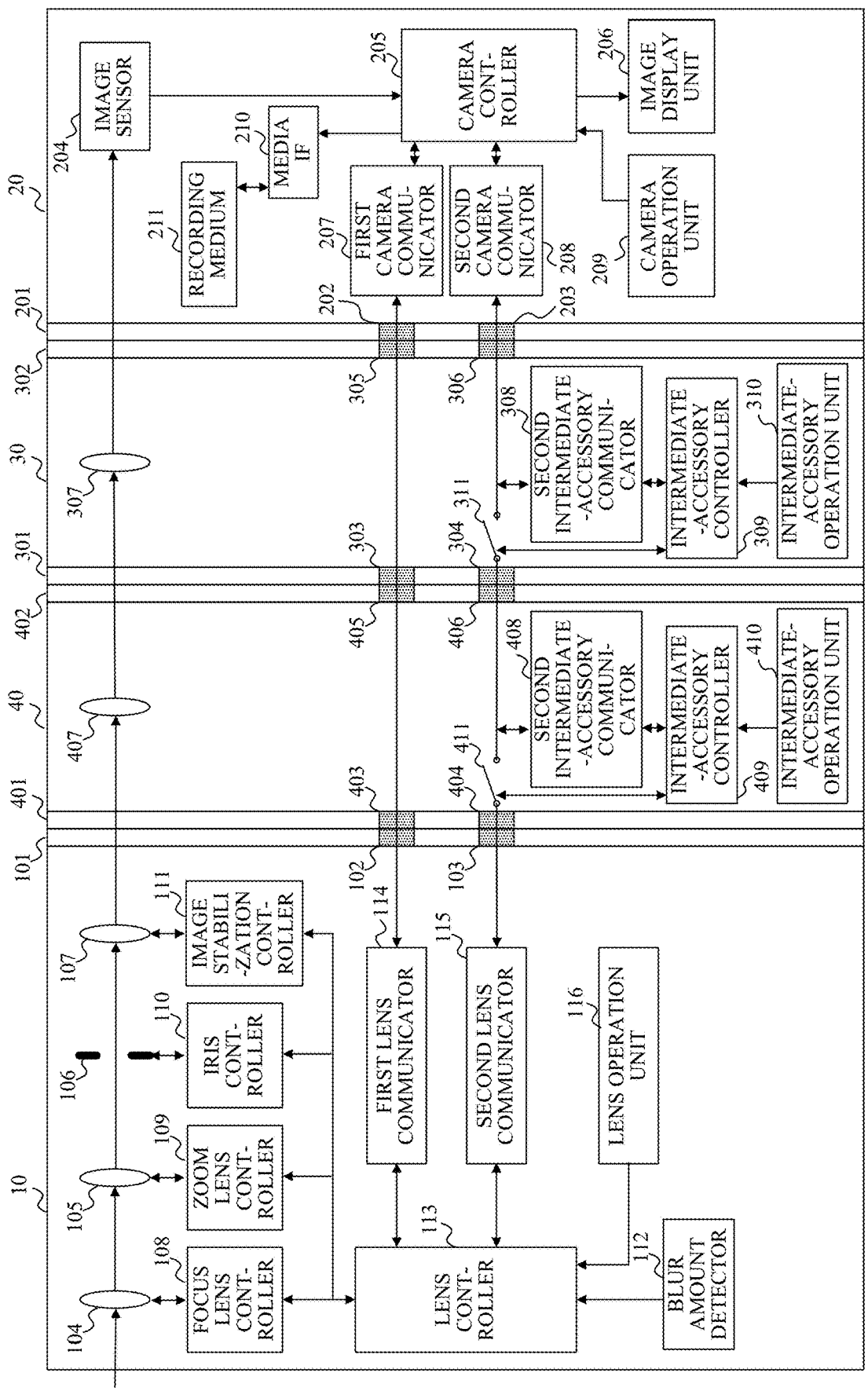
FIG. 1 is a block diagram for explaining a configuration of a camera system according to a first embodiment.

Exemplary embodiments of the present invention will be described below with reference to the accompanied drawings.

Hereinafter, the accessory includes an interchangeable lens or an intermediate accessory.

In the following embodiments, the camera body, the interchangeable lens, and the intermediate accessory are collectively referred to as a unit. In addition, the interchangeable lens and the intermediate accessory are collectively referred to as an accessory.

Further, in the following embodiments, the accessory relating to a correction is an interchangeable lens or an intermediate accessory for which correction processing necessity information is "necessary".

In the following embodiments, the intermediate accessory relating to the correction is an intermediate accessory that requires the optical information of the interchangeable lens to be corrected.

In the following embodiments, a first accessory is an accessory that stores optical information of all other accessories.

In the following embodiments, the first intermediate accessory is an intermediate accessory having optical information of another intermediate accessory.

In the following embodiments, the first unit is a unit that stores optical information of all accessories.

The following embodiments considers whether each unit has optical information of another unit, but this does not necessarily relate to the sales date or manufacture date of the unit. For example, due to the firmware upgrade or the like, the optical information stored in each unit may change regardless of the release date or manufacture date of the unit.

First Embodiment

A first embodiment will be described below.
<Configuration of Camera System (FIG. 1)>
The configuration of the camera system of this embodiment will be described with reference to FIG. 1.

The camera system has a first communication path serving as a communication path for transmitting a control command from the camera body 20 to the interchangeable lens 10 and for transmitting operation information and optical information from the interchangeable lens 10 to the camera body 20. It also has a second communication path serving as a communication path for transmitting operation information and optical information between the camera body 20 and the plurality of intermediate accessories 30 and 40. Hereinafter, a communication performed through the first communication path will be referred to as a first communication, and a communication performed through the second communication path will be also referred to as a second communication.

Here, the first communication path communicates between a first communicator 207 on the camera side and a first communicator 114 on the lens side, via mounts 202 and 305, 303 and 405, 403 and 102, which will be described later. The first communicator 207 on the camera side and the first communicator 114 on the lens side are illustrative communication controllers.

Thus, a communication performed between a certain unit and one unit different from the certain unit will be referred to as a one-to-one communication in this embodiment.

Herein, the second communication path is a path through which the second communicator 208 on the camera side communicates with the communicator of each accessory. At this time, the communication is performed from the second communicator 208 on the camera side via the mounts 203 and 306 and at least part of the mounts 304, 406, 404 and 103. For example, the communicator 208 on the camera side communicates with the second communicator 115 on the lens side and the second communicators 308 and 408 on the intermediate accessory side through the second communication path. The communicator 208 on the camera side, the second communicator 115 on the lens side, the second communicator 308 on the intermediate accessory side, and the second communicator 408 on the intermediate communicator side are illustrative communication controllers.

Thus, the communication performed between a certain unit and a plurality of units different from the certain unit will be referred to as a one-to-many communication in this embodiment.

In FIG. 1, the interchangeable lens 10 is an interchangeable lens that controls a movable optical member relating to imaging. The camera body 20 is a camera body that captures an image. The intermediate accessories 30 and 40 are intermediate accessories such as an extender mounted between the interchangeable lens 10 and the camera body 20.

In the interchangeable lens 10, the intermediate accessory 40, the intermediate accessory 30, and the camera body 20, the mounts 101 and 401, 402 and 301, and 302 and 201 are detachably attached, respectively. Here, the mount 101 is provided to the interchangeable lens 10, the mount 401 and the mount 402 are provided to the intermediate accessory 40, the mount 301 and the mount 302 are provided to the intermediate accessory 30, and the mount 201 is provided to the camera body 20.

First communication contacts 102, 403, 405, 303, 305, and 202, as contact terminals having one or more contacts for performing the first communication, are provided to the mounts 101, 401, 402, 301, 302, and 201. Herein, the first communication contacts 102, 403, 405, 303, 305, and 202 are electrically connected to one another when the interchangeable lens 10, the intermediate accessories 30 and 40, and the camera body 20 are connected to each other. In the first embodiment, the first communication is also used for the camera body 20 to control the optical member of the interchangeable lens 10.

The mounts 101, 401, 402, 301, 302, and 201 have second communication contacts 103, 404, 406, 304, 306 and 203 as contact terminals each having one or more contacts for performing the second communication. Herein, the second communication contacts 103, 404, 406, 304, 306, and 203 are configured to be conductive when the interchangeable lens 10, the intermediate accessories 30 and 40, and the camera body 20 are connected to each other. The first embodiment configures the second communication such that the camera body 20 can perform the one-to-many communication with the intermediate accessories 30 and 40, and the interchangeable lens 10.

Thus, the first communication path and the second communication path are different from each other and correspond to the first communication which is the one-to-one communication between the camera body 20 and the interchangeable lens 10 and the second communication which performs the one-to-many communications between the camera body and the plurality of accessories. Thereby, compared with these communications with a single communication path, for example, the interchangeable lens control instruction can be transmitted to the interchangeable lens at a more suitable timing in the first communication. Since the interchangeable lens control instruction can be quickly transmitted to the interchangeable lens at the timing intended by the camera body, a plurality of optical members mounted on the interchangeable lens can be quickly and accurately controlled.

The interchangeable lens 10 includes a focus lens 104, a zoom lens 105, an iris 106, an image stabilization lens 107, which constitute an optical system, controllers (108 to 111) that control each optical member, and a lens controller 113 that controls the entire lens. The interchangeable lens 10 further includes a first communicator 114 on the lens side that performs the first communication, a second communicator 115 on the lens side that performs the second communication, a blur amount detector 112 that detects the blur amount, and a lens operation member 116 which is an operation member provided to the interchangeable lens. Each configuration will be described.

The focus lens 104 is configured to change the focus state of the captured image. The zoom lens 105 is configured to zoom the captured image. The iris 106 is configured to adjust the light amount of the captured image. The image stabilization lens 107 corrects an image blur of an object image.

A focus lens controller 108 detects a position and controls driving of the focus lens 104. A zoom lens controller 109 detects a position and controls driving of the zoom lens 105. An iris controller 110 detects a position and controls driving of the iris 106. An image stabilization (IS) controller 111 detects a position and controls driving of the image stabilization lens 107. The focus lens controller 108, the zoom lens controller 109, the iris controller 110, and the image stabilization controller 111 each include, for example, a position sensor such as an absolute value encoder and a drive motor such as an ultrasonic motor or a stepping motor. A blur amount detector 112 detects a vibration amount of the interchangeable lens 10, and includes, for example, a gyro sensor.

A lens controller 113 controls the lens, and has an unillustrated memory. The lens controller 113 is an illustrative communication controller. A first lens communicator 114 performs the first communication with the interchangeable lens 10. A second lens communicator 115 performs the second communication with the interchangeable lens 10.

A memory included in the lens controller 113 includes a rewritable nonvolatile memory, and stores control software (firmware) executed by the CPU and unique information and status information on the interchangeable lens 10. The unique information is, for example, a model name (identification (ID) information), an optical characteristic, correction information, and the like. The state information includes, for example, the operating state (normal and safe modes), position information (or magnification) of the zoom lens 105, the position information of the focus lens 104, the F-number of the iris 106, the position information of the image stabilization lens 107, the firmware version and update status, etc. However, it is not limited to these examples. The memory also stores a program to be executed in operating the interchangeable lens 10 in the safe mode described later.

The lens controller 113 has a programmable processor, such as a CPU, and realizes various operations including the operation of the interchangeable lens 10 described later by reading and executing the program from the memory. For example, the lens controller 113 executes an operation according to the command received from the camera controller 205 in the first communication described later. The operation according to the command includes, for example, a control of each of the focus lens controller 108, the zoom lens controller 109, the iris controller 110, and the image stabilization controller 111, and an update of the firmware stored in the memory.

The lens controller 113 updates the firmware by overwriting the old firmware stored in the memory, for example, with the new firmware received from the camera body 20 in the first communication. The lens controller 113 manages update processing by recording data (update state data) representing the status of the update processing of the firmware in the memory. For example, the lens controller 113 sets the update state data to a value indicating "not completed" before overwriting the firmware, and sets the update state data to a value indicating "completed" when the firmware overwrite is completed. The value indicating "completed" may be different between the value indicating "normally completed" and the value indicating "abnormally completed". The value indicating "abnormal completion" may be a different value depending on the cause of the abnormality.

For example, if the interchangeable lens 10 is removed while the firmware is being updated, the power supply to the interchangeable lens 10 is cut off and the update processing is interrupted with the update status data indicating the value "incomplete". For example, when the power is supplied again, the lens controller 113 checks the update state data, and if the value indicates the incomplete state, it moves to an operation limited mode (safe mode) because the firmware update is interrupted. The operation state of the interchangeable lens 10 stored in the memory is rewritten to the safe mode. In the safe mode, only limited functions are available, including the processing required to update the firmware. More specifically, the processing required to update the firmware is processing of transmitting the identification information of the interchangeable lens 10 and the operation state information (or a firmware update request) on the interchangeable lens 10 to the camera body 20. The processing of updating the firmware recorded in the memory with the firmware received from the camera body 20 is processing necessary to update the firmware.

Other processing, such as a control of the focus lens controller 108, is unavailable.

Usually, the memory capacity is not large enough to redundantly store the entire firmware. The available capacity for storing a program in the safe mode is limited. In the safe mode, only limited functions are provided, including the minimum necessary functions such as transmitting the operating state of the interchangeable lens 10 and updating the firmware. When the lens controller 113 receives a request for processing that cannot be performed in the safe mode, such as a request for driving the focus lens 104, through the first communication in the safe mode, it ignores the request. The lens operating member 116 is an operating member provided to the interchangeable lens 10, such as a switch or an electronic ring. When the lens operation member 116 is operated, an operation signal is output to the lens controller 113.

Next follows a description of the configuration of the camera body 20. The camera body 20 includes an image sensor 204, a camera controller 205 that controls the camera body, an image display unit 206 that displays an image captured by the camera body 20, and a camera operation member 209 that is an operation member provided to the camera body 20. The camera body 20 includes a first camera communicator 207 that controls the first communication and the second communication, and a second camera communicator 208. Each configuration will be described.

The image sensor 204 is an image pickup element for capturing an image, such as a CMOS image sensor.

The camera controller 205 is configured to control the camera body and has an unillustrated memory. The camera controller 205 is an illustrative communication controller. The first camera communicator 207 performs the first communication in the camera body 20. The second camera communicator 208 performs the second communication in the camera body 20. The camera controller 205, the first camera communicator 207, and the second camera communicator 208 are configured using, for example, a CPU in the camera body 20.

The image display unit 206, such as a liquid crystal monitor, is used to display an image captured by the camera body 20, image data recorded in the recording medium 211, a GUI, and the like. At this time, the image display unit 206 is also used to display a menu for the user to instruct the firmware update of the interchangeable lens 10 or the intermediate accessory 30 or 40. The camera controller 205 can also notify the user that the firmware needs to be updated by displaying a message or the like when it is detected that the mounted interchangeable lens 10 and intermediate accessories 30 and 40 are in the safe mode.

The camera operation member 209 sets an imaging condition, such as a dial ring and a switch. When the camera operation member 209 is operated, an operation signal is output to the camera controller 205.

A media interface (IF) 210 is an interface configured to record data in and read data on a storage medium 211, such as a removable memory card.

The recording medium 211 is used as a recording destination of image data and audio data obtained by imaging in the camera body 20. The recording medium 211 is also used as a new firmware supply source in updating the firmware of the camera body 20, the interchangeable lens 10, and the intermediate accessories 30 and 40.

The intermediate accessories 30 and 40 include intermediate-accessory optical members 307 and 407, second intermediate-accessory communicators 308 and 408 configured to perform the second communication, and intermediate-accessory controllers 309 and 409 configured to control the intermediate accessories. The intermediate accessories 30 and 40 include intermediate-accessory operating members 310 and 410 as operating members provided on the intermediate accessory. Each configuration will be described.

The intermediate-accessory optical members 307 and 407 in this embodiment are, for example, optical members that change optical characteristics of captured images, such as a magnification varying lens and an ND filter.

The second intermediate-accessory communicators 308 and 408 perform the second communication in the intermediate accessories 30 and 40.

The intermediate-accessory controllers 309 and 409 are controllers for controlling the intermediate accessories 30 and 40, respectively, and have unillustrated memories. Each of the intermediate-accessory controllers 309 and 409 is an illustrative communication controller. The intermediate-accessory controllers 309 and 409, and the second intermediate-accessory communicators 308 and 408 include the CPUs of the intermediate accessories.

Each of the memories included in the intermediate-accessory controllers 309 and 409 includes a rewritable nonvolatile memory, and stores control software (firmware) executed by the CPU and unique information and state information on the intermediate accessories 30 and 40. The unique information is, for example, a model name (identification information), an optical characteristic, correction information, and the like. The state information is, for example, an operation state (normal and safe modes), operation information (position and speed) of the intermediate-accessory operating members 310 and 410, a firmware version and update state. However, it is not limited to these examples. The memory also stores a program to be executed when the intermediate accessories 30 and 40 are operated in the safe mode described later.

The intermediate-accessory controllers 309 and 409 have a programmable processor, such as a CPU, and realize various operations including the operations of the intermediate accessories 30 and 40 described later by reading and executing the program from the memory. For example, the intermediate-accessory controllers 309 and 409 perform an operation according to an instruction received from the camera controller 205 in the second communication described later, for example, a transmission of the operation information of the intermediate-accessory operation members 310 and 410, and an update of the firmware stored in the memory.

The intermediate-accessory controllers 309 and 409 update the firmware by overwriting the old firmware stored in the memory with, for example, the new firmware received from the camera body 20 through the first communication. The intermediate-accessory controllers 309 and 409 control update processing by recording data (update state data) representing the status of the firmware update processing in the memory.

For example, before overwriting the firmware, the intermediate-accessory controllers 309 and 409 set the update state data to a value indicating "incomplete", and when the firmware overwrite is completed, they set the update state data to a value indicating "completed". The value indicating "completed" may be different between the value indicating "normally completed" and the value indicating "abnormally completed". The value indicating "abnormal completion" may be a different value depending on the cause of the abnormality.

For example, if the intermediate accessories 30 and 40 are removed while updating the firmware, the power supply to the intermediate accessories 30 and 40 is cut off and the update processing is interrupted with the update status data having a value indicating "incomplete". For example, when the power is supplied again, the intermediate-accessory controllers 309 and 409 check the update state data, and when the value indicates the uncomplete state, they shift to the operated limited mode (safe mode). The operation state of each of the intermediate accessories 30 and 40 stored in the memory is rewritten to the safe mode.

In the safe mode, only limited functions can be performed, including the processing required to update the firmware. More specifically, the processing required to update the firmware includes processing that transmits authentication information such as identification information of the intermediate accessories 30 and 40 and information indicating that it is in the safe mode (or a request for firmware update) to the camera body 20. The processing of updating the firmware recorded in the memory with the firmware received from the camera body 20 is also processing necessary to update the firmware. Other processing is unavailable, such as a transmission of operation information of the intermediate-accessory operation members 310 and 410.

Usually, the memory capacity is not large enough to redundantly store the entire firmware. The available capacity for storing a program in the safe mode is limited. In the safe mode, only limited functions are provided, including the minimum necessary functions such as transmitting the operating state of the intermediate accessories 30 and 40 and updating the firmware. The intermediate-accessory controllers 309 and 409 ignore a request for processing which cannot be executed in the safe mode, for example, when transmitting and receiving operation information of the intermediate accessory operating members 310 and 410 through the second communication in the safe mode.

The intermediate-accessory operation members 310 and 410 are operation members provided on the intermediate accessories 30 and 40, such as switches and electronic rings. When the intermediate-accessory operation members 310 and 410 are operated, an operation signal is output to the intermediate-accessory controllers 309 and 409.

The second communication connection switches 311 and 411 are switches provided on the second communication line of the intermediate accessories 30 and 40 and closer to the lens than the second intermediate-accessory communicator. The second communication connection switches 311 and 411 can control short-circuiting and opening by the intermediate-accessory controllers 309 and 409, respectively. Thereby, they can shut off the second communication on the lens side from itself. In other words, they can change the communication state of the second communication by controlling the short circuiting and opening of these switches.

In the first embodiment, the flow until the light incident on the interchangeable lens 10 is output as an image is as follows.

The light incident on the interchangeable lens 10 passes through the focus lens 104, the zoom lens 105, the iris 106, the image stabilization lens 107, and the intermediate-accessory optical members 407 and 307, forms an image on the image sensor 204, and is converted into an electrical signal. The electric signal output from the image sensor 204, is converted into an image signal by the camera controller 205, and is output to the image display unit 206.

<First Communication (FIGS. 2A and 2B)>

Figure 2A:
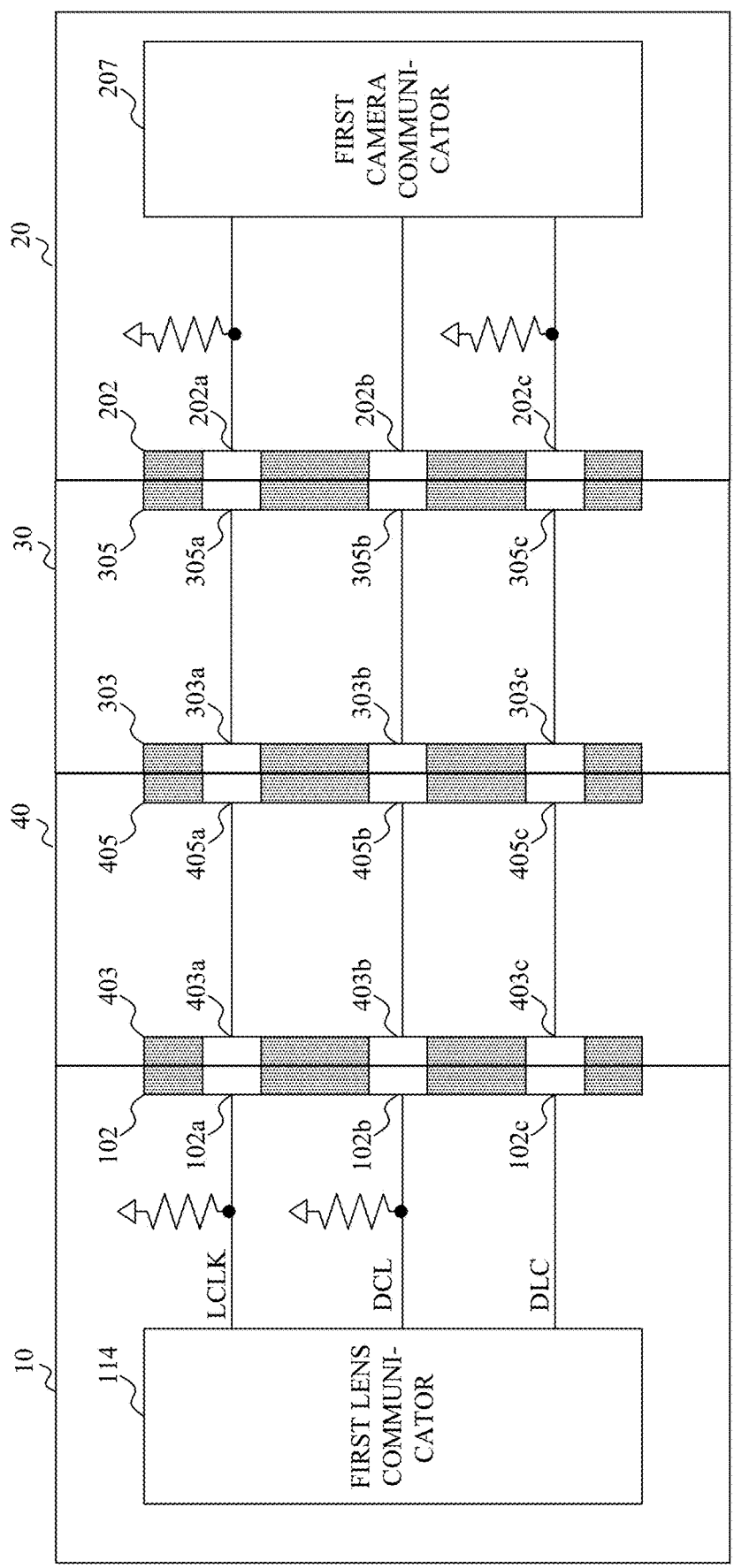
FIGS. 2A and 2B are diagrams for explaining a configuration for a first communication according to the first embodiment.
Figure 2B:
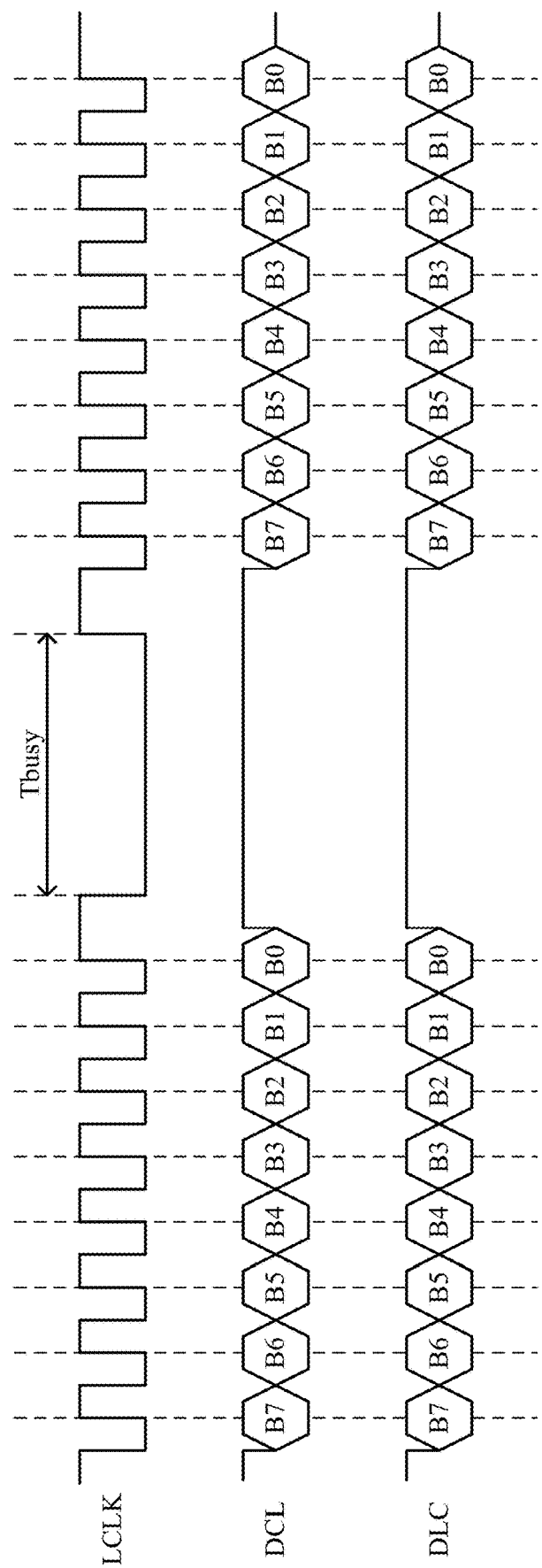

Referring now to FIGS. 2A and 2B, a description will be given of the first communication.

FIG. 2A illustrates a structure that provides the first communication. The first communication in this embodiment exemplifies a clock synchronous communication, but is applicable to an asynchronous communication. The asynchronous communication will be described later as a variation.

First communication contacts 102, 403, 405, 303, 305, and 202 include first communication LCLK terminals 102$a$, 403$a$, 405$a$, 303$a$, 305$a$, and 202$a$ as terminals of the clock line LCLK output from the first camera communicator 207, respectively.

This embodiment includes first communication DCL terminals 102$b$, 403$b$, 405$b$, 303$b$, 305$b$, and 202$b$ as terminals of the data line DCL similarly output from the first camera communicator 207 of the clock synchronous communication. Each of the first communication DCL terminals 102$b$, 403$b$, 405$b$, 303$b$, 305$b$, and 202$b$ is an illustrative first communication terminal.

Similarly, first communication DLC terminals 102$c$, 403$c$, 405$c$, 303$c$, 305$c$, and 202$c$ are terminals of the data line DLC output from the first lens communicator 114 of the clock synchronous communication. Each of the first communication DLC terminals 102$c$, 403$c$, 405$c$, 303$c$, 305$c$, and 202$c$ is an illustrative third communication terminal.

As illustrated in FIG. 2A, the clock line LCLK and the data line DCL are pulled up in the interchangeable lens 10. The clock line LCLK and the data line DLC are pulled up in the camera body 20.

The clock line LCLK, the data line DCL, and the data line DLC in the intermediate accessories 30 and 40 are short-circuited between first communication contacts 403 and 405 and between the first communication contacts 303 and 305, respectively.

FIG. 2B illustrates the waveforms of the clock line LCLK, the data line DCL, and the data line DLC in the first communication. The first camera communicator 207 outputs a clock to the clock line LCLK, and 8-bit data from B7 to B0 to the data line DCL in accordance with a leading edge signal of the clock line LCLK. Similarly, the first lens communicator 114 outputs the 8-bit data from B7 to B0 to the data line DLC in accordance with a leading edge signal of the clock line LCLK. The first camera communicator 207 receives the 8-bit data from B7 to B0 of the data line DLC in accordance with the leading signal of the clock line LCLK. Similarly, the first lens communicator 114 receives the 8-bit data from B7 to B0 of the data line DCL in accordance with the leading edge signal of the clock line LCLK. Thereby, the first camera communicator 207 and the first lens communicator 114 can exchange communication data with each other. When the first lens communicator 114 receives the 8-bit data from B7 to B0 of the data line DCL, the first lens communicator 114 sends the low output to the clock line LCLK during Tbusy time and then releases the low output. Herein, the Tbusy time is a time during which the interchangeable lens 10 is processing received data, and the first camera communicator 207 does not transmit data until the clock line LCLK changes from low to high after the data transmission. The flow control of the first communication can be performed by this signal control. Repeating the above processing can transmit and receive data between the first camera communicator 207 and the first lens communicator 114 through the first communication.

<Second Communication (FIG. 11)>

Referring now to a configuration diagram in FIG. 11, a description will be given of one of the communication circuits that can provide the "one-to-many" communication among the camera body 20, the interchangeable lens 10, the intermediate accessories 30 and 40. The communication circuit is not limited to this example as long as the "one-to-many" communication is available. Where there are a plurality of communication circuits, other communication circuits may use the "one-to-one" communication such as the clock synchronous serial communication and the UART communication.

The second camera communicator 208, the second lens communicator 115, and the second intermediate-accessory communicators 308 and 408 are connected to one another via the contact points as in the first communication. More specifically, they are connected via the second communication contacts 103, 404, 406, 304, 306, and 203. In this embodiment, the second communication contacts 103, 404, 406, 304, 306, and 203 include CS signal terminals 103a, 404a, 406a, 304a, 306a, 203a and DATA signal terminals 103b, 404b, 406b, 304b, 306b, and 203b respectively. The second camera communicator 208, the second lens communicator 115, and the second intermediate-accessory communicator 308 communicate with one another through the CS signal line connected via the CS signal terminals and the DATA signal line connected via the DATA signal terminals.

The DATA signal terminal which each of the second communication contacts 103, 404, 406, 304, 306, and 203 has is an illustrative second communication terminal.

The camera communication circuit includes a ground switch 221 and an input/output selector switch 222. The lens communication circuit includes a ground switch 121 and an input/output selector switch 122. The intermediate accessory communication circuit includes ground switches 321 and 421 and input/output switches 322 and 422.

The signal lines include CS signal lines (first signal line) for propagating a signal for performing a communication flow control, and DATA signal lines (second signal line) for propagating data to be transmitted and received.

The CS signal line is connected to the second camera communicator 208, the second intermediate-accessory communicator 308, and the second lens communicator 115, and can detect the (high and low) states of the signal line. The CS signal line is pull pulled up to an unillustrated power supply in the camera body. The CS signal line can be connected to GND via the ground switch 121 of the interchangeable lens 10, the ground switch 221 of the camera body 20, and the ground switches 321 and 421 of the intermediate adapters (open drain connection). This configuration can set the state of the CS signal line to a low state by turning on (connecting) the ground switches to the interchangeable lens 10, the camera body 20, and the intermediate accessories 30 and 40. On the other hand, when all of the interchangeable lens 10, the camera body 20, and the intermediate accessories 30 and 40 turn off (cut off) their connection switches, the state of the CS signal line can be made high. The CS signal line is used to distinguish the broadcast communication from the P2P communication, or to switch the communication direction in the P2P communication.

The DATA signal line is a single-line bidirectional data transmission line that can be used by switching the data propagation direction. The DATA signal line can be connected to the second lens communicator 115 via the input/output switch 122 of the interchangeable lens 10. The DATA signal line can be connected to the second camera communicator 208 via the input/output switch 222 of the camera body 20. The DATA signal line can be connected to the second intermediate-accessory communicator 308 or 408 through the input/output switch 322 or 422 of the intermediate accessory 30 or 40, respectively. Each microcomputer includes a data output unit (CMOS system) for transmitting data and a data input unit (CMOS system) for receiving data. Operating the input/output switch can select whether the DATA signal line is connected to a data output unit or a data input unit. When the interchangeable lens 10, the camera body 20, and the intermediate accessories 30 and 40 each transmit data, this configuration enables them to operate the input/output switch so as to connect the DATA signal line to the data output unit. On the other hand, the interchangeable lens 10, the camera body 20, and the intermediate accessories 30 and 40 receive data by operating respective input/output switches so as to connect the DATA signal line to the data input unit.

A description will now be given of the broadcast communication and P2P communication performed by the CS signal and the data signal.

The CS signal line is used as a trigger for the broadcast communication because it turns into a low level when any units are connected to GND.

The broadcast communication starts when the camera body that starts the communication pulls the CS signal line low. The data received by the accessory via the DATA line when the CS signal line is low is determined to be the broadcast data.

Each accessory can request the camera body for the broadcast communication by pulling the CS signal line low.

A unit that has detected a low level of the CS signal line can notify another unit that processing for the broadcast communication is continuing by turning on its own ground switch during the broadcast processing. By defining that the second communication starts with the broadcast communication and ends with the broadcast communication, the DATA signal line of the accessory may basically maintain the reception state. When the camera performs the P2P communication with the accessory, an accessory to be communicated is initially designated by the broadcast communication. The camera that has completed a transmission of the broadcast communication and the designated accessory perform the P2P communication.

In the P2P communication, the camera initially transmits the data, and the accessory that receives the data transmits the data to the camera. Thereafter, this operation is alternately performed. In the P2P communication, the CS signal in the communication is distinguished from the broadcast communication by maintaining high. The CS signal in the P2P communication is used as a busy signal. In other words, one of the camera and accessory sets the CS signal to be low to notify the counterpart that its data transmission has been completed, and set the CS signal to be high to notify that its data reception is ready.

When the P2P communication ends, the camera broadcasts the end of the P2P communication.

In this way, the camera can communicate the data to the plurality of accessories via two communication lines.

Figure 11:
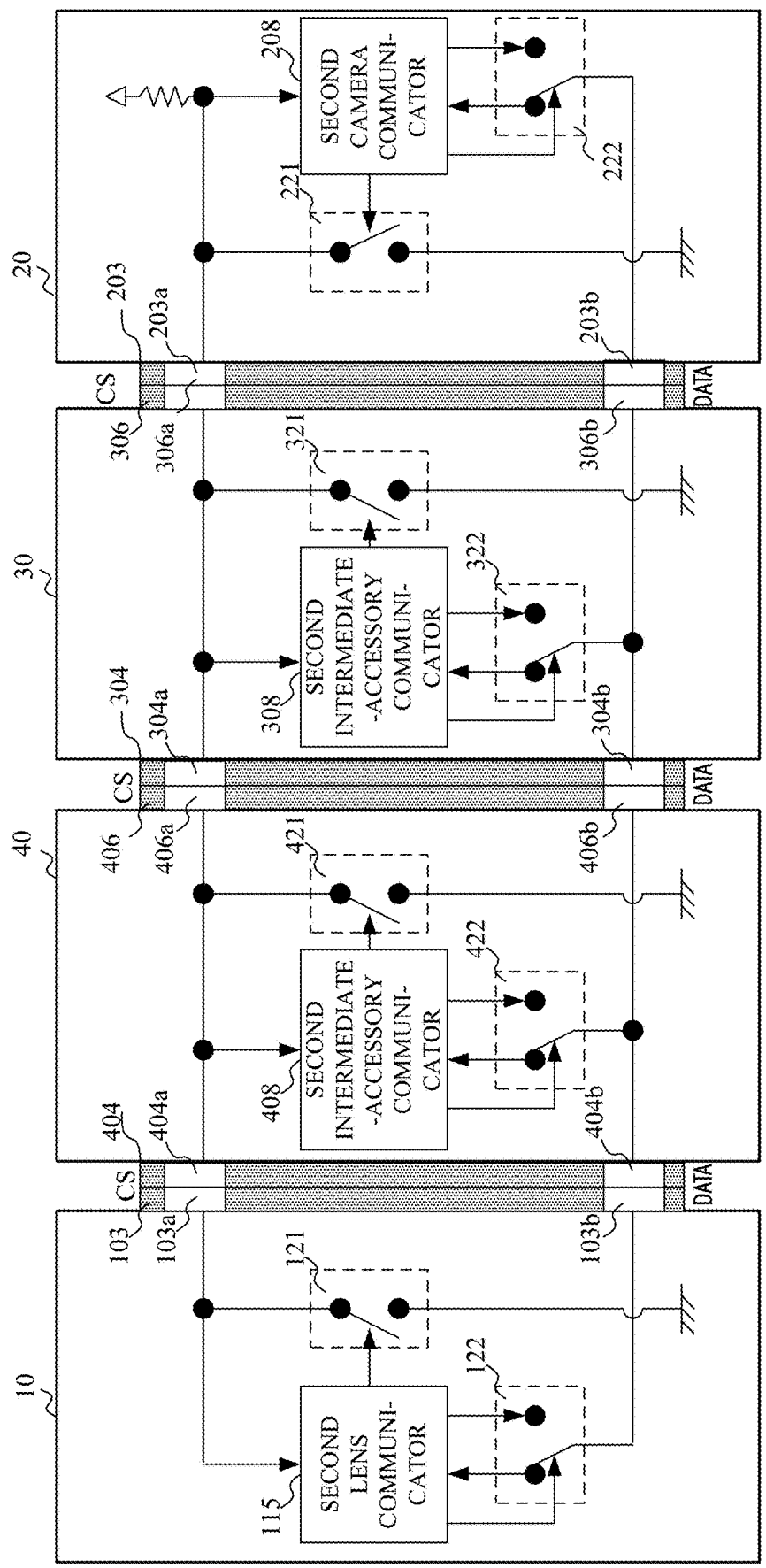
FIG. 11 is a diagram for explaining a configuration for a second communication according to the first embodiment.

Although FIG. 11 illustrates an illustrative communication circuit in the present invention, the present invention is not limited to this example. For example, the CS signal line is pulled down to GND in the camera body 20, and can be connected with a power supply via the ground switch 121 of the interchangeable lens 10, the ground switch 221 of the camera body 20, and the ground switches 321 and 421 of the intermediate accessories 30 and 40. The DATA signal line may be always connected to each data input unit, and the connection/disconnection between the DATA signal line and each data output unit may be operated by a switch.

The second communication can be realized by the same communication method as the first communication, the bidirectional asynchronous communication, the master/slave method, the token passing method, or the like.

<Initial Communication with Accessory and Acquisition Processing of Corrected Optical Information (FIG. 3)>

Figure 3:
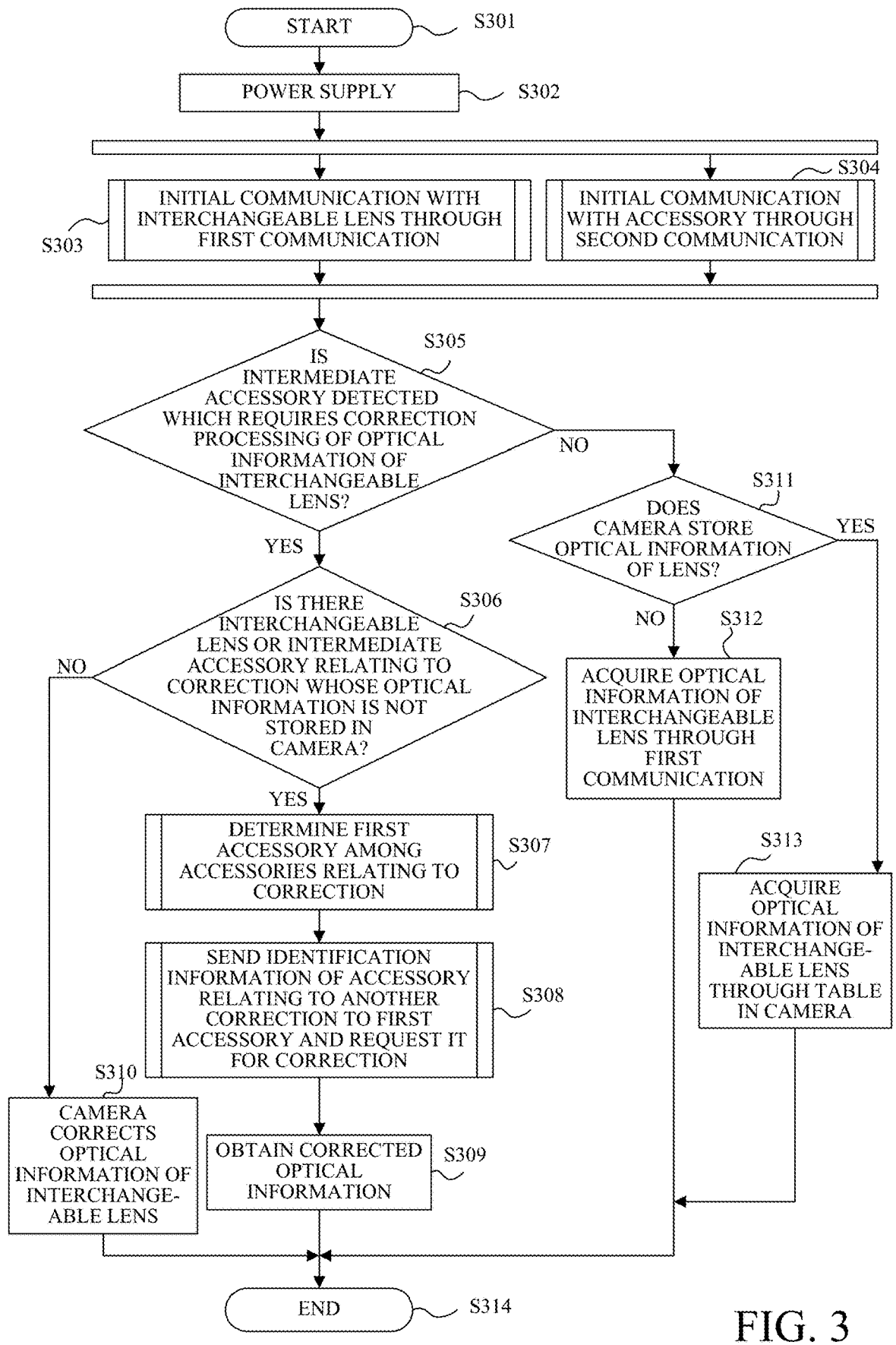
FIG. 3 is a flowchart showing an initial communication with an accessory according to the first embodiment and a processing flow for obtaining corrected optical information.

Referring now to FIG. 3, a description will be given of a flow of the camera body 20 acquiring the authentication information of the accessory through the initial communication with the accessory and further acquiring the optical information of the interchangeable lens 10 corrected based on the optical information of the intermediate accessories 30 and 40. The optical information of the intermediate accessory that includes a magnification varying lens is, for example, a magnification that changes by the insertion of the intermediate accessory. The optical information of the interchangeable lens 10 includes information, such as a focal length, an F-number (aperture value), a focus sensitivity, and a focus correction amount.

FIG. 3 illustrates a processing flow for the camera body 20 to acquire optical information of the interchangeable lens 10 corrected based on optical information of the intermediate accessories 30 and 40 after the power is supplied for initially after the intermediate accessory and the interchangeable lens are mounted.

When the camera body 20 starts in S301, the flow proceeds to S302.

After transferring to S302, the camera body 20 supplies the power to the interchangeable lens 10 and the intermediate accessories 30 and 40 via an unillustrated power supplying mount contact, and the flow transfers to S303 and S304.

After the flow transfers to S303, the camera controller 205 performs the initial communication with the interchangeable lens 10 in the first communication. In the initial communication, the authentication information of the interchangeable lens 10 is acquired.

Herein, the authentication information of the interchangeable lens 10 includes the ID information and the operation state information of the interchangeable lens 10. The interchangeable lens ID information may be information such as a model number (ID) used to identify the type (model) of the interchangeable lens, or optical data identification information indicating optical data unique to the interchangeable lens. Information indicating the function of the interchangeable lens or information such as a production number (serial number) capable of identifying an individual in the same model may be included.

The operation state information is information from which whether the interchangeable lens 10 is operating in the normal mode or in the safe mode can be identified. In other words, the operation state information is information from which whether the firmware update is interrupted (operation in the safe mode) or not (normal operation) can be identified.

Figure 4:
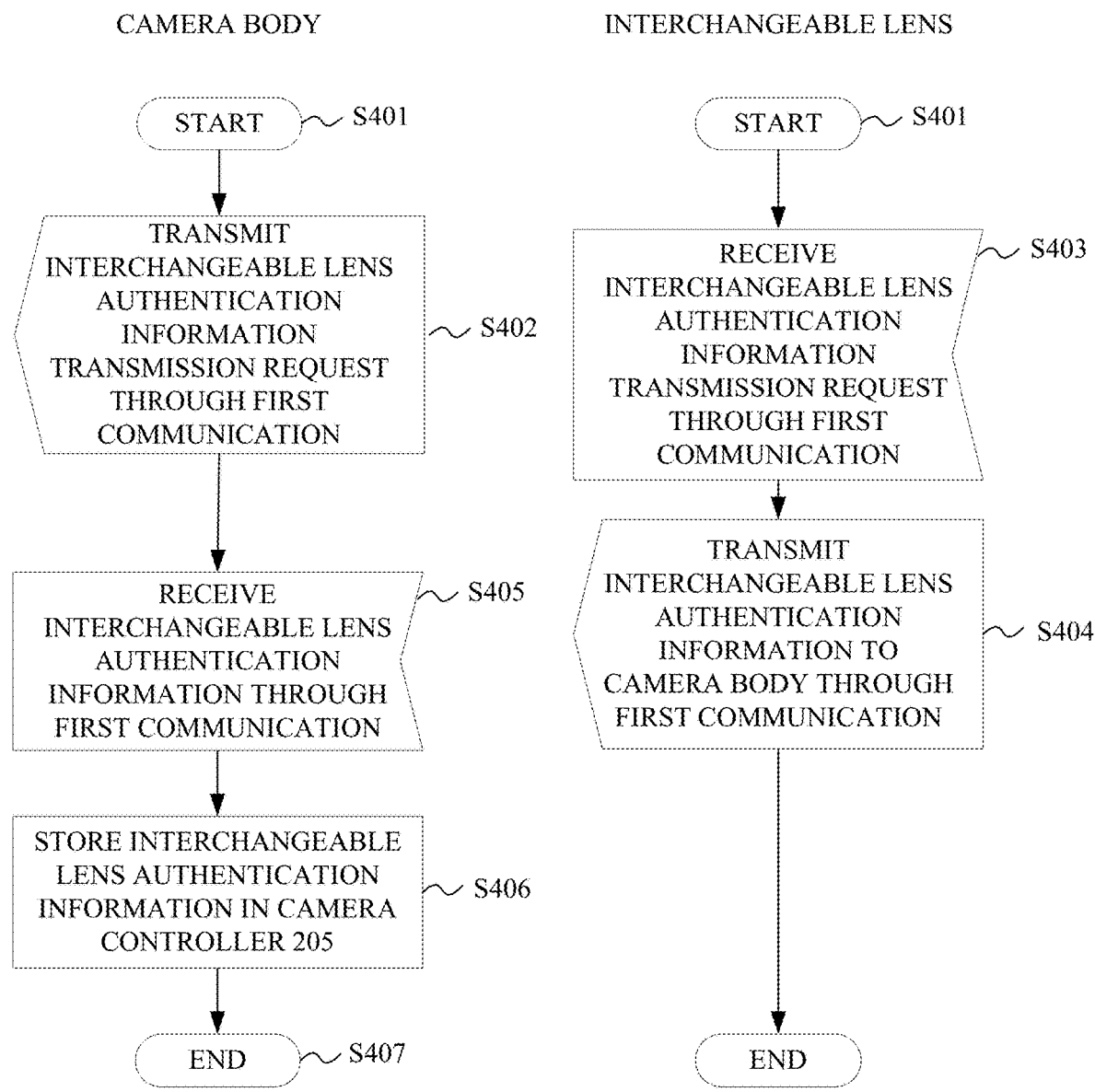
FIG. 4 is a flowchart showing initial communication processing between a camera and a lens according to the first embodiment.

Referring now to FIG. 4, a description will be given of a flow of a subprocess S303 for acquiring the authentication information of the interchangeable lens 10 through the first communication.

After transferring to S304, the camera controller 205 performs the initial communication with the accessory through the second communication, and acquires the authentication information of the accessory.

Herein, the authentication information of the accessory includes identification information of the accessory, correction processing necessity information of the accessory, and operation state information of the accessory.

The intermediate accessory identification information may be information such as a model number (ID) used to identify the type (model) of the intermediate accessory, or optical data identification information indicating optical data unique to the intermediate accessory. Information indicating the function of the intermediate accessory or information such as a production number (serial number) that can identify an individual in the same model may be included.

The correction processing necessity information is information indicating whether or not the optical information of the interchangeable lens 10 needs to be corrected when the accessory is attached. If the accessory is an intermediate accessory and does not affect the optical system of the interchangeable lens 10, the correction processing is unnecessary. When the camera controller 205 previously recognizes that correction processing is unnecessary when the intermediate accessory is attached based on the intermediate-accessory correction processing necessity information, the camera controller 205 ignores the intermediate accessory in the processing of acquiring optical information of the interchangeable lens 10.

The intermediate accessory which requires no correction processing, for example, is an intermediate accessory equipped with an optical member optically designed so as to cancel the influence of its own width on the optical system, and mounted to increase the operation member. Another example is a mount converter that changes the flange back length suitable for a camera body by being mounted between an interchangeable lens and the camera body with a short flange back mount.

The operation state information is information from which whether the intermediate accessories 30 and 40 are operating in the normal mode or in the safe mode can be identified. In other words, it is information from which whether updating of the firmware is interrupted (operation in the safe mode) or whether it is normal (normal operation) can be identified.

The flow of the subprocess S304 for acquiring the authentication information of the intermediate accessory through the second communication will be described later with reference to FIGS. 5A and 5B. S303 and S304 use different communication paths and thus perform parallel or sequential processing.

When the authentication information of the interchangeable lens and the authentication information of the attached accessory are acquired in S303 and S304, the flow proceeds to S305.

After transferring to S305, the camera controller 205 determines whether there is an intermediate accessory that requires a correction of the optical information of the interchangeable lens based on the correction processing necessity information acquired in S304. If an intermediate accessory (also referred to as an intermediate accessory relating to the correction) whose correction processing necessity information is "necessary" is attached, the flow proceeds to S306.

After transferring to S306, the camera controller 205 determines whether there is an accessory whose optical information is not stored in the camera controller 205 among an interchangeable lens and an intermediate accessory for which the correction processing necessity information is "necessary" in S305. The interchangeable lens and the intermediate accessory whose correction processing necessity information is "necessary" in S305 will be referred to as an accessory relating to correction. The camera controller 205 cannot perform the correction processing of the optical information of the interchangeable lens when there is the accessory whose optical information is not stored in the camera controller 205 among the accessories relating to the correction. In this case, in order to search for the correction processing requester, the flow proceeds to S307.

After transferring to S307, the camera controller 205 determines an accessory (also referred to as a first accessory) that stores optical information of all other accessories among the accessories relating to the correction. A method of determining the first accessory may make, for example, a determination based on the identification information acquired from the accessory, or the accessory may be inquired through a communication. Details will be described later with reference to FIGS. 6A and 6B.

When the first accessory is determined in S307, the flow proceeds to S308.

After transferring to S308, the camera controller 205 transmits the identification information of the accessory relating to another correction to the first accessory determined in S307, and requests it for correction processing of the optical information of the interchangeable lens 10. As an example, when the first accessory is an interchangeable lens, this embodiment performs the communication through the first communication. If the first accessory is the intermediate accessory, the communication is performed through the second communication.

The controller of the first accessory that has received the correction request in S308 performs the correction processing of the optical information of the interchangeable lens 10 using the optical information of the accessory relating to the other correction that has been stored.

In S309, the camera controller 205 acquires optical information corrected by the first accessory.

On the other hand, in S306, when the camera controller 205 determines that there is no accessory for which the camera controller 205 has no optical information among the interchangeable lens and the intermediate accessories for which the correction processing necessity information is "necessary" in S305, the flow transfers to S310. In this case, the camera controller 205 stores the optical information of all the accessories.

When the flow proceeds to S310, the camera controller 205 corrects the optical information of the interchangeable lens using the optical information of the interchangeable lens and the optical information of the intermediate accessory stored in it.

If the camera controller 205 determines in S305 that there is no intermediate accessory that requires the correction of the optical information of the interchangeable lens, the intermediate accessory is not attached or correction processing necessity information is "unnecessary" for all intermediate accessories that have been attached. The flow proceeds to S311 as processing when it is unnecessary to correct the optical information of the interchangeable lens.

When the flow proceeds to S311, the camera controller 205 determines whether the camera body 20 stores the optical information of the interchangeable lens 10, based on the identification information of the interchangeable lens 10 included in the interchangeable lens authentication information acquired in S303. If the camera controller 205 does not store the optical information of the interchangeable lens, the flow proceeds to S312.

After transferring to S312, the camera controller 205 acquires the optical information of the interchangeable lens 10 from the lens controller 113 through the first communication.

On the other hand, when it is determined in S311 that the optical information of the interchangeable lens 10 is stored, the camera controller 205 acquires the optical information from a data table in the camera in S313.

After the optical information is acquired in S309, S310, S312, or S313, the flow proceeds to S314, and the optical information acquisition sequence ends.

After the optical information is acquired, the first communication path is used for the communication for the camera body 20 to control the interchangeable lens 10, and the second communication path is used for the communication for the camera body 20 to regularly acquire the operation information of the intermediate accessory operating members 310 and 410. Any of the first communication path and second communication path may be used for the communication for regularly acquiring the operation information of the operation member 116 in the interchangeable lens, based on the occupancy rate of each communication path and the immediacy required for communication and control.

<Initial Communication Processing Through First Communication of Camera and Interchangeable Lens (FIG. 4)>

FIG. 4 illustrates a flow of the subprocess S303 as the initial communication between the camera body 20 and the interchangeable lens 10 in the camera system according to the first embodiment. In the initial communication, the camera controller 205 acquires the authentication information of the interchangeable lens 10 from the lens controller 113.

When the subprocess starts in S401, the flow proceeds to S402.

After transferring to S402, the camera controller 205 transmits an interchangeable lens authentication information transmission request (corresponding to the first transmission request) to the lens controller 113 through the first communication.

Referring now to FIG. 9A, a description will be given of the interchangeable lens authentication information request according to this embodiment. The interchangeable lens authentication information request according to this embodiment is information for requesting the camera controller 205 to transmit two pieces of information as the authentication information. The authentication information request includes an identification information request for the interchangeable lens and an operation state information request for the interchangeable lens.

The lens controller 113 receives the interchangeable lens authentication information transmission request in S403, and the flow proceeds to S404. Then, the lens controller 113 transmits the interchangeable lens authentication information (corresponding to the first information) to the camera controller 205 through the first communication.

Referring now to FIG. 9B, a description will be given of the authentication information that the interchangeable lens 10 transmits to the camera controller 205. The authentication information includes identification information and operation state information.

The camera controller 205 receives the interchangeable lens authentication information in S405, and the flow proceeds to S406, and stores the received interchangeable lens authentication information.

The subprocess S303 ends with S407.

<Initial Communication Processing Between Camera and Intermediate Accessory Through Second Communication (FIGS. 5A and 5B)>

Figure 5A:
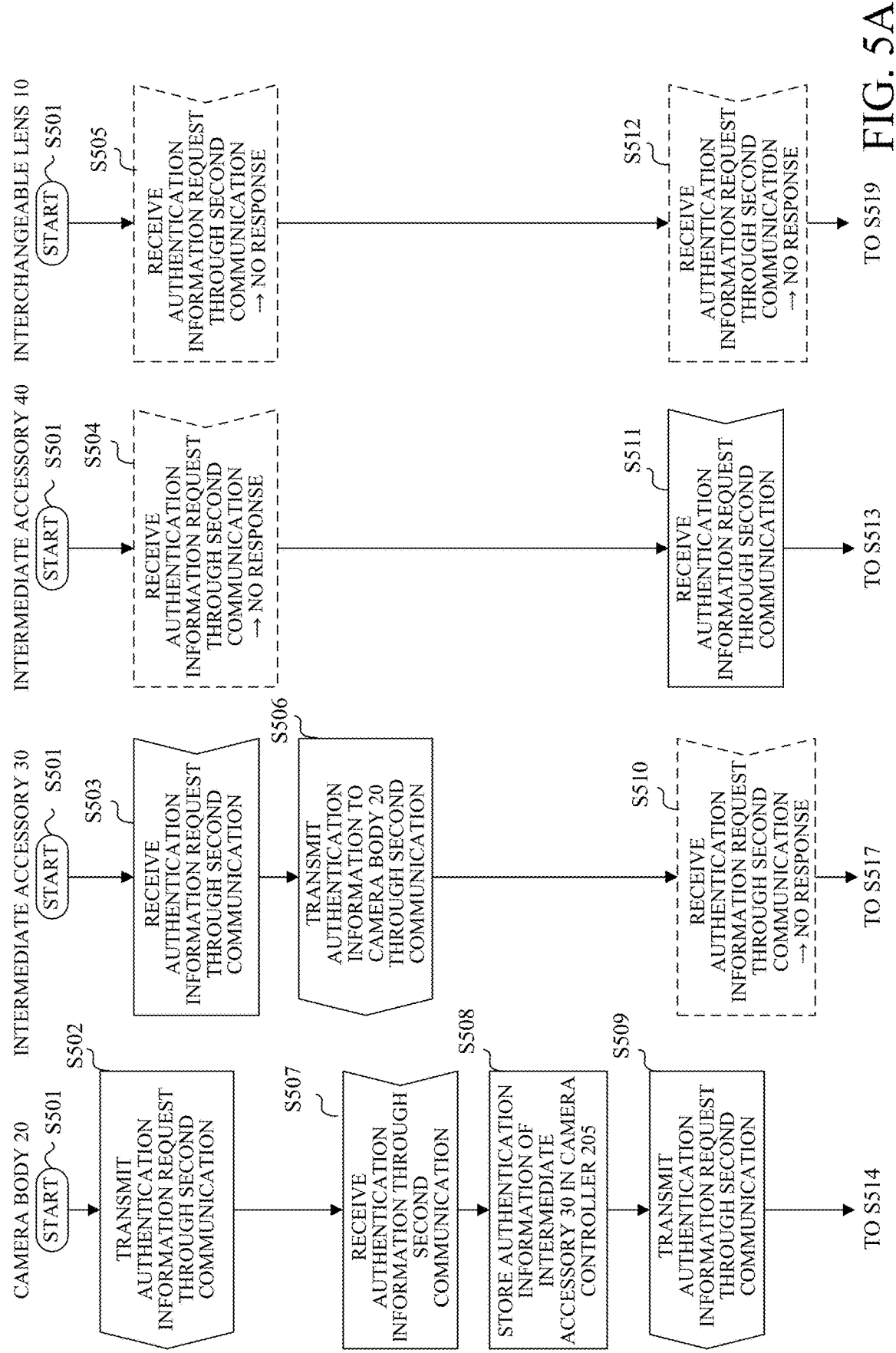

FIGS. 5A and 5B explain the flow of the subprocess S304 as the initial communication processing between the camera body 20 and the accessory in the camera system according to the first embodiment. In the initial communication, the camera controller 205 acquires the authentication information of the accessory. The authentication information of the accessory will be described later.

When the subprocess is started in S501, the flow proceeds to S502.

After transferring to S502, the camera controller 205 transmits a request for authentication information of the accessory (corresponding to the second transmission request) to the intermediate-accessory controller 309 through the second communication.

Referring now to FIG. 9C, a description will be given of the request for authentication information of the accessory according to this embodiment. The request for authentication information of the accessory is information for requesting the camera controller 205 to transmit the accessory authentication information. In this embodiment, the accessory authentication information includes the identification information on the accessory, the operation state information, the correction processing necessity information, and the terminal information.

The intermediate-accessory controller 309 receives the accessory authentication information request in S503, the flow proceeds to S506.

In S506, the intermediate-accessory controller 309 transmits the authentication information of the intermediate accessory 30 to the camera controller 205 through the second communication.

Referring now to FIG. 9D, a description will be given of the authentication information which the intermediate accessory transmits to the camera controller 205. The authentication information includes identification information (as illustrative third information), operation state information, correction processing necessity information, and terminal information.

The correction processing necessity information is information indicating "necessary" if the instant intermediate accessory changes the optical characteristic. If the optical characteristic is not to be changed, it is information indicating "unnecessary".

In this embodiment, the terminal information is information indicating whether or not the intermediate adapter is the termination of the second communication viewed from the camera body 20. If the intermediate adapter is the end of the second communication when viewed from the camera body 20, the terminal information is information indicating the "terminal". If the intermediate adapter is not the terminal of the second communication viewed from the camera body 20, the terminal information is information indicating the "nonterminal".

The one-to-many communication, like the second communication, can designate the transmission destination, for example, by adding the identification information of the accessory to the head of communication data. However, the camera controller 205 has no accessory information at the stage of S502, the transmission destination cannot be designated by communication data.

Thus, one of illustrative means by which the camera body 20 sequentially communicates with a plurality of accessories in this subprocess can be the following method using the second communication connection switches 311 and 411. Assume that the second communication connection switches 311 and 411 are short-circuited in the steady state.

In S501, the camera controller 205 transmits this subprocess start information through the second communication. Since the second communication connection switches 311 and 411 are short-circuited, each accessory receives the subprocess start information. Each intermediate accessory that has received the subprocess start information opens its own second communication connection switch. Thereby, only the intermediate-accessory controller 309 is connected to the camera controller 205, and the camera controller 205 can receive the data to be transmitted. The intermediate-accessory controller 409 can receive the data transmitted by the camera controller 205 when the intermediate-accessory controller 309 that has completed processing the received data short-circuits the second communication connection switch 311. The intermediate accessory 30 having short-circuited the second communication connection switch does not respond to the transmission information of the camera controller 205 until this subprocess end information transmitted by the camera controller 205 is received in S522 when this subprocess ends.

In this embodiment, even when the intermediate accessory 30 operates in the safe mode, the camera body 20 and the intermediate accessory 30 do not end this subprocess, and perform the initial communication with accessories connected via the intermediate accessory 30. However, when an accessory operating in the safe mode is attached, the initial communication with the attached accessory may not be performed via that accessory. For example, when the operation state of the intermediate accessory 30 is the safe mode, the intermediate-accessory controller 309 does not short-circuit the second communication connection switch 311 even if the processing on the received data is completed. Then, the subprocess may be ended immediately by transmitting the authentication information to the camera controller 205 by setting the terminal information to the "terminal".

The camera controller 205 can sequentially communicate with a plurality of accessories since the intermediate accessory 40 acts similarly.

In S504 and S505, since the second communication connection switch 311 is open, the intermediate accessory 40 and the lens controller 113 do not receive the information transmission request transmitted from the camera controller 205 in S502.

In S506, the intermediate-accessory controller 309 transmits the authentication information of the intermediate accessory 30 to the camera controller 205 through the second communication. Then, it short-circuits the second communication connection switch 311. Thereby, the intermediate-accessory controller 409 can receive data transmitted by the camera controller 205.

The camera controller 205 when receiving the authentication information of the intermediate accessory 30 in S507 proceeds to S508 and then stores the received authentication information.

As described above, when the authentication information of the intermediate accessory 30 is acquired in S502 to S508, the flow proceeds to S509. In S509, S511, and S513 to S515, the camera controller 205 acquires the authentication information of the intermediate accessory 40, as in S502, S503, and S506 to S508.

In S510, the intermediate-accessory controller 309 receives the authentication information request transmitted by the camera controller 205, but does not respond because it has not yet received the subprocess end information.

In S512, as in S504 and S505, since the second communication connection switch 411 is open, the lens controller 113 does not receive the information transmission request transmitted from the camera controller 205 in S509.

While the first embodiment is an example in which totally three accessories or one interchangeable lens and two intermediate accessories are connected, only one intermediate accessory may be connected or three or more intermediate accessories may be connected. Since any number of intermediate accessories may be attached, the accessory information acquisition processing may be terminated by acquiring the accessory end information.

The terminal information of the accessory may be obtained by another method. For example, similar to S502 and S509, when the camera controller 205 transmits an authentication information request on the assumption that the intermediate accessory is attached, the terminal information returned from the second lens communicator 115 may notify it of the interchangeable lens. Alternatively, the intermediate accessory 40 may detect that it is the terminal based on the connection state of the unillustrated terminals or the like and notify the camera body 20 of the fact in S513. This embodiment describes that the terminal information is notified by the lens controller 113 returning the authentication information including the terminal information in response to the authentication information request from the camera controller 205.

In S516, as in S502 and S509, the camera body 20 transmits an authentication information request (corresponding to the second transmission request) in the second communication. In S517 and S518, the intermediate accessory 30 and the intermediate accessory 40 do not respond because they do not receive the subprocess end information, similar to S510.

The lens controller 113 when receiving the authentication information request in S519 proceeds to S520 and transmits the authentication information to the camera controller 205 through the second communication.

Referring now to FIG. 9E, a description will be given of the authentication information that the lens controller 113 transmits to the camera controller 205. The authentication information includes the identification information (as illustrative second information), the operation state information, the correction processing necessity information, and the terminal information.

Since the interchangeable lens 10 is not an intermediate accessory, the correction of the optical information of the interchangeable lens 10 does not become necessary by its attachment. Thus, the correction processing necessity information is information indicating that the correction processing is unnecessary.

Since the interchangeable lens 10 according to this embodiment is the terminal of the second communication when viewed from the camera body 20, the terminal information is information indicating that the interchangeable lens 10 is the terminal of the second communication.

When the camera controller 205 acquires the authentication information in S521, the flow proceeds to S522 and the series of initial communication processing end.

While the correction processing necessity information may be acquired as in this embodiment for shortening the communication processing, it is determined that correction processing is necessary for all intermediate accessories when the correction information necessity information is not communicated.

The subprocess S304 ends with S522.

This embodiment describes processing using means for sequentially communicating with a plurality of accessories using the second communication connection switch. However, other means may be used as long as it can communicate with a plurality of accessories. For example, detecting the voltage level of the unillustrated terminal connected to the accessory itself can provide information of what number it is attached from the camera body side. In that case, the number of information transmission requests transmitted from the camera is counted, and the information is transmitted to the camera body only when it matches its mounting order.

<Subprocess S307 (FIGS. 6A and 6B) for Determining the First Accessory>

Figure 6B:
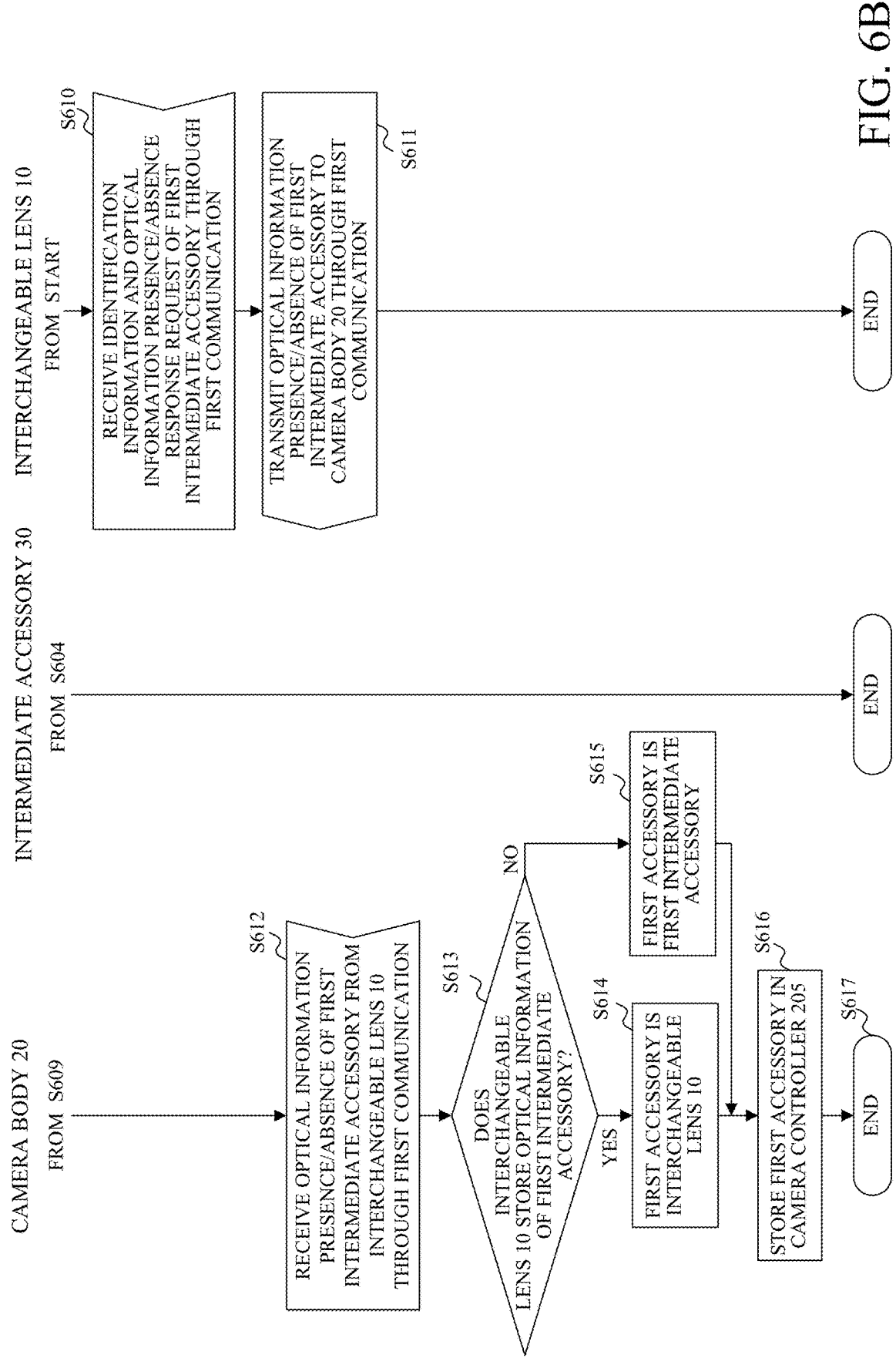

Referring now to FIGS. 6A and 6B, a description will be given of the flow of the subprocess S307 in which the camera body 20 searches for the first accessory among the accessories relating to the correction through the communication according to the first embodiment.

FIGS. 6A and 6B illustrate the flow of the subprocess S307 in which the camera controller 205 determines the first accessory among the accessories relating to the optical correction in the camera system according to the first embodiment. Now assume that the camera controller 205 stores none of optical information of the interchangeable lens 10, the intermediate accessory 30, and the intermediate accessory 40. Also assume that the correction processing necessity information of the intermediate accessory 30 and that of the intermediate accessory 40 are both "necessary".

When the subprocess starts in S601, the flow proceeds to S602.

After the flow transfers to S602, the camera controller 205 transmits the identification information on the intermediate accessory 40 and an optical information presence/absence response request of the intermediate accessory 40 to the intermediate-accessory controller 309 through the second communication, and inquiries it about whether or not it stores the optical information of the intermediate accessory 40. For example, when the identification information of the intermediate accessory is added to the top communication data and the accessory refers to the value of the top transmission data, the accessory may determine whether it is a communication addressed to it.

When the intermediate-accessory controller 309 receives the identification information on the intermediate accessory 40 and the optical information presence/absence response request of the intermediate accessory 40 in S603, the flow proceeds to S604.

In S604, the intermediate-accessory controller 309 transmits, to the camera controller 205 through the second communication, information on whether or not the optical information of the intermediate accessory 40 is stored.

When the camera controller 205 receives the presence or absence of the optical information of the intermediate accessory 40 from the intermediate accessory 30 in S605, the flow proceeds to S606.

In S606, the camera controller 205 determines an intermediate accessory (also referred to as a first intermediate accessory) having the optical information of another intermediate accessory.

If the intermediate-accessory controller 309 stores the optical information of the intermediate accessory 40, the flow proceeds to S607 and the camera controller 205 determines that the intermediate accessory 30 is the first intermediate accessory.

If the intermediate-accessory controller 309 does not store the optical information of the intermediate accessory 40, the flow proceeds to S608 and the camera controller 205 determines that the intermediate accessory 40 is the first intermediate accessory and stores the optical information of the intermediate accessory 30.

Even if three or more intermediate accessories are attached, the first intermediate accessory can be determined as well. For example, when three accessories are attached, processing similar to S602 to S605 is performed between the two accessories. If the first intermediate accessory is found, the flow proceeds to S609.

After transferring to S609, the camera controller 205 sends the identification information and the presence/absence response request (third instruction information) of optical information (fourth information) of the first intermediate accessory determined in S607 or S608 to the lens controller 113 through the first communication. In other words, it inquires about whether the optical information of the first intermediate accessory is stored.

When the lens controller 113 receives the identification information and the optical information presence/absence response request of the first intermediate accessory in S610, the flow proceeds to S611 and information about whether the optical information of the first intermediate accessory is stored is sent to the camera controller 205 through the first communication.

When the camera controller 205 receives the presence or absence of optical information of the first intermediate accessory from the interchangeable lens 10 in S612, the flow proceeds to S613, and the lens controller 113 determines whether the optical information of the first intermediate accessory is stored. Thereby, the first accessory is determined.

If the camera controller 205 determines that the lens controller 113 stores the optical information of the first intermediate accessory, the flow proceeds to S614. In S614, it is determined that the interchangeable lens 10 is the first accessory, and stores the optical information of the intermediate accessory 30 and the intermediate accessory 40. If the camera controller 205 determines that the lens controller 113 does not stores the optical information of the first intermediate accessory, the flow proceeds to S615.

In S615, the camera controller 205 determines that the first intermediate accessory is the first accessory.

When the first accessory is determined in S614 or S615, the flow proceeds to S616 and the camera controller 205 stores the identification information and the accessory type of the first accessory. When the first accessory is stored, the flow transfers to S617 and the subprocess S307 ends.

<Effect of First Embodiment>

As described above, the first embodiment independently includes the first communication path through which the camera and the interchangeable lens can communicate with each other and the second communication path through which the camera and the accessories can communicate with each other. Then, a unit for correcting the optical information of the interchangeable lens is determined based on the identification information and the intermediate accessory correction processing necessity information of each unit acquired by the communications using the respective communication paths. Thereby, this embodiment can perform the communication at intended timings among the units of the imaging apparatus, the interchangeable lens, and the intermediate accessory while appropriately correcting the optical information of the interchangeable lens.

Second Embodiment

The first embodiment describes the method of correcting the optical information of the interchangeable lens based on the optical information of the intermediate accessory in the startup sequence just after the interchangeable lens is mounted. The second embodiment describes a method of correcting optical information of the interchangeable lens when the optical system in the accessory dynamically changes by operating the operation member provided in the accessory.

An example in which the optical system of the accessory is dynamically changed by operating the operation member provided in the intermediate accessory includes a magnification varying lens having a variable magnification, an ND filter having a variable transmittance, and the like.

When the interchangeable lens is attached and the current optical system is determined, the second embodiment performs the processing described in the first embodiment. Thereby, the camera controller 205 recognizes a unit for storing the optical information of all accessories among the interchangeable lens 10, the camera body 20, and the intermediate accessories 30 and 40.

Assume that the camera controller 205 recognizes an accessory whose optical system is dynamically changeable through the identification information of the accessory acquired by the operation as in the first embodiment.

Hereinafter, an accessory whose correction processing necessity information is "necessary", in which the optical information dynamically changes, will be expressed as a dynamic intermediate accessory. An intermediate accessory whose optical information does not dynamically change and whose correction processing necessity information is "unnecessary" will be referred to as a static intermediate accessory. An interchangeable lens in which optical information dynamically changes will be referred to as a dynamic lens, and an interchangeable lens in which optical information does not dynamically change will be referred to as a static lens.

This embodiment describes the intermediate accessories 30 and 40 mounted between the camera body 20 and the interchangeable lens 10, but is applicable even if only one of the intermediate accessories is mounted.

<Searching Processing of Dynamic Accessory (FIG. 7)>

Figure 7:
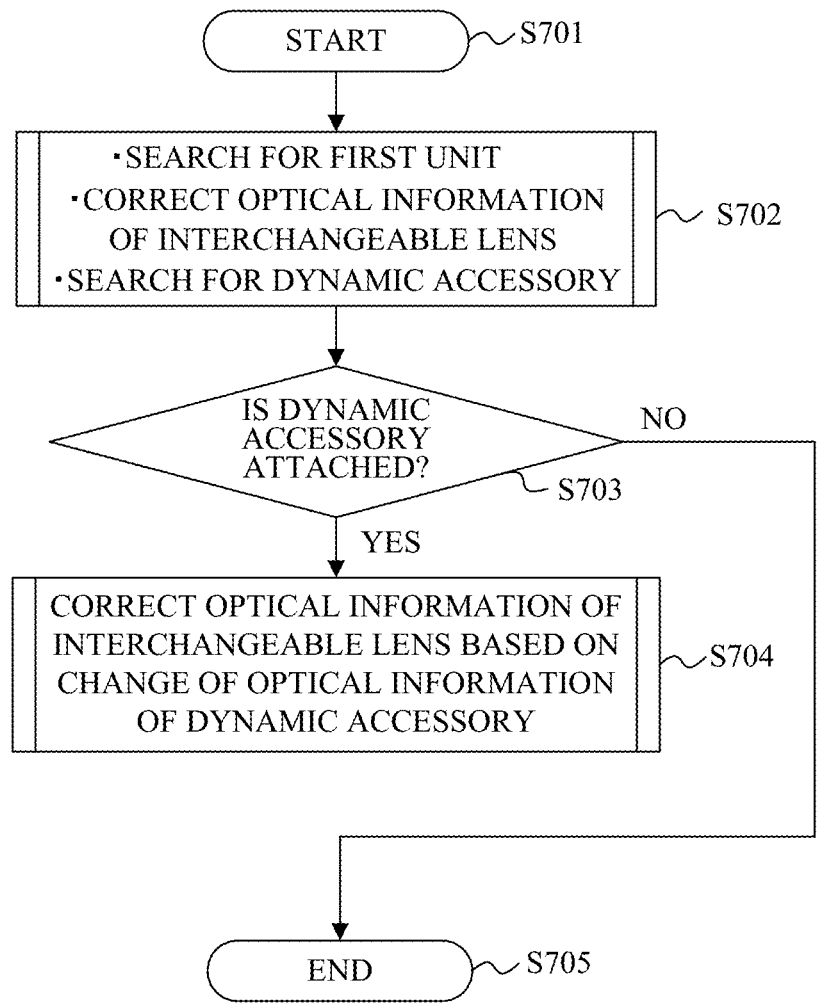
FIG. 7 is a flowchart showing a processing flow for searching for a dynamic accessory according to a second embodiment.

FIG. 7 illustrates the relationship between the first embodiment and this embodiment. When the camera system starts in S701, the flow transfers to S702.

In S702, the camera controller 205 executes the processing illustrated in FIG. 3 or such as the initial communication, the determination of the first unit, and the correction of the optical information of the interchangeable lens. The initial communication acquires, from the interchangeable lens 10 and the intermediate accessories 30 and 40, information (also referred to as dynamic accessory information) corresponding to whether or not the optical system dynamically changes. For example, the camera controller 205 transmits a transmission request to the accessory at the timing when the identification information is acquired in S402 in FIG. 4 and S502 and S509 in FIGS. 5A and 5B for the information of whether or not the optical system dynamically changes, and the accessory transmits the dynamic accessory information in response to the transmission request. The authentication information may be included in the dynamic accessory information, and the camera controller 205 may acquire the authentication information including the moving body accessory information in response to the transmission request of the authentication information transmitted to the accessory. The camera controller 205 may determine whether the accessory is a dynamic accessory or not from the identification information of the accessory acquired in S702 without separately acquiring the dynamic accessory information. In this case, the memory (not shown) of the camera controller 205 may be configured to store information (such as a table) indicating the correspondence relationship between the identification information of the accessory and whether or not the optical system dynamically changes. Thereby, the camera controller 205 can determine whether the accessory is a dynamic accessory based on the identification information of the accessory.

When the subprocess S702 ends, the flow proceeds to S703.

In S703, the camera controller 205 determines whether the dynamic accessory is attached based on the above dynamic accessory information. More specifically, when the camera controller 205 acquires the information indicating that the optical system dynamically changes as dynamic accessory information from any of the accessories, the camera controller 205 determines that the dynamic accessory is attached. When the camera controller 205 does not acquire the information indicating that the optical system dynamically changes as the dynamic accessory information, the camera controller 205 determines that the dynamic accessory is not attached. If the dynamic accessory is attached, the flow proceeds to S704.

In S704, the camera controller 205 executes the subprocess for correcting the optical information of the interchangeable lens based on the change in the optical information of the dynamic accessory. When the dynamic accessory is not attached or when the dynamic accessory is not operated, it is unnecessary to correct the optical information of the interchangeable lens and thus the flow proceeds to S705 to complete the optical correction processing of the interchangeable lens.

<Correction Processing of Optical Information According to Operation of Dynamic Accessory (FIGS. 8A and 8B)>

Figure 8A:
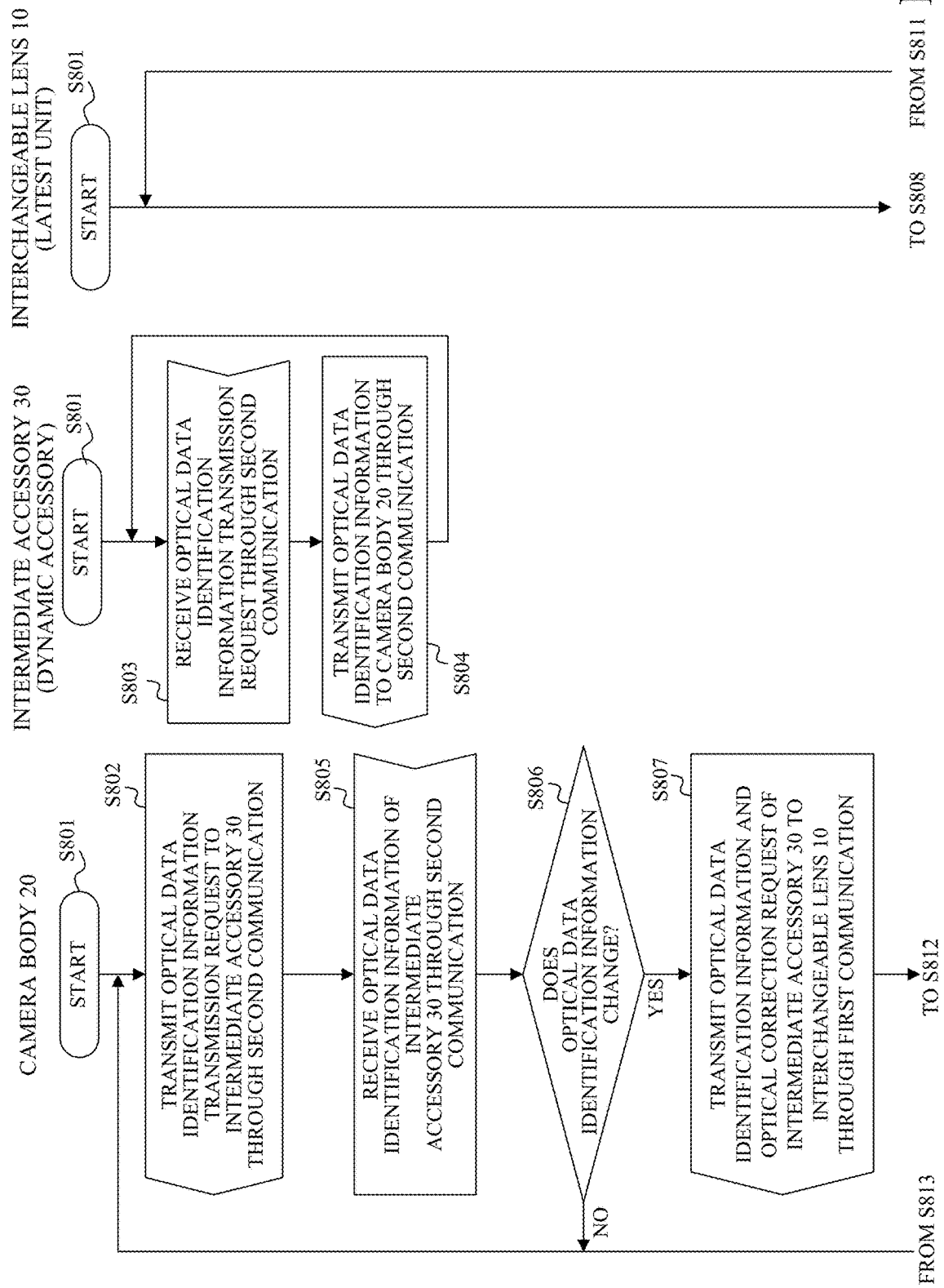
FIGS. 8A and 8B illustrate a flowchart of a flow of optical information correction processing in accordance with an operation of the dynamic accessory according to the second embodiment.
Figure 8B:
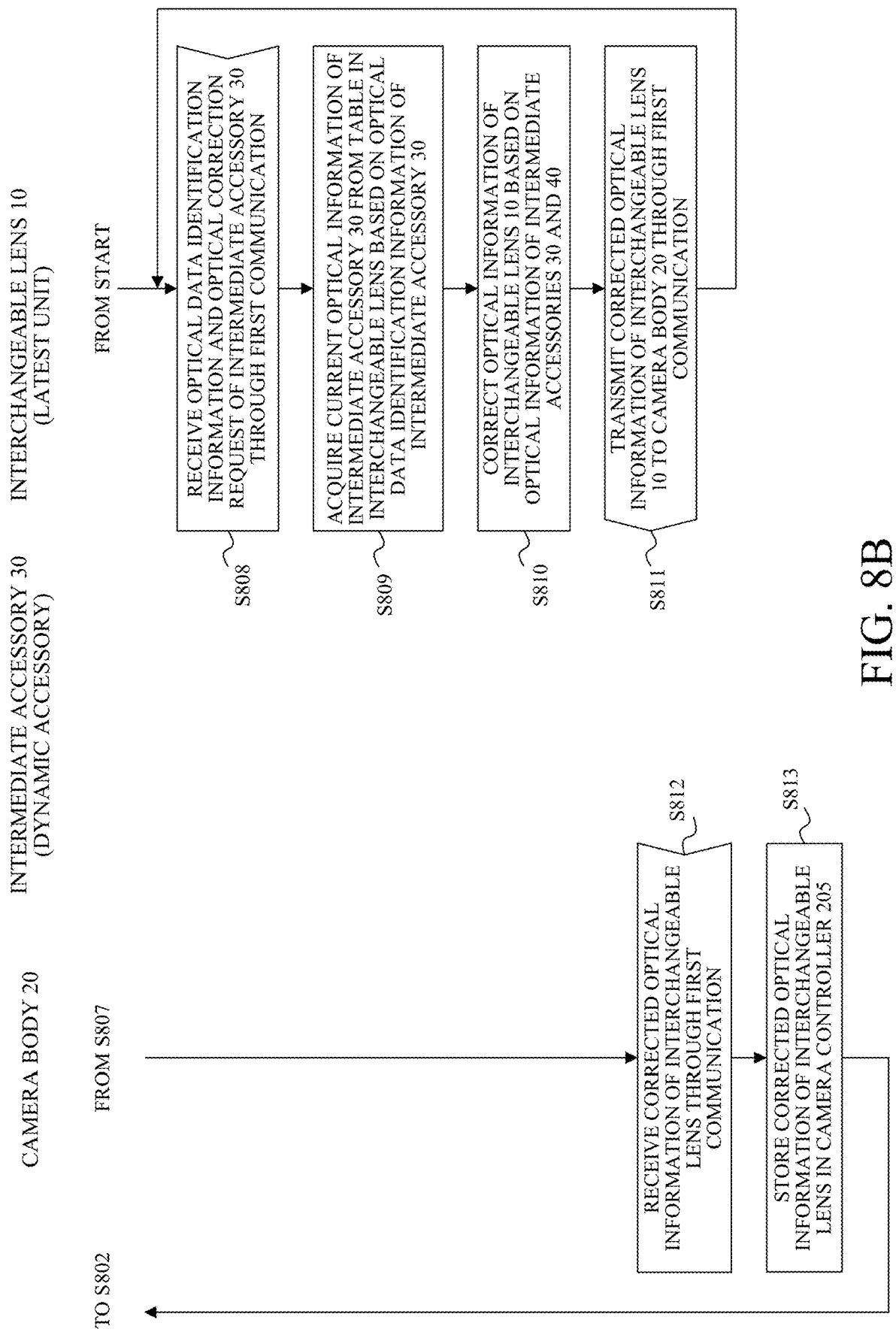

Referring now to FIGS. 8A and 8B, a description will be given of the subprocess S704 for correcting the optical information of the interchangeable lens based on the change of the optical information according to the operation of the dynamic accessory according to the second embodiment of the present invention.

In the subprocess illustrated in FIGS. 8A and 8B, the intermediate accessory 30 is a dynamic accessory, the interchangeable lens 10 is a first unit and a static lens, and the intermediate accessory 40 is a static intermediate accessory. In other words, assume that the camera controller 205 and the lens controller 113 have recognized as such in S702 of FIG. 7.

When the sequence starts in S801, the flow proceeds to S802.

In S802, the camera controller 205 transmits an optical data identification information transmission request to the intermediate-accessory controller 309 of the intermediate accessory 30 as the dynamic accessory through the second communication.

The intermediate-accessory controller 309 when receiving the optical data identification information transmission request in S803 proceeds to S804 and transmits the optical data identification information to the camera controller 205 through the second communication.

The optical data identification information of the dynamic accessory is information relating to the correction parameter of the optical information of the interchangeable lens 10, such as the current optical information in this embodiment. For example, if the intermediate accessory has a magnification varying lens, it is the information on the current magnification. For example, when the intermediate accessory has an ND filter, it is the information for correcting the current optical path length. The optical data identification information may be other information as long as the first unit can recognize the optical state of the dynamic accessory. It may be information of a plurality of available states added to information such as a model number (ID) used for the type (model) identification, or optical data identification information indicating dynamically changing optical data. It may be information indicating the function of the accessory or information such as a production number (serial number) that can identify an individual in the same model.

When the camera controller 205 receives the optical data identification information in S805, the flow proceeds to S806.

In S806, the camera controller 205 determines whether the optical information of the intermediate accessory 30 has changed based on the optical data identification information. For example, the optical information of the intermediate accessory 30 received in the initial communication in S702 is compared with the optical data identification information received in S805. If the optical information has not changed, the flow returns to S802, and the camera controller 205 retransmits an optical data identification information transmission request after a predetermined time has elapsed.

If the camera controller 205 determines that the optical information of the intermediate accessory 30 has changed in S806, the flow proceeds to S807 as a process for correcting the optical information of the optical lens.

A means for the camera controller 205 to recognize a change in the optical information of the dynamic accessory, as in S802, 803, 804, 805, and S806, may receive the presence or absence of change in optical information by performing a communication with the dynamic accessory at a constant period by polling.

An interrupt signal may be received from the dynamic accessory when the optical information of the dynamic accessory changes. For example, assume that the intermediate accessory 30 as a dynamic accessory has an operation member that changes the optical information of the intermediate accessory 30. Then, an interrupt signal may be transmitted from the intermediate-accessory controller 309 described later to the camera controller 205 upon detection of the operation of the operation member. After the camera controller 205 receives an interrupt signal from the intermediate-accessory controller 309 and determines that the optical data identification information has changed in S806, the above S802, 803, 804, 805 may be executed.

The optical data identification information in which a change is reflected may be communicated as in S802, 803, 804, and 805. Alternatively, only the change of the optical data identification information may be notified to the camera controller 205, and the camera controller 205 may calculate the current optical data identification information and start the communication.

After transferring to S807, the camera controller 205 transmits to the lens controller 113 of the interchangeable lens 10 as the first unit, the optical data identification information of the intermediate accessory 30 and the correction request of the optical information (also referred to as an optical correction request) of the interchangeable lens 10 through the first communication.

When the lens controller 113 receives the optical data identification information of the intermediate accessory 30 and the optical correction request in S808, the flow proceeds to S809.

In S809, the lens controller 113 acquires the current optical information of the intermediate accessory 30 from the table in the lens controller 113 based on the optical data identification information of the intermediate accessory 30, and proceeds to S809.

In S810, the optical information of the interchangeable lens 10 is corrected based on the optical information of the intermediate accessory 40 as the static intermediate accessory and the optical information of the intermediate accessory 30, which are acquired in the subprocess S702.

When the correction is completed, the lens controller 113 transmits the corrected optical information of the interchangeable lens 10 to the camera controller 205 through the first communication in S811.

When the optical information of the interchangeable lens corrected by the camera controller 205 is received in S812, the flow proceeds to S813 and the optical information is stored in the camera controller 205.

When S813 ends, the flow returns to S802 to again monitor the change in the optical information of the dynamic accessory.

This embodiment describes one of the intermediate accessories as a dynamic accessory and the interchangeable lens 10 as a first unit. Even when there are a plurality of dynamic accessories or when the first unit is a unit other than the interchangeable lens, the correction processing can be performed similarly.

If the first unit recognizes that only the first unit is the dynamic accessory, the optical correction may be performed when it recognizes that its own optical information has changed, and the optical data of the interchangeable lens 10 that has undergone the optical correction may be transmitted to the camera body 20.

The correction processing of the optical information of the interchangeable lens 10 is performed not only based on the optical information of the dynamic accessory acquired in S805 but also based on the optical information of the static intermediate accessory like the optical information of the intermediate accessory 40 of S810. When the static intermediate accessory is attached, it is pre-corrected by the optical information of the static intermediate accessory, and when the optical information dynamically changes, the final correction processing may be performed by the optical information of the dynamic accessory.

<Effect of Second Embodiment>

As described above, in the second embodiment, the camera controller 205 detects a change in optical information of the intermediate accessory 30. Then, the camera body 20 transmits, to the lens controller 113, the information on the change of the optical information and a correction request of the optical information of the interchangeable lens 10. Then, the lens controller 113 corrects the optical information of the interchangeable lens 10 and transmits the optical information to the camera controller 205.

Thereby, even when the optical information of the accessory dynamically changes, the optical information of the interchangeable lens can be properly corrected.

Third Embodiment

This embodiment will focus on the optical data identification information indicating optical data unique to an accessory used as the intermediate accessory identification information.

A new model number is assigned to product-specific information such as model number (ID) as intermediate accessory identification information, if the new product accessory has the same optical system as the known accessory or is an accessory that can be corrected by the same correction method as the known accessory. Thus, when the optical information correction necessity of the interchangeable lens is determined based on the model number (ID) etc. and the model number (ID) is unknown, the lens optical information cannot be corrected based on the optical characteristic of the accessory.

Accordingly, this embodiment uses the optical data identification information as the intermediate accessory identification information. This embodiment tags the intermediate accessory identification information with the correction method. More specifically, a combination of the information on the correction method and the information on the correction parameter is set to optical data identification information. Such optical data identification information will be hereinafter referred to as correction identification information. The information on the correction method according to this embodiment is information corresponding to the optical member of the intermediate accessory, and the information on the correction parameter is information corresponding to the optical information of the intermediate accessory according to the optical characteristics of the optical member. For example, when the intermediate accessory is a magnification varying adapter having a magnification varying lens, the information on the correction method is information indicating a magnification varying lens, and information on the correction parameter is magnification information on the magnification varying lens.

The lens controller 113 may store the information on the correction method and the information on the correction parameter while tagging them with each other. If other information is necessary to correct the optical information, the other information may also be stored while it is tagged with the information on the correction method and the information on the correction parameter.

The information on the correction method and the information on the correction parameters are transmitted to the lens controller 113 via the camera controller 205. Thereby, even if it is newly necessary to make a correction for an intermediate accessory in which information having a different correction parameter, the existing unit (the interchangeable lens 10 in this embodiment) can make the correction by resetting the magnification information as the correction parameter.

Thus, the optical information of the interchangeable lens can be corrected with the optical data identification information based on the optical characteristics of the accessory. For example, if there is an optical system similar to that of an existing product or an accessory that can be corrected by the similar method as the existing product and the model number (ID) is unknown, the optical information of the interchangeable lens can be corrected.

When the correction identification information is used, it is inefficient to store a correction algorithm in each unit, so the correcting unit may be previously determined. This embodiment describes that the correcting unit is previously determined as the interchangeable lens. The correction method of the interchangeable lens using the correction identification information will be described. Where the first unit makes the correction as in the first and second embodiments, the correction identification information can be similarly used.

<Acquisition Processing of Corrected Optical Information According to Third Embodiment (FIG. 10)>

Figure 10:
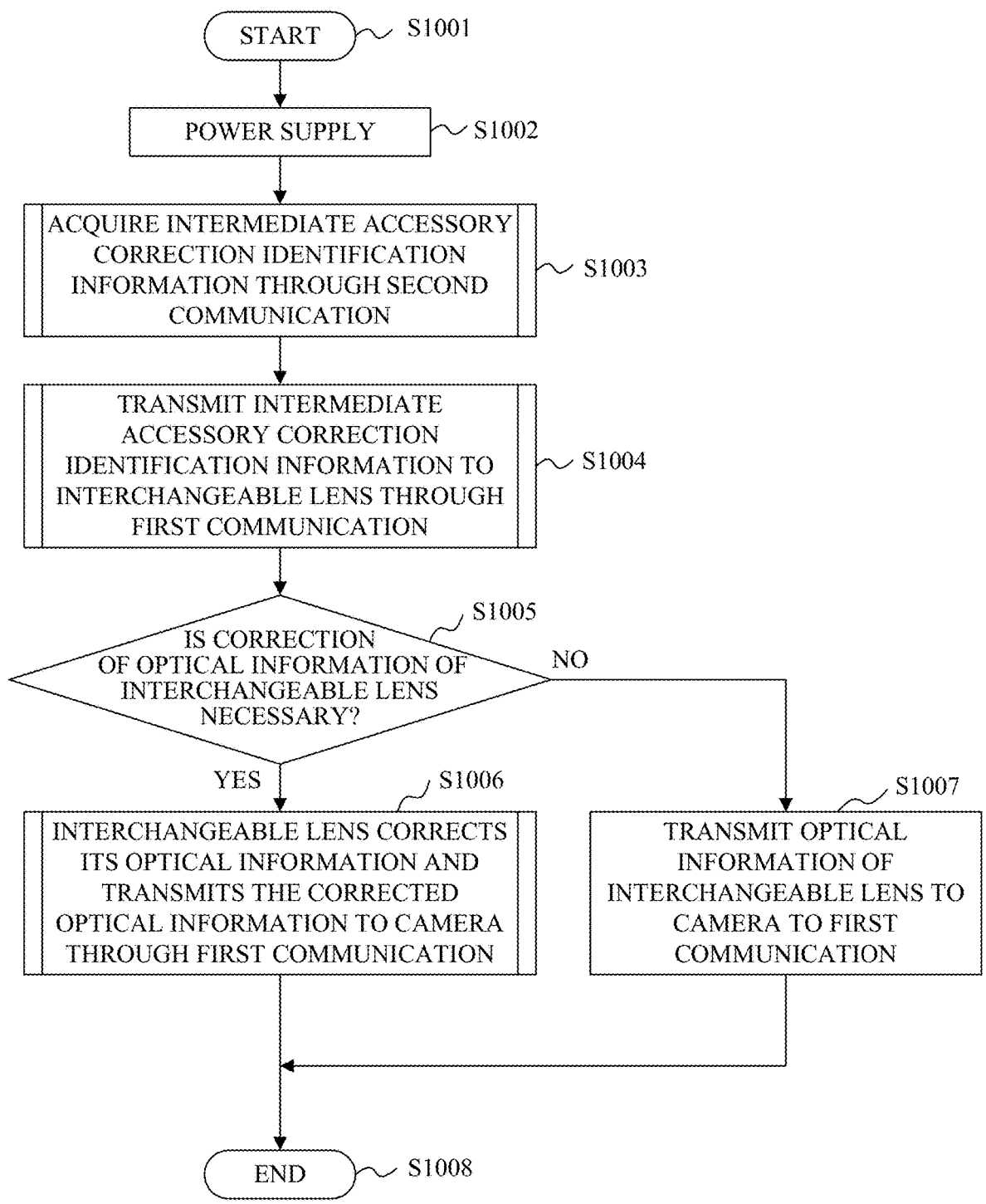
FIG. 10 is a flowchart showing a processing flow for acquiring correction identification information according to a third embodiment and correction processing using the correction identification information.

FIG. 10 illustrates a processing flow when the power is initially supplied after each accessory is mounted, in which the camera body 20 acquires correction information from each accessory, transmits it to the interchangeable lens 10 to request it for the correction, and acquires the corrected optical information of the interchangeable lens 10.

When the camera body 20 starts in S1001, the flow proceeds to S1002.

When the flow proceeds to S1002, the camera body 20 supplies the power to the interchangeable lens 10 and the intermediate accessories 30 and 40 via an unillustrated power supplying mount contact, and the flow proceeds to S1003.

The subprocess S1003 as the initial communication processing with the accessory through the second communication is substantially the same as the subprocess S304 in the first embodiment. In S1003, the above corrected identification information is acquired as identification information of the intermediate accessory.

When the correction authentication information of the accessory is acquired in S1003, the flow transfers to S1004.

After transferring to S1004, the camera controller 205 transmits the correction identification information on the intermediate accessory acquired in S1003 to the interchangeable lens 10, and requests it to correct the optical information. When the interchangeable lens acquires the correction identification information of the intermediate accessory, the flow proceeds to S1005.

After transferring to S1005, the interchangeable lens controller 113 determines whether it is necessary to correct its own optical information based on the intermediate accessory correction identification information. If the intermediate accessory whose optical information is to be corrected is attached, the flow proceeds to S1006.

In S1006, the interchangeable lens controller 113 corrects its own optical information based on the intermediate accessory correction identification information, and transmits the corrected optical information to the camera.

In S1005, if the intermediate accessory is not attached, or if all attached intermediate accessories are intermediate accessories that do not require correction of the optical information of the interchangeable lens, the correction processing is unnecessary, so the flow proceeds to S1007.

In S1007, the interchangeable lens controller 113 transmits its own optical information to the camera.

The transmission timing of the optical information in S1006 and S1007 may be just after the correction is completed, or may be a timing requested from the camera.

After the optical information is acquired in S1006 or S1007, the flow transfers to S1008 and the optical information acquisition sequence ends.

Thus, the camera system independently having the first communication path in which the camera and the interchangeable lens can communicate with each other and the second communication path in which the camera and the intermediate accessories can communicate with one another can properly correct the optical information of the interchangeable lens based on the optical information of the intermediate accessory.

The first embodiment illustrates an example in which the identification information of the accessory and the correction processing necessity information are included in the authentication information of the accessory. On the other hand, even if only the correction processing necessity information is added to the authentication information of the accessory and the correction processing necessity information indicates the correction "necessity", the correction processing necessity information may be separately acquired. Thereby, the communication amount can be reduced when the correction processing necessity information indicates the correction "unnecessary" as compared with the case where the correction identification information is acquired regardless of the correction processing necessity information. In this case, both the intermediate accessory identification information and the correction processing necessity information are acquired similar to the above embodiment. In other words, when the correction processing necessity information is the correction "necessary" and the correction identification information is separately acquired, both the intermediate accessory identification information and the correction identification information are acquired as the information for identifying the accessory. Thereby, the communication amount can be reduced where the correction processing necessity information indicates the correction "unnecessary", and the intermediate accessory identification information can be used for other applications irrespective of whether the correction processing necessity information is the correction "necessity" or "unnecessary".

When it is determined that the lens controller 113 does not store information corresponding to the information relating to the correction method based on the information relating to the correction method included in the correction identification information, a control may be made so as not to correct the optical information of the interchangeable lens 10.

<Effect of Third Embodiment>

As described above, the camera controller 205 acquires the information on the correction method and the information on the correction parameter from the intermediate-accessory controller 309, and transmits the information to the lens controller 113. Thereby, the lens controller 113 can correct the optical information based on the accessory if the correction method is known even for a new accessory.

Fourth Embodiment

The above embodiments describe the camera body 20 that acquires the identification information (also referred to as first lens identification information) of the interchangeable lens 10 as the authentication information of the interchangeable lens 10 in the initial communication performed with the interchangeable lens 10 through the first communication. The above embodiments describe the camera body 20 that acquires that identification information (also referred to as second lens identification information) of the interchangeable lens 10 as the authentication information of the interchangeable lens 10 in the initial communication performed with the accessory through the second communication. This embodiment focuses on the relationship between the first lens identification information and the second lens identification information.

As described above, the identification information of the interchangeable lens 10 and the accessory may be information such as a model number (ID) used to identify the type (model) of the corresponding unit. It may include information indicating the function of the interchangeable lens or information such as a production number (serial number) that can identify an individual in the same model.

In the camera system according to this embodiment, the interchangeable lens 10 can communicate with the camera body 20 through both the first communication and the second communication, and as described in the first embodiment, performs the initial communication with the camera body 20 through the first communication and the second communication. The interchangeable lens 10 transmits the identification information (the first lens identification information and the second lens identification information described above) of the interchangeable lens 10 to the camera body 20 in the initial communication through any of the first communication and the second communication.

At this time, the lens controller 113 may send the same information as the first lens identification information and the second lens identification information, but this embodiment intentionally sends information as the second lens identification information different from the first lens identification information to the camera controller 205. Thereby, the lens controller 113 effectively uses the second lens identification information transmitted to the camera controller 205 through the second communication.

The first lens identification information and the second lens identification information of this embodiment will be more specifically described. The first lens identification information is information that enables the type (model) of the interchangeable lens 10 to be identified, such as a model number (ID).

On the other hand, the second lens identification information is information different from the first lens identification information, such as information indicating that the interchangeable lens 10 is a lens. In this case, the second lens identification information is information that indicates that the interchangeable lens 10 is a lens but does not correspond to the type (model) of the interchangeable lens 10. Thus, for example, the second lens identification information can be made unique information regardless of the type (model) of the interchangeable lens 10.

Thus, in this embodiment, the lens controller 113 does not transmit the first identification information, which is to be transmitted in the initial communication through the first communication as the one-to-one communication between the camera body 20 and the interchangeable lens 10, through the second communication as the one-to-many communication between the camera body 20 and the accessories. The second communication transmits the information indicating the lens or information indicating the non-intermediate accessory to the camera controller 105 as the second identification information.

Selectively using the first lens identification information and the second lens identification information in this embodiment as described above, for example, can realize the following effects.

For example, the identification information acquired by the camera controller 205 from the lens controller 113 through the first communication is set to a system for the interchangeable lens, and the identification information acquired by the camera controller 205 from the controller of each accessory through the second communication can be set to a system for the intermediate accessories. This configuration can provide a camera system that has extensibility to the prospective intermediate accessories.

For example, it can also be used to grasp the number of intermediate accessory connections. This is because an accessory that transmits the identification information other than the second identification information to the camera controller 105 is not the interchangeable lens 10 and therefore it can be determined as an intermediate accessory.

When the number of intermediate accessory connections is known, for example, when a predetermined number or more of intermediate accessories are attached, a warning operation may be performed to the user, or the function of one of the intermediate accessories may be limited. This configuration can reduce the power consumption and maintain the communication quality. When a large amount of data such as the firmware upgrade is transmitted to the intermediate accessory, a transfer to the intermediate accessory firmware upgrade mode may be permitted only when it is determined that only one intermediate accessory is connected.

Determining that the interchangeable lens 10 is not the intermediate accessory but the lens can reduce the information to be transmitted from the lens controller 113 to the camera controller 105 in the initial communication through the second communication. For example, the lens controller 113 may not return the correction processing necessity information to the camera controller 105. This is because the correction of the optical information of the interchangeable lens 10 is not required by mounting of the interchangeable lens 10 that is not an intermediate accessory.

Alternatively, for example, whether the terminal accessory is an interchangeable lens or an intermediate accessory may be electrically determined and the determination result may be used for a comparison with the second identification information. A detailed description will be given below. The communication error can be determined by verifying the matching property with the hardware processing as described.

This embodiment describes an illustrative method of electrically discriminating whether the terminal accessory is an interchangeable lens or an intermediate accessory in the initial communication with the interchangeable lens or the intermediate accessory according to the first to fourth embodiments. Moreover, this embodiment describes the error processing where there is an unconformity to the terminal accessory through the second communication whose determination result is determined by the identification information acquired through the second communication.

<Configuration of Camera System According to Fourth Embodiment (FIGS. 12 and 13)>

A description will now be given of an illustrative method of electrically determining whether the terminal accessory is an interchangeable lens or an intermediate accessory. The determination is made in the initial communication through the second communication.

Figure 13:
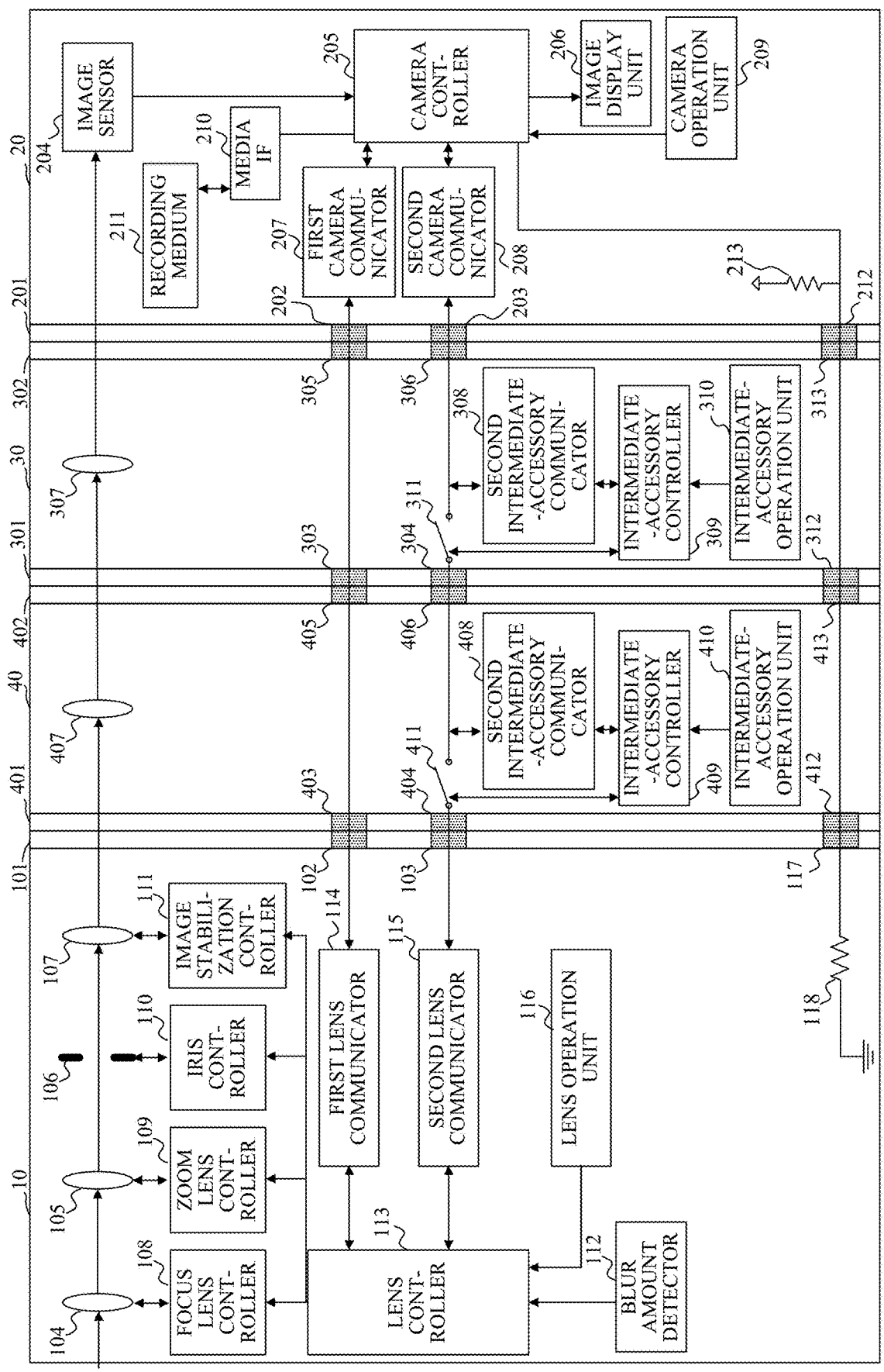
FIG. 13 is a block diagram for explaining a configuration of a camera system in which a terminal according to a fourth embodiment is an interchangeable lens.

A description will now be given of the configuration where the interchangeable lens 10 is attached to the terminal of the second communication. As illustrated in FIG. 13, the mount 201 of the camera body 20 includes an identification terminal 212. The mount 302 of the intermediate accessory 30 includes an identification terminal 313. The mount 402 of the intermediate accessory 40 includes an identification terminal 413, and the mount 401 includes an identification terminal 412. The mount 101 of the interchangeable lens 10 includes an identification terminal. Aline (also referred to as an identification line) connected via these identification terminals is connected to a resistor 118 provided in the interchangeable lens 10. This line is pulled up through a resistor 213 provided in the camera body 20. A value obtained by dividing the voltage level of the pull-up power supply by the resistance values of the resistors 118 and 213 is input to the camera controller 205.

Figure 14:
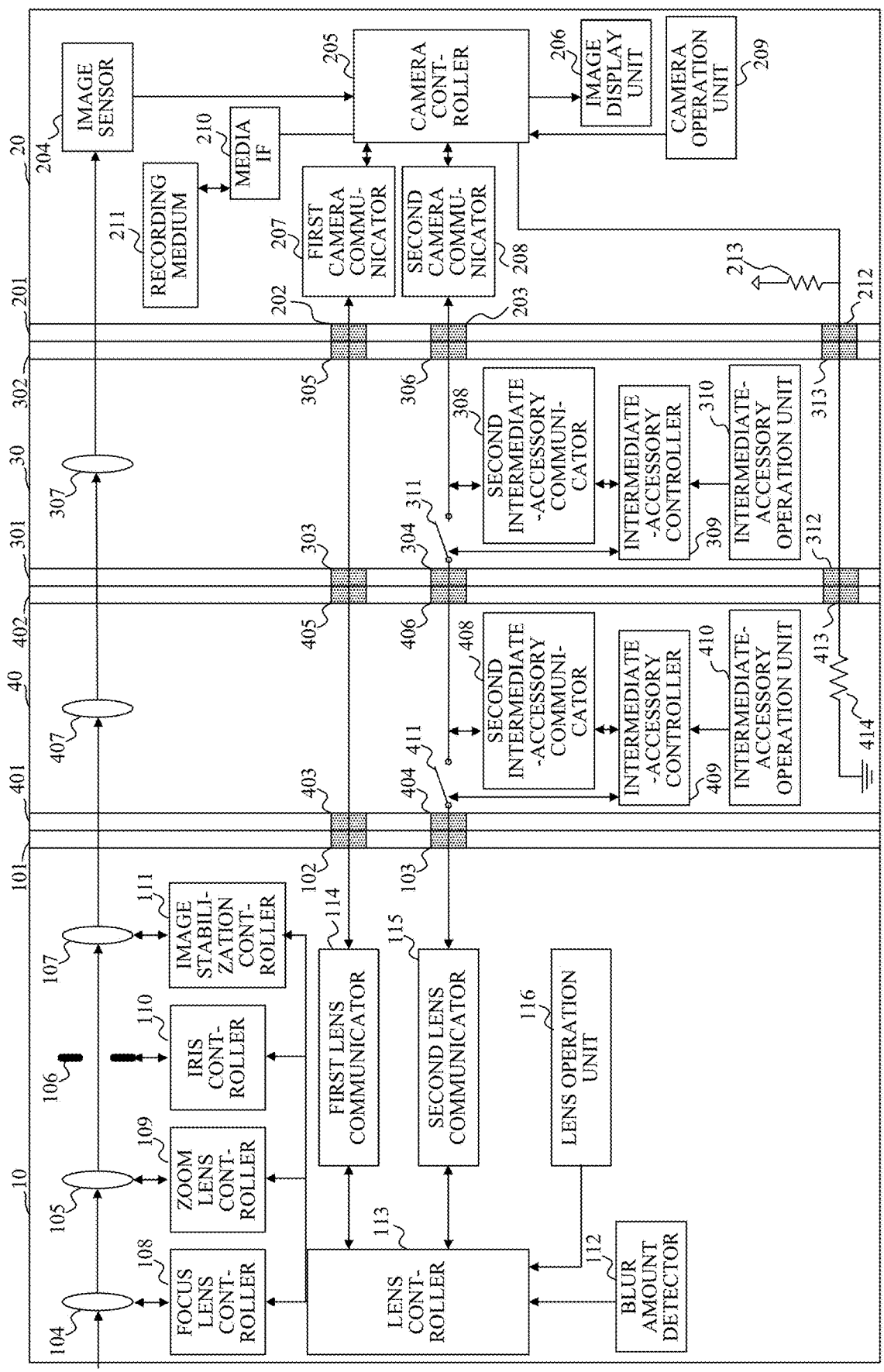
FIG. 14 is a block diagram for explaining a configuration of a camera system in which a terminal according to the fourth embodiment is an intermediate accessory.

Next follows a description of the configuration where the terminal of the second communication is the intermediate accessory 40. As illustrated in FIG. 14, as in the case where the terminal of the second communication is an interchangeable lens, the identification lines via the identification terminals 212, 313, 312, and 413 are connected to the resistor 414 provided to the intermediate accessory 40. The input to the camera controller 205 has a value obtained by dividing the voltage level of the pull-up power supply of the camera body 20 by the resistance values of the resistors 414 and 213.

Figure 15:
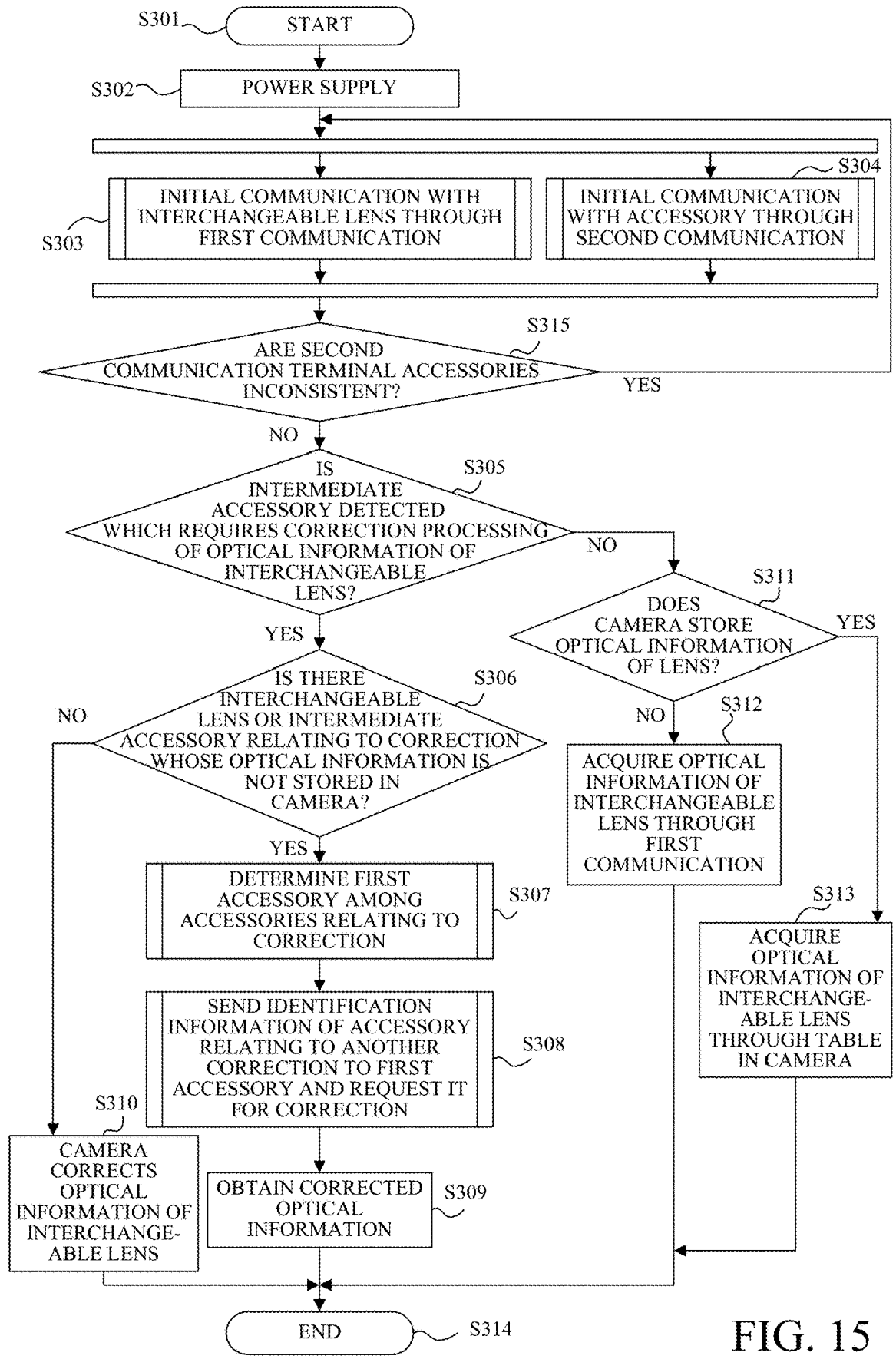
FIG. 15 is a flowchart showing a processing flow of detecting a communication error in the second communication according to the fourth embodiment.

<Second Communication Error Determination Method According to Fourth Embodiment (FIG. 15)>

Now assume that the resistor used for the interchangeable lens 10 and the resistor used for the intermediate accessory at the terminal have different resistance values in advance. Thereby, whether or not the terminal accessory is an interchangeable lens can be electrically determined, based on the level of the input signal via the identification terminal.

If the electrically determined terminal accessory is the interchangeable lens 10, the second identification information should be obtained as the identification information of the terminal accessory acquired by the initial communication through the second communication. On the other hand, when the electrically determined terminal accessory is the intermediate accessory, the identification information of the terminal accessory acquired in the initial communication through the second communication should be information different from the second identification information, and more specifically should be intermediate accessory identification information.

However, if there is any problems in the second communication, the above correspondence relationship may have a contradiction. Accordingly, if there is an inconsistency between the electrically determined terminal accessory and the identification information acquired through the second communication, it is determined that a communication error has occurred and the retry is performed from the initial communication for a more accurate communication.

Thus, whether the communication has been correctly performed through the second communication can be determined by comparing the electrical identification information with the identification information acquired through the second communication. Whether the acquired identification information is correct can be determined. Thereby, the communication error through the second communication can be detected.

<Effect of Fourth Embodiment>

As described above, in this embodiment, the second lens identification information is information different from the first lens identification information corresponding to the type (model) of the interchangeable lens 10 and information indicating that it is a lens. This configuration can improve, for example, the identification performance of the accessory that makes a communication through the second communication.

VARIATION

The above embodiment describes the first accessory as an accessory that stores the optical information of all other accessories among the accessories relating to the correction. However, it may be an accessory having the largest amount of optical information of each other among the accessories relating to the correction. Some accessories may not have the optical information. In that case, the missing optical information may be acquired from another unit.

In the initial communication of the above embodiment, the lens controller 113 transmits the identification information of the interchangeable lens 10 in S404 and S520. For example, the identification information transmitted in S520 may be the identification information indicating that the accessory is not an intermediate accessory.

In the initial communication in FIGS. 5A and 5B of the above embodiment, each accessory transmits a plurality of pieces of information as the authentication information to the camera controller 205, but may transmit only necessary information. In this case, the camera identifies the necessary information and sends an information request to each accessory.

Although the above embodiment describes two intermediate accessories, if three or more intermediate accessories provided, the first intermediate accessory may be set to one that stores all or more optical information of the other intermediate accessories among the plurality of intermediate accessories.

In the second embodiment, the dynamic accessory may correct the optical information of the interchangeable lens 10. In this case, the dynamic accessory may previously acquire the optical information of another accessory. When the dynamic accessory corrects the optical information of the interchangeable lens 10, the corrected optical information is transmitted to the camera body 20.

In the second embodiment, when there are a plurality of first accessories, the dynamic accessory may correct the optical information of the interchangeable lens 10.

The third embodiment describes that the camera body 20 corrects the optical information of the interchangeable lens 10. On the other hand, the optical information may be corrected in the interchangeable lens 10. In this case, the camera controller 205 transmits, to the lens controller 113, a request to correct the optical information of the interchangeable lens 10. At this time, the interchangeable lens 10 may acquire the optical information of the intermediate accessory from the camera body 20 or the intermediate accessory as necessary when the optical information of the intermediate accessory which needs the correction is insufficient.

The fourth embodiment describes an example in which the camera controller 205 acquires the information on the correction method and the information on the correction parameter from the intermediate-accessory controller 309 and transmits the two pieces of information to the lens controller 113. Where the intermediate accessory 30 is a dynamic intermediate accessory as described in the second embodiment and the information on the correction parameter is variable, the information on the correction parameter may be reacquired when the variation is detected. In other words, when the operation of the operation member of the intermediate accessory 30 is detected, the camera controller 205 acquires the information on the correction parameter from the intermediate-accessory controller 309 and transmits the information to the lens controller 113.

The first embodiment describes the clock synchronous communication as the first communication method, but may perform the asynchronous communication. The asynchronous communication will be described with reference to FIG. 12.

Figure 12:
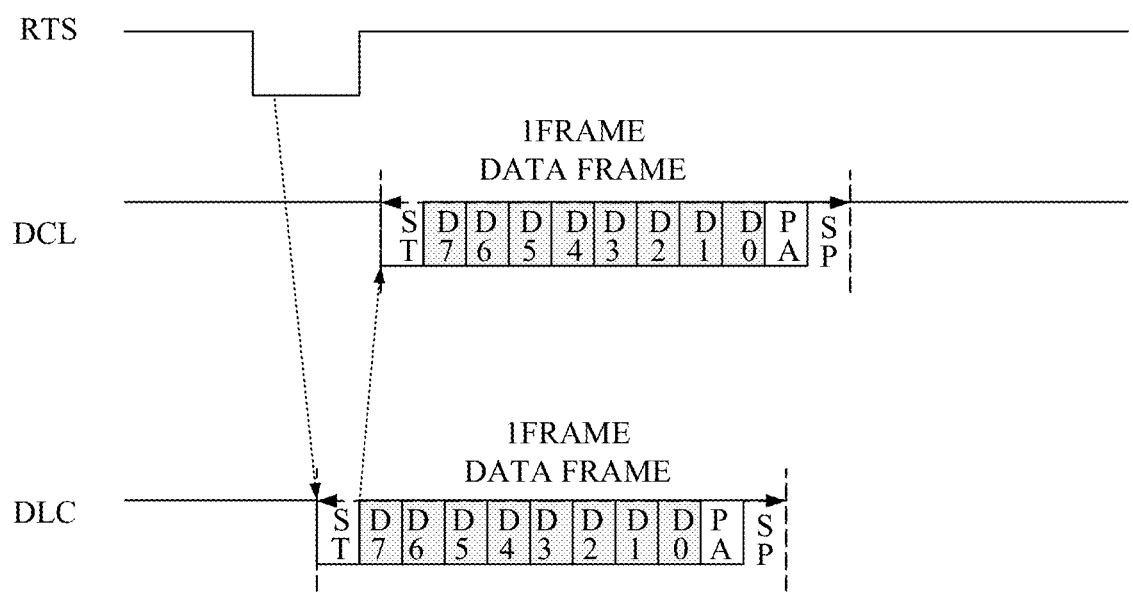
FIG. 12 is a diagram for explaining a variation of the first communication according to the first embodiment.

FIG. 2 illustrates the three-line clock synchronous communication. Instead, similar effects are available with the three-line asynchronous communication including three lines of the communication channel 1. FIG. 12 illustrates a signal waveform in the three-line asynchronous communication. The three-line asynchronous communication provides an RTS communication line (RTS) instead of the above clock communication line (LCLK). The RTS communication line is a signal line for transmitting a signal for controlling the communication timing by the camera-lens communication line (DCL) and the communication timing by the first lens-camera communication line (DLC) from the camera microcomputer 205 to the lens microcomputer 111. For example, it is used for a notice, such as a transmission request (transmission instruction) of the lens data from the camera microcomputer 205 to the lens microcomputer 111 and a switching request (switching instruction) of the communication processing described later. The notice on the transmission request channel is performed by switching the signal level (voltage level) on the transmission request channel between high (first level) and low (second level). The following description refers to the signal supplied to the RTS communication line as a transmission request signal RTS. The transmission request signal RTS is sent from the camera microcomputer 205 as the communication master to the lens microcomputer 111 as the communication slave. When the lens microcomputer 111 receives the transmission request RTS, the signal level of the lens data signal DLC is set low during a one-bit period to notify the camera microcomputer 205 of the transmission start of one frame of the lens data signal DLC. This one-bit period will be called a start bit ST indicating the start of one frame. In other words, the data frame starts with the start bit ST. The start bit ST is provided at the top bit of each frame of the lens data signal DLC. Next, the lens microcomputer 111 transmits the one-byte lens data during an 8-bit period from the next second bit to the ninth bit. The data bit arrangement starts with the most significant data D7 in the MSB first format, continues to data D6 and data D5 in this order, and ends with the least significant data D0. The lens microcomputer 111 adds one-bit parity information PA to the 10th bit, and sets high the signal level of the lens data signal DLC during the period of the stop bit SP indicating the end of one frame. Thereby, the data frame period started with the start bit ST ends.

Fifth Embodiment

A fifth embodiment will focus on the second communication in the above embodiment. A first communication as a "one-to-many" communication and a second communication as a "one-to-one" communication that will be described in this embodiment are executed in the second communication described in the above embodiments that is executed through the second communication path.

Figure 16:
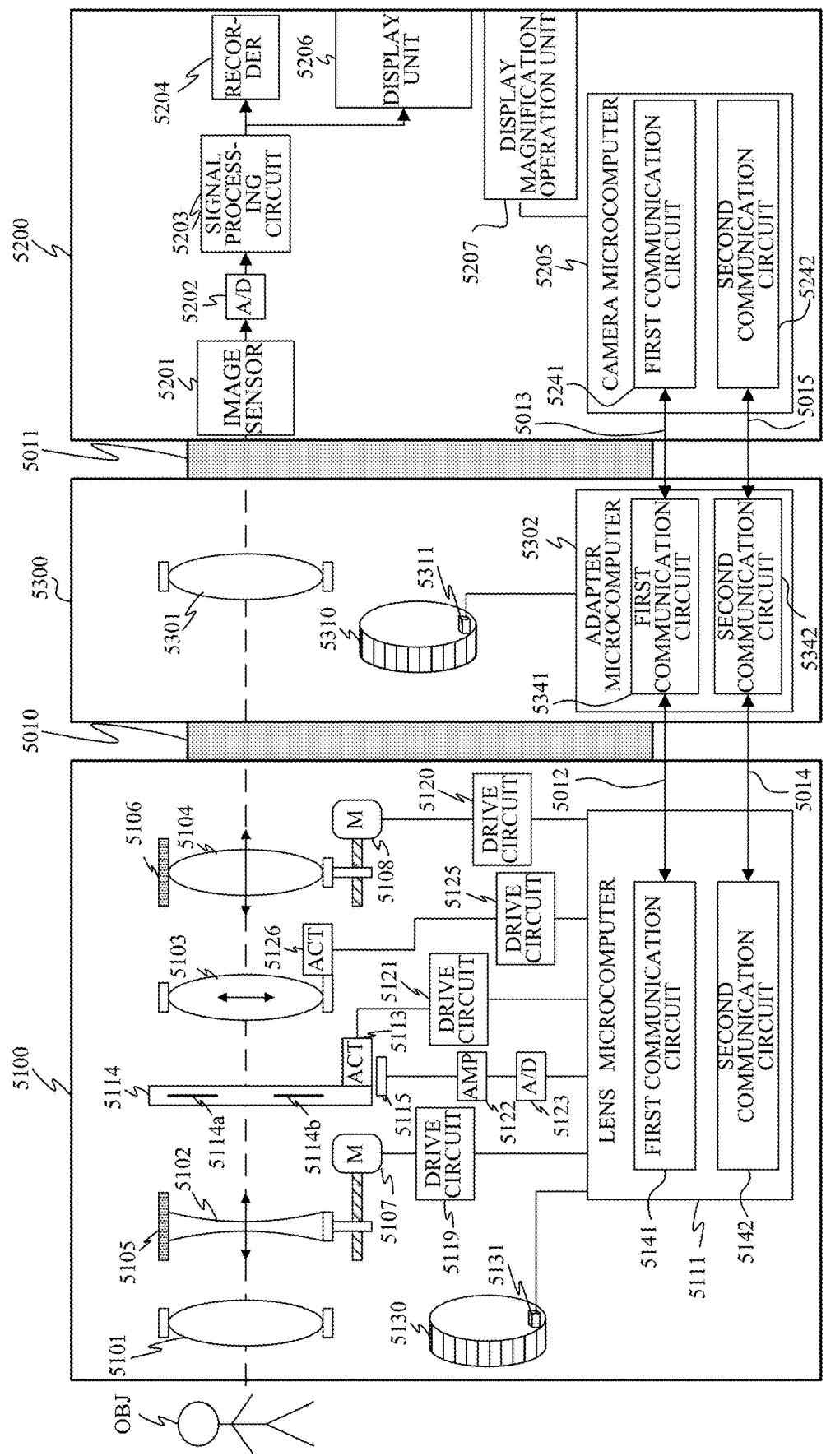
FIG. 16 is a block diagram showing a configuration of a camera system according to a fifth embodiment of the present invention including a camera body, an interchangeable lens, and an intermediate adapter.

FIG. 16 illustrates a configuration of a fifth embodiment according to the present invention. The fifth embodiment will describe an imaging system (referred to as a camera system hereinafter) in which a plurality of accessory apparatuses including an interchangeable lens 5100 and an intermediate adapter 5300 are detachably and communicably mounted on a camera body 5200 as an imaging apparatus.

The interchangeable lens 5100 may be attached directly to the camera body 5200 (without the intermediate adapter 5300), or two or more intermediate adapters may be attached between the camera body 5200 and the interchangeable lens 5100.

This camera system communicates a control command and internal information among the camera body 5200, the interchangeable lens 5100, and intermediate adapter 5300 using a plurality of communication circuits (communication paths). Moreover, this camera system can always perform the optimal communication in various situations by switching a plurality of communication circuits to the same communication mode in synchronization with each other according to the type of data to be communicated and the purpose of the communication.

The interchangeable lens 5100 and the intermediate adapter 5300 are mechanically and electrically connected via a mount 5010 that is a coupling mechanism. Similarly, the intermediate adapter 5300 and the camera body 5200 are mechanically and electrically connected via a mount 5011 that is a coupling mechanism. The interchangeable lens 5100 and the intermediate adapter 5300 acquire the power from the camera body 5200 via unillustrated power supply terminals provided on the mounts 5010 and 5011 respectively. Thereby, the power is supplied which is necessary for the operation of various actuators, lens microcomputers (referred to as lens microcomputer 5 hereinafter) 5111, and adapter microcomputer (referred to as adapter microcomputer 5 hereinafter) 5302 described later.

The interchangeable lens 5100, the camera body 5200, and the intermediate adapter 5300 perform the first communication as the "one-to-many" communication via communication terminal portions 5012 and 5013 provided to the mounts 5010 and 5011. In addition, the interchangeable lens 5100 and the camera body 5200 and the intermediate adapter 5300 perform the second communication different from the first communication through the communication terminal portions 5014 and 5015 provided to the mounts 5010 and 5011. The second communication is not the "one-to-many" communication but the "one-to-one" communication such as the clock synchronous serial communication or UART communication. This embodiment provides two types of communication of the first and second communication, but the number of types of communication may be three or more.

The interchangeable lens 5100 has an imaging optical system. The imaging optical system includes, in order from an object OBJ side, a field lens 5101, a zoom lens (magnification varying lens) 5102 that performs a magnification variation, a diaphragm unit 5114 that adjusts a light intensity, an image stabilization lens 5103, and a focus lens 5104 that performs focusing. The zoom lens 5102 and the focus lens 5104 are held by lens holding frames 5105 and 5106, respectively. The lens holding frames 5105 and 5106 are movably guided by an unillustrated guide shaft in the optical axis direction in which the optical axis (indicated by a broken line in the drawing) extends, and are driven in the optical axis direction by stepping motors 5107 and 5108. The stepping motors 5107 and 5108 move the zoom lens 5102 and the focus lens 5104 in synchronization with the drive pulse, respectively.

The image stabilization lens 5103 is shifted in a direction orthogonal to the optical axis of the imaging optical system by an image stabilization actuator 5126 such as a voice coil motor. Thereby, the image stabilization operation is performed to reduce an image blur caused by a camera shake such as a manual vibration. The diaphragm unit 5114 includes aperture blades 5114 a and 5114 b, and adjusts the light amount by driving them in the opening and closing direction through a diaphragm actuator 5113. The positions of the aperture blades 5114a and 5114b are detected by a Hall element 5115, and are input to the lens microcomputer 5111 via an amplifier circuit 5122 and an A/D converter circuit 5123.

The interchangeable lens 5100 has a lens electronic ring 5130 as an operation member. The lens electronic ring 5130 is rotatable by the user about the optical axis, and the rotational amount and direction of the lens electronic ring 5130 are detected by a rotation detector 5131 such as a photo-interrupter and input to the lens microcomputer 5111. The operation member may be a switch, a button, and a dial, or may be a touch panel, and the interchangeable lens 5100 may include a plurality of operation members.

A lens microcomputer 5111 as an accessory controller controls the operation of each component in the interchangeable lens 5100. The lens microcomputer 5111 receives a control command or a transmission request command transmitted from the camera body 5200 via the first lens communication circuit 5141 for performing the first communication or the second lens communication circuit 5142 for performing the second communication. The lens microcomputer 5111 performs a lens control corresponding to the control command, and transmits lens data (accessory data) corresponding to the transmission request command to the camera body 5200 via the lens first and second communication circuits 5141 and 5142. The lens microcomputer 5111 transmits corresponding lens data to the camera body 5200 according to the operation of each component in the interchangeable lens 5100. The lens first and second communication circuits 5141 and 5142 constitute an accessory communicator in the interchangeable lens 5100.

The lens microcomputer 5111 outputs a drive signal to a zoom drive circuit 5119 and a focus drive circuit 5120 according to a command relating to the magnification variation and focusing among the control commands and the operation of the operation member, thereby driving the stepping motors 5107 and 5108. This configuration provides the zoom control for controlling the magnification variation by the zoom lens 5102 and the focus control for controlling the focusing by the focus lens 5104.

The lens microcomputer 5111 drives an image stabilization actuator 5126 via an image stabilization drive circuit 5125 in accordance with an image stabilization related command among the control commands or a camera shake detected by a vibration sensor (not shown), such as a vibration gyro, provided in the interchangeable lens 5100. Thereby, the image stabilization control to control the shift driving of the image stabilizing lens 5103 is performed.

The lens microcomputer 5111 outputs a drive signal to the diaphragm drive circuit 5121 to drive the diaphragm actuator 5113 in accordance with a command relating to the light amount adjustment among the control commands or the operation of the operation member. Thus, light amount adjustment control for controlling the diaphragm unit 5114 is performed.

The intermediate adapter 5300 is, for example, a telephoto or wide-angle converter for changing a focal length, and includes a magnification varying lens 301 added to the imaging optical system and an adapter microcomputer (referred to as an adapter microcomputer 5 hereinafter) 5302. An intermediate adapter other than the telephoto or wide-angle converter, such as a mount converter that changes a flange back length, may be used.

The intermediate adapter 5300 has an adapter electronic ring 5310 as an operation member. The adapter electronic ring 5310 is rotatable by the user about the optical axis, and the rotational amount and direction of the adapter electronic ring 5310 are detected by a rotation detector 5311, such as a photo-interrupter, and input to an adapter microcomputer 5302. The operation member may be a switch, a button, and a dial, or may be a touch panel, and the intermediate adapter 5300 may include a plurality of operation members.

The adapter microcomputer 5302 as an accessory controller controls the operation of each component in the intermediate adapter 5300. The adapter microcomputer 5302 receives a control command or a transmission request command transmitted from the camera body 5200 via the first adapter communication circuit 5341 for performing the first communication or the second adapter communication circuit 5342 for performing the second communication. The adapter microcomputer 5302 performs an intermediate adapter control corresponding to the control command, or transmits adapter data (accessory data) corresponding to the transmission request command to the camera body 5200 via the first and second adapter communication circuits 5341 and 5342. The adapter microcomputer 5302 transmits corresponding adapter data to the camera body 5200 according to the operation of each component in the intermediate adapter 5300. The first and second adapter communication circuits 5341 and 5342 constitute an accessory communicator in the intermediate adapter 5300.

The camera body 5200 includes an image sensor 5201, such as a CCD sensor and a CMOS sensor, an A/D converter circuit 5202, a signal processing circuit 5203, a recorder 5204, a camera microcomputer (referred to as a camera microcomputer 5 hereinafter) 5205, and a display unit 5206.

The image sensor 5201 photoelectrically converts an object image formed by the imaging optical system and outputs an electrical signal (analog signal). The A/D converter circuit 5202 converts the analog signal from the image sensor 5201 into a digital signal. The signal processing circuit 5203 performs various types of image processing for the digital signal from the A/D converter circuit 5202 to generate an image signal. The signal processing circuit 5203 also generates, from the image signal, focus information indicating the contrast state of the object image (the focus state of the imaging optical system) and the luminance information indicating the exposure state. The signal processing circuit 5203 outputs the image signal to the display unit 5206. The display unit 5206 displays the image signal as a live-view image used for the confirmation of the composition, the focus state, and the like.

The camera microcomputer 5205 as a camera controller controls the operation of each component in the camera body 5200 according to an input from a camera operation member, such as an unillustrated imaging instruction switch and various setting switches. For example, the exposure time of the image sensor 5201 is controlled or the sensitivity of the A/D converter circuit 5202 is controlled for the exposure control.

The camera microcomputer 5205 transmits a control command and a transmission request command to the interchangeable lens 5100 and the intermediate adapter 5300 via the first camera communication circuit 5241 for performing the first communication or the camera second communication circuit 5242 for performing the second communication. For example, the camera microcomputer 5205 transmits a control command regarding a zoom control over the zoom lens 5102 to the interchangeable lens 5100 and the intermediate adapter 5300 in response to the operation of the unillustrated zoom switch. A control command relating to the light amount adjustment control according to the luminance information, and a control command relating to the focus control according to focus information are transmitted to the interchangeable lens 5100. The first and second camera communication circuits 5241 and 5242 constitute a camera communicator.

The camera microcomputer 5205 receives the lens data from the interchangeable lens 5100 and the adapter data from the intermediate adapter 5300. The camera microcomputer 5205 sends to the interchangeable lens 5100 and the intermediate adapter 5300 a control command relating to them in accordance with the lens data obtained through the first and second camera communication circuits 5241 and 5242 or the operation information of the operation member included in the adapter data.

The camera microcomputer 5205 transmits a transmission request command for acquiring the control information and status information to the interchangeable lens 5100 and the intermediate adapter 5300 as necessary.

Figure 17:
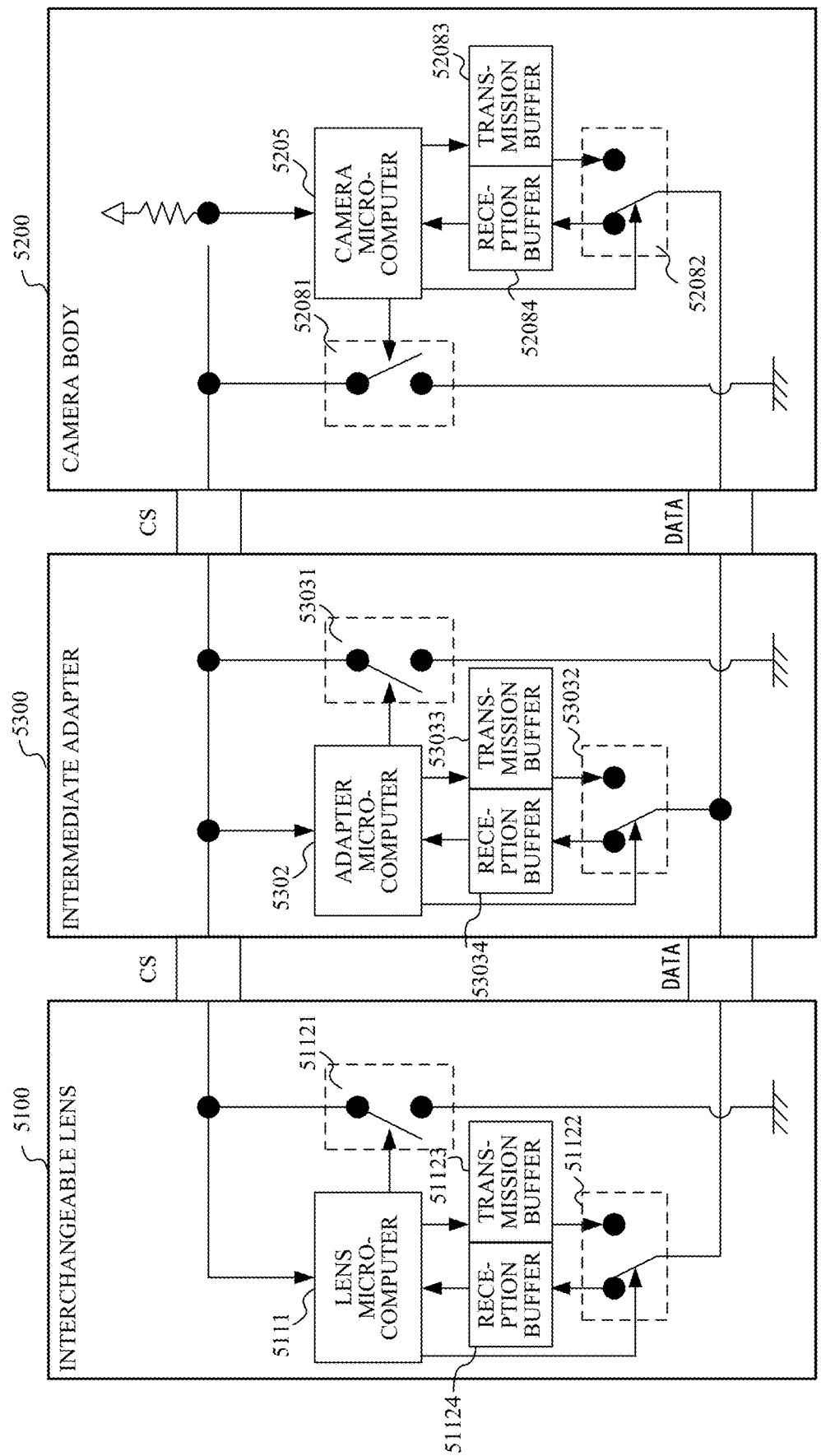
FIG. 17 illustrates a configuration of a first communication circuit in the camera system according to the fifth embodiment.

Referring now to FIG. 17, a description will be given of a communication circuit for performing first communication ("one-to-many" communication) among the camera body 5200 and the interchangeable lens 5100 and the intermediate adapter 5300. The communication circuit described below is merely illustrative, and may use a configuration other than the following configuration as long as it is configured to provide the "one-to-many" communication.

The first communication is performed by the camera microcomputer 5205 via the first camera communication circuit 5241, by the lens microcomputer 5111 via the first lens communication circuit 5141, and by the adapter microcomputer 5302 via the first adapter communication circuit 5341. The first camera communication circuit 5241, the first lens communication circuit 5141, and the first adapter communication circuit 5341 provide the first communication through the signal line (CS and DATA described later) connected via communication terminal portions 5012 and 5013 provided to the mounts 5010 and 5011. The first camera communication circuit 5241 includes a ground switch 52081 and an input/output switch 52082. The first lens communication circuit 5141 includes a ground switch 51121 and an input/output switch 51122. The first adapter communication circuit 5341 includes a ground switch 53031 and an input/output switch 53032.

The signal line includes two lines or a signal line CS (first signal line) for propagating a signal for controlling communication, and a signal line DATA (second signal line) for propagating data to be transmitted and received. The signal line CS is connected to the camera microcomputer 5205, the adapter microcomputer 5302, and the lens microcomputer 5111, and its (high or low) state is detectable. The signal line CS is pull-up-connected to an unillustrated power supply in the camera body 5200, and connectible to GND via the ground switch 51121 of the interchangeable lens 5100, the ground switch 52081 of the camera body 5200, and the ground switch 53031 of the intermediate adapter 5300. In other words, the open drain connection is established.

With this configuration, the interchangeable lens 5100, the camera body 5200, and the intermediate adapter 5300 can make low the state of the signal line CS by turning on (connecting) their ground switches. On the other hand, when all of the interchangeable lens 5100, the camera body 5200, and the intermediate adapter 5300 turn off (cut off) the ground switches, the state of the signal line CS can be made high. Details of the operation procedure and the contents of the control signal propagated using the signal line CS in the communication will be described later.

The signal line DATA is a single-line bidirectional data transmission line that is usable while the data propagation direction is switched. The signal line DATA can be connected to the lens microcomputer 5111 via the input/output switch 51122, the transmission buffer 51123, and the reception buffer 51124 of the interchangeable lens 5100. The signal line DATA can be connected to the camera microcomputer 5205 via the input/output switch 52082, the transmission buffer 52083, and the reception buffer 52084 of the camera body 5200. The signal line DATA can be connected to the adapter microcomputer 5302 via the input/output switch 53032, the transmission buffer 53033, and the reception buffer 53034 of the intermediate adapter. The camera microcomputer 5205, the lens microcomputer 5111, and the adapter microcomputer 5302 operate the respective input/output switches 52082, 51152, and 53032 to select whether the signal line DATA is connected to the transmission buffers 51123, 5208, and 53033 or the reception buffers 51024, 52084, and 53034.

With this configuration, when the camera microcomputer 5205, the lens microcomputer 5111, and the adapter microcomputer 5302 transmit data, they operate their input/output switches 52082, 51122, and 53032 so as to connect the signal line DATA to the transmission buffers 51123, 5208, and 53033. This enables the data transmission. On the other hand, when the camera microcomputer 5205, the lens microcomputer 5111, and the adapter microcomputer 5302 receive data, they operate their input/output switches 52082, 51122, and 53032 so as to connect the signal line DATA to the reception buffers 51024, 5208, and 53034, respectively. This enables the data reception. The transmission buffers 51123, 5208, and 53033 and the reception buffers 51024, 5208, and 53034 have a configuration that enables the continuous transmission and reception within a buffer size range. Details of an input/output switching procedure of the signal line DATA in the communication will be described later.

The configuration of the communication circuit illustrated in FIG. 17 is merely illustrative, and may be another configuration. For example, the signal line CS is pulled down to GND in the camera body 5200, and connected to an unillustrated power supply via the ground switch 51121 of the interchangeable lens 5100, the ground switch 52081 of the camera body 5200, and the ground switch 53031 of the intermediate adapter 5300. The signal line DATA may be always connected to each data input unit, and the connection/disconnection between the signal line DATA and each data output unit may be switched by a switch.

Referring now to a signal waveform illustrated in FIG. 18, a description will be given of a format of the communication data communicated through the signal line DATA among the camera body 5200, the interchangeable lens 5100, and the intermediate adapter 5300 so as to perform the first communication ("one-to-many" communication). This format is common to the broadcast communication mode as a first communication mode to be described later and the P2P communication mode as a second communication mode. The format of the communication data is based on the so-called asynchronous communication, in which the transmission and reception are performed at a communication bit rate in accordance with a communication speed defined among them in advance.

Initially, the non-transmission state in which the data transmission is not performed maintains the signal level at high. Next, in order to notify the data receiving side of the data transmission start, the signal level is set to a low level for one-bit period. This one-bit period is called a start bit ST. The one-byte data is transmitted for an 8-bit period from the next second bit to the ninth bit. The data bit arrangement starts with the most significant data D7 in accordance with the MSB first format, continues sequentially with data D6, data D5, data D4, data D3, data D2, and data D1, and ends with the least significant data D0. Next, the one-bit parity PA information is added to the tenth bit, and finally the signal level is made high during the stop bit SP indicating the end of the transmission data. Thereby, the 51 frame periods starting with the start bit ST end.

Figure 18:
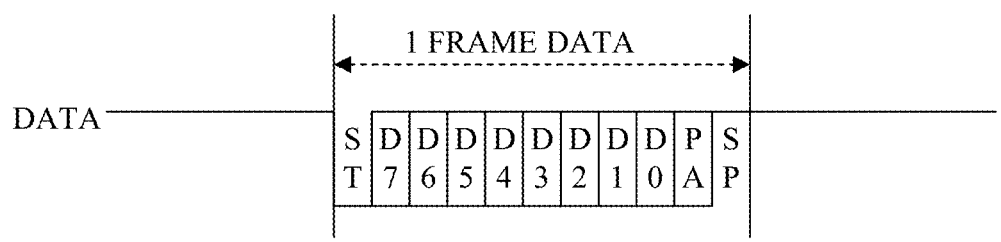
FIG. 18 is a waveform diagram showing a communication data format according to the fifth embodiment.

The communication data format illustrated in FIG. 18 is merely illustrative, and may use another communication data format. For example, the data bit arrangement may be the LSB first or nine-bit long, or the parity PA information may not be added to the data. The data format may be switched between the broadcast communication which is the first communication mode to be described later and the P2P communication which is the second communication mode.

Referring now to a signal waveform illustrated in FIGS. 19A and 19B, a description will be given of the broadcast communication performed with the signal line CS and the signal line DATA among the camera body 5200, the interchangeable lens 5100, and the intermediate adapter 5300. The broadcast communication performs the "one-to-many" simultaneous distribution in which the data is simultaneously transmitted from one of the camera microcomputer 5205, the lens microcomputer 5111 and the adapter microcomputer 5302 to the others.

Figure 19A:
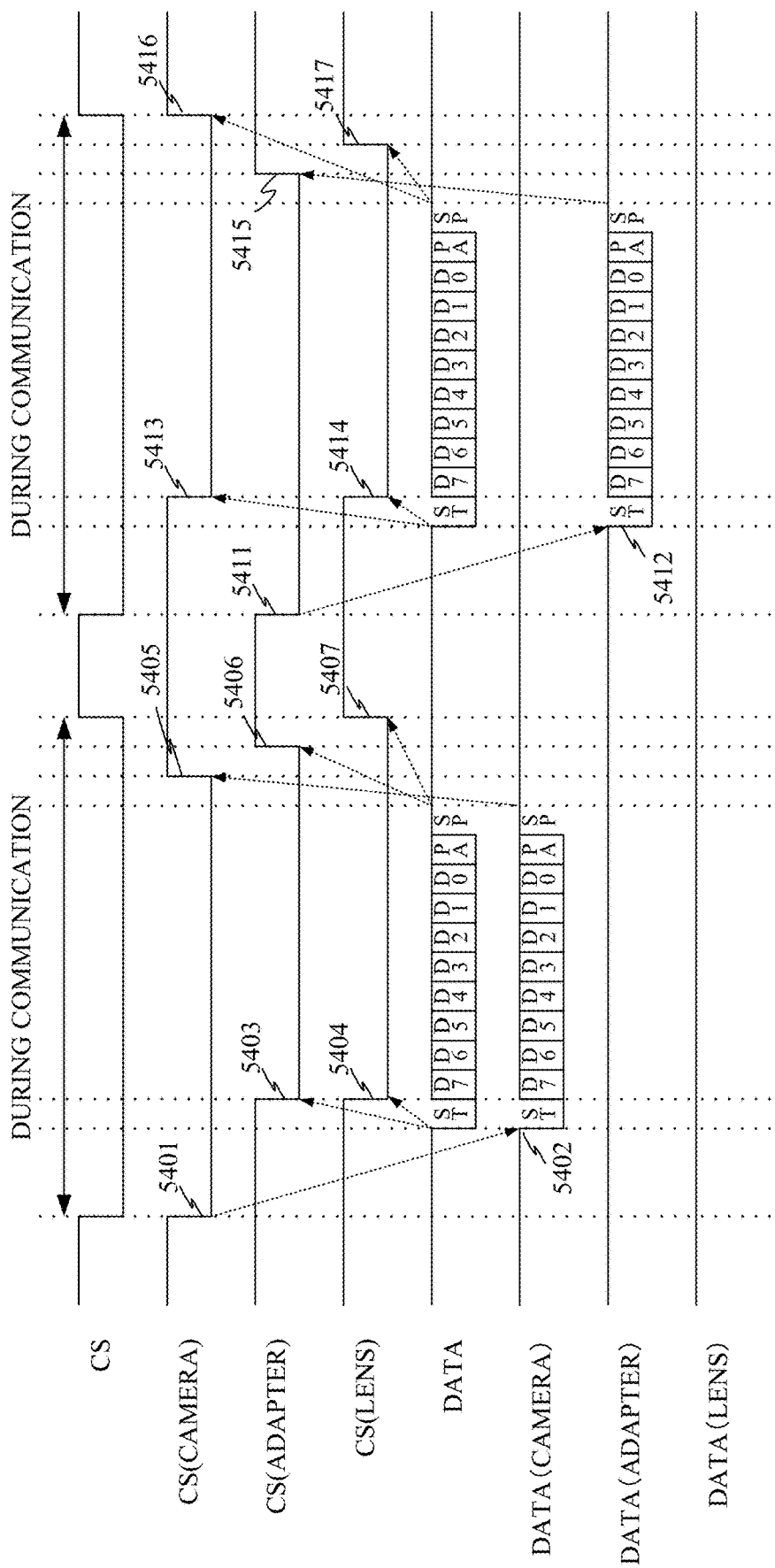
FIG. 19A is a waveform diagram showing a communication waveform in a first communication mode according to the fifth embodiment.

FIG. 19A illustrates an illustrative broadcast communication performed from the adapter microcomputer 5302 to the camera microcomputer 5205 and the lens microcomputer 5111 in response to the broadcast the communication from the camera microcomputer 5205 to the lens microcomputer 5111 and the adapter microcomputer 5302.

Initially, the camera microcomputer 5205 as a communication master, starts sending a low output to the signal line CS in order to notify the lens microcomputer 5111 and the adapter microcomputer 5302 as communication slaves of a start of the broadcast communication (5401). Next, the camera microcomputer 5205 stores the data to be transmitted in the transmission buffer 52083, and outputs it to the signal line DATA according to the above communication format when the transmission starts (5402). On the other hand, the lens microcomputer 5111 and the adapter microcomputer 5302 start transmitting a low output to the signal line CS at a timing when the start bit ST input from the signal line DATA is detected (5403, 5404). Since the camera microcomputer 5205 has already started transmitting the low output to the signal line CS at this time, the signal level transmitted to the signal line CS does not change.

Next, the camera microcomputer 5205 terminates the output of the stop bit SP of the final data, and then stops the Low output to the signal line CS (5405). On the other hand, the lens microcomputer 5111 and the adapter microcomputer 5302 store data in the reception buffers 51124 and 53034 every time they receive data up to the stop bit SP input from the signal line DATA. Then, when the low output to the signal line CS is detected, the data is retrieved from the reception buffers 51124 and 53034, and the internal processing is performed for the data. After the preparation for receiving the next data is completed, the low output to the signal line CS is released (5406, 5407). As described above, the signal level of the signal line CS becomes high when all of the camera microcomputer 5205, the lens microcomputer 5111, and the adapter microcomputer 5302 cancel the low output to the signal line CS. Thus, the camera microcomputer 5205, the lens microcomputer 5111, and the adapter microcomputer 5302 each confirm that the signal level of the signal line CS becomes high after the low output to the signal line CS is released. Thereby, the camera microcomputer 5205, the lens microcomputer 5111, and the adapter microcomputer 5302 can each finish processing relating to the current communication, and determine that the preparation for the next communication is ready.

Next, after confirming that the signal level of the signal line CS has returned to the high level, the adapter microcomputer 5302 starts a low output to the signal line CS to notify the camera microcomputer 5205 and the lens microcomputer 5111 of a start of the broadcast communication (5411).

Next, the adapter microcomputer 5302 stores the data to be transmitted in the transmission buffer 53033, and outputs it to the signal line DATA according to the above communication format when the transmission is started (5412). On the other hand, the camera microcomputer 5205 and the lens microcomputer 5111 start a low output to the signal line CS at the timing when the start bit ST inputted from the signal line DATA is detected (5413, 5414). Since the adapter microcomputer 5302 has already started the low output to the signal line CS at this time, the signal level transmitted to the signal line CS does not change.

Next, after completing the output of the stop bit SP of the final data, the adapter microcomputer 5302 releases the low output to the signal line CS (5415). On the other hand, each time the camera microcomputer 5205 and the lens microcomputer 5111 receive data up to the stop bit SP input from the signal line DATA, the data are stored in the reception buffer 52084 and 51124, and when the low output to the signal line CS is detected, the data is retrieved from the reception buffers 52084 and 51124. Then, the internal processing is performed for the data, and after the preparation for receiving the next data is completed, the low output to the signal line CS is released (5416, 5417).

Figure 19B:
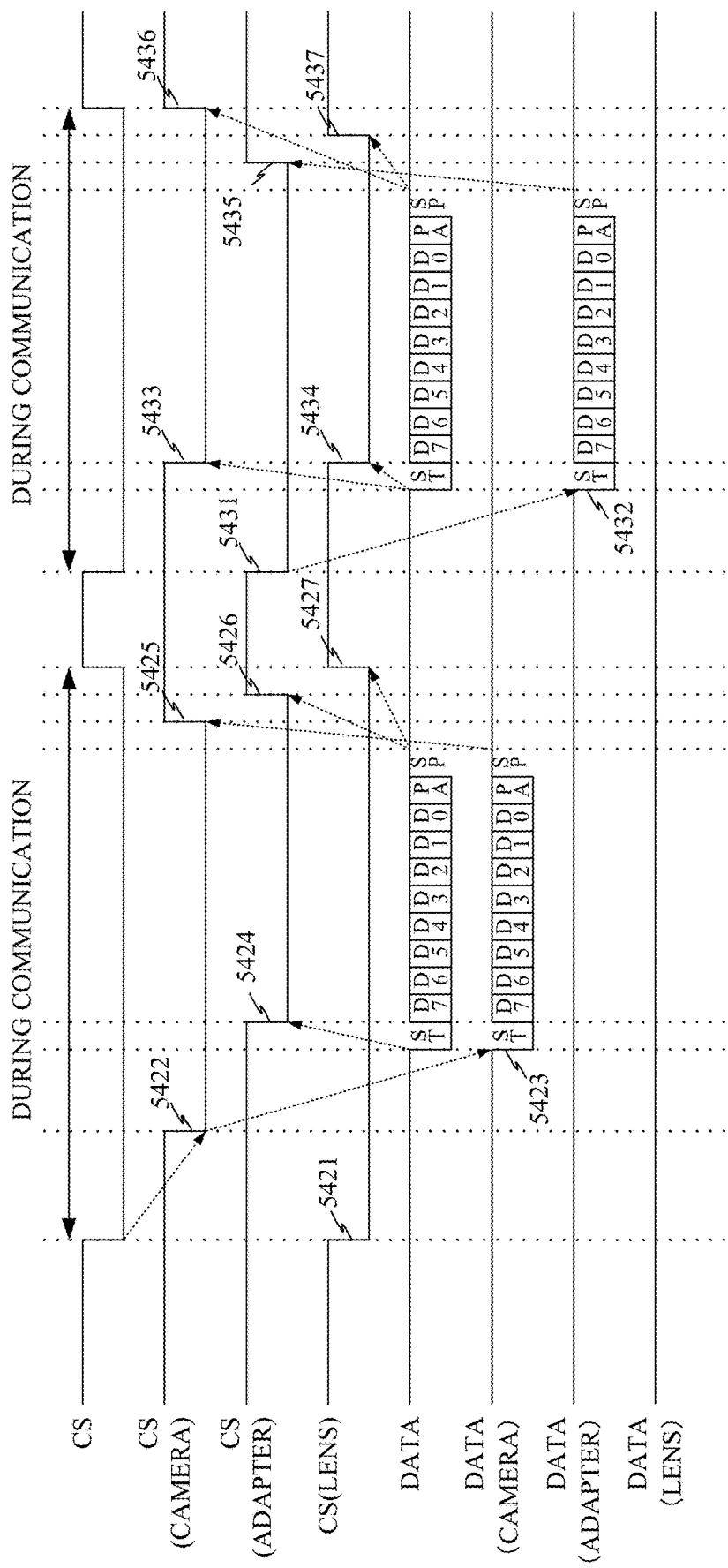
FIG. 19B is another waveform diagram showing a communication waveform in the first communication mode according to the fifth embodiment.

FIG. 19B illustrates an example in which the lens microcomputer 5111 notifies the start of broadcast communication. In this example, in response to the broadcast communication from the camera microcomputer 5205 to the lens microcomputer 5111 and the adapter microcomputer 5302, the broadcast communication is performed from the adapter microcomputer 5302 to the camera microcomputer 5205 and the lens microcomputer 5111.

Initially, the lens microcomputer 5111 starts the low output to the signal line CS in order to notify the camera microcomputer 5205 and the adapter microcomputer 5302 of a start of the broadcast communication (5421). Next, when detecting that the signal level of the signal line CS has become the low level, the camera microcomputer 5205 starts the low output to the signal line CS (5422). Since the lens microcomputer 5111 has already started the low output to the signal line CS at this time, the signal level transmitted to the signal line CS does not change.

Next, the camera microcomputer 5205 stores the data to be transmitted in the transmission buffer 52083, and outputs it to the signal line DATA according to the above communication format when the transmission starts (5423). On the other hand, the adapter microcomputer 5302 starts the low output to the signal line CS at the timing when the start bit ST input from the signal line DATA is detected (5424). Since the camera microcomputer 5205 has already started the low output to the signal line CS at this time, the signal level transmitted to the signal line CS does not change.

Next, the camera microcomputer 5205 terminates the output of the stop bit SP of the final data, and then releases the low output to the signal line CS (5425). On the other hand, whenever the lens microcomputer 5111 and the adapter microcomputer 5302 receive data up to the stop bit SP input from the signal line DATA, the data are stored in the reception buffer 51124 and 53034, and when the low output to the signal line CS is detected, the data is retrieved from the reception buffers 51124 and 53034. Then, the internal processing is performed for the data, and after the preparation for receiving the next data is completed, the low output to the signal line CS is released (5426, 5427). As described above, the signal level of the signal line CS becomes high when all of the camera microcomputer 5205, the lens microcomputer 5111, and the adapter microcomputer 5302 release the low output to the signal line CS. Therefore, the camera microcomputer 5205, the lens microcomputer 5111, and the adapter microcomputer 5302 each confirm that the signal level of the signal line CS becomes high after the low output to the signal line CS is released. Thereby, the camera microcomputer 5205, the lens microcomputer 5111, and the adapter microcomputer 5302 can each finish processing relating to the current communication, and determine that the preparation for the next communication is ready.

Next, after confirming that the signal level of the signal line CS again becomes high, the adapter microcomputer 5302 starts a low output to the signal line CS to notify the camera microcomputer 5205 and the lens microcomputer 5111 of a start of the broadcast communication (5431).

Next, the adapter microcomputer 5302 stores the data to be transmitted in the transmission buffer 53033, and outputs it to the signal line DATA according to the above communication format when the transmission starts (5432). On the other hand, the camera microcomputer 5205 and the lens microcomputer 5111 start the low output to the signal line CS at the timing when detecting the start bit ST inputted from the signal line DATA (5433, 5434). Since the adapter microcomputer 5302 has already started the low output to the signal line CS at this time, the signal level transmitted to the signal line CS does not change.

Next, the adapter microcomputer 5302 terminates the output of the stop bit SP of the final data, and then releases the low output to the signal line CS (5435). On the other hand, after receiving data up to the stop bit SP input from the signal line DATA, the camera microcomputer 5205 and the lens microcomputer 5111 store data in the reception buffers 52084 and 51124 whenever they receive data. Then, when the low output to the signal line CS is detected, the data is retrieved from the reception buffers 52084 and 51124. The internal processing is performed for the data, and after the preparation for receiving the next data is completed, the low output to the signal line CS is released (5436, 5437).

In the example illustrated in FIG. 19B, when the broadcast communication is started from the lens microcomputer 5111 and the adapter microcomputer 5302 as the communication slaves, the camera microcomputer 5205 as the communication master cannot determine which of the lens microcomputer 5111 and the adapter microcomputer 5302 made low the signal line CS at the time of 5421. Thus, the camera microcomputer 5205 needs to communicate with both the lens microcomputer 5111 and the adapter microcomputer 5302 to acquire information as to whether or not they have started the broadcast communication.

The timing when the camera microcomputer 5205 sends a low output to the signal line CS to start the broadcast communication may accord with the timing when the lens microcomputer 5111 and the adapter microcomputer 5302 make low the signal line CS to start the broadcast communication. In this case, the camera microcomputer 5205 cannot detect that the lens microcomputer 5111 and the adapter microcomputer 5302 have transmitted the low outputs to the signal line CS. Accordingly, the camera microcomputer 5205 as the communication master may transmits a permission notice that permits the lens microcomputer 5111 and the adapter microcomputer 5302 as the communication slaves to start the broadcast communication.

As described above with reference to FIGS. 19A and 19B, the signal propagated using the signal line CS in the broadcast communication serves as a signal indicating that the broadcast communication has started and the communication processing is being performed.

FIGS. 19A and 19B illustrate an illustrative communication waveform of the broadcast communication in the first communication that can provide the "one-to-many" communication, but the communication waveform of the broadcast communication in the first communication may be another communication waveform. For example, FIGS. 19A and 19B set data to be transmitted in a single broadcast communication to one byte, but may set it to two bytes or three bytes. The broadcast communication may be set to a one-way limited communication from the camera microcomputer 5205 as the communication master to the lens microcomputer 5111 and the adapter microcomputer 5302 as the communication slaves.

Referring now to a signal waveform illustrated in FIG. 20, a description will be given of the P2P communication performed among the camera body 5200, the interchangeable lens 5100, and the intermediate adapter 5300 using the signal line CS and the signal line DATA. In the P2P communication, the camera body 5200 as the communication master selects one communication partner from the interchangeable lens 5100 and the intermediate adapter 5300 as communication slaves. Then, the "one-to-one" individual communication is performed in which data is transmitted and received only between the camera body 5200 and the selected communication slave.

Herein, an example is illustrated in which the lens microcomputer 5111 is selected as the communication partner by the camera microcomputer 5205, and in response to the one-byte data transmission from the camera microcomputer 5205, the two-byte data is transmitted from the lens microcomputer 5111 to the camera microcomputer 5205. The number of transmission bytes may not be 51 bytes or 2 bytes as described above as long as it is the number of bytes which both the transmitting side and the receiving side can continuously communicate. A method of switching between the broadcast communication and the P2P communication and a method of selecting a communication partner in the P2P communication will be described later.

Initially, the camera microcomputer 5205 as the communication master stores the 51-byte data to be transmitted in the transmission buffer 52083, and outputs it to the signal line DATA according to the above communication format along with the start of transmission (5501). After completing the output of the stop bit SP of the final data, the camera microcomputer 5205 starts the low output to the signal line CS (5502). Thereafter, the camera microcomputer 5205 releases the low output to the signal line CS after the preparation for receiving the next data is completed (5503).

On the other hand, the lens microcomputer 5111 stores the data in the reception buffer 51124 whenever it receives data up to the stop bit SP input from the signal line DATA. Then, when the low signal input from the signal line CS is detected, the data stored in the reception buffer 51124 is analyzed and the internal processing is performed for the data. Thereafter, when the lens microcomputer 5111 confirms that the signal level of the signal line CS returns to a high level, it stores the two-byte data to be transmitted in the transmission buffer 51123 and continuously outputs it to the signal line DATA according to the above communication format along with the transmission start (5504). After the lens microcomputer 5111 finishes outputting the stop bit SP of the second byte, it starts the low output to the signal line CS (5505). Thereafter, the lens microcomputer 5111 releases the low output to the signal line CS after the preparation for receiving the next data is completed (5506).

The adapter microcomputer 5302 that is not selected as the communication partner in the P2P communication does not participate in the operation of the signal line CS and the signal line DATA at all.

As described above with reference to FIG. 20, the signal propagated using the signal line CS in the P2P communication functions as a notice signal indicating the transmission end of the transmission side and a standby request of the next data transmission. The communication waveform of the P2P communication illustrated in FIG. 20 is merely illustrative, and may be another communication waveform. For example, the data to be transmitted may be one byte or another number of bytes.

Figure 21:
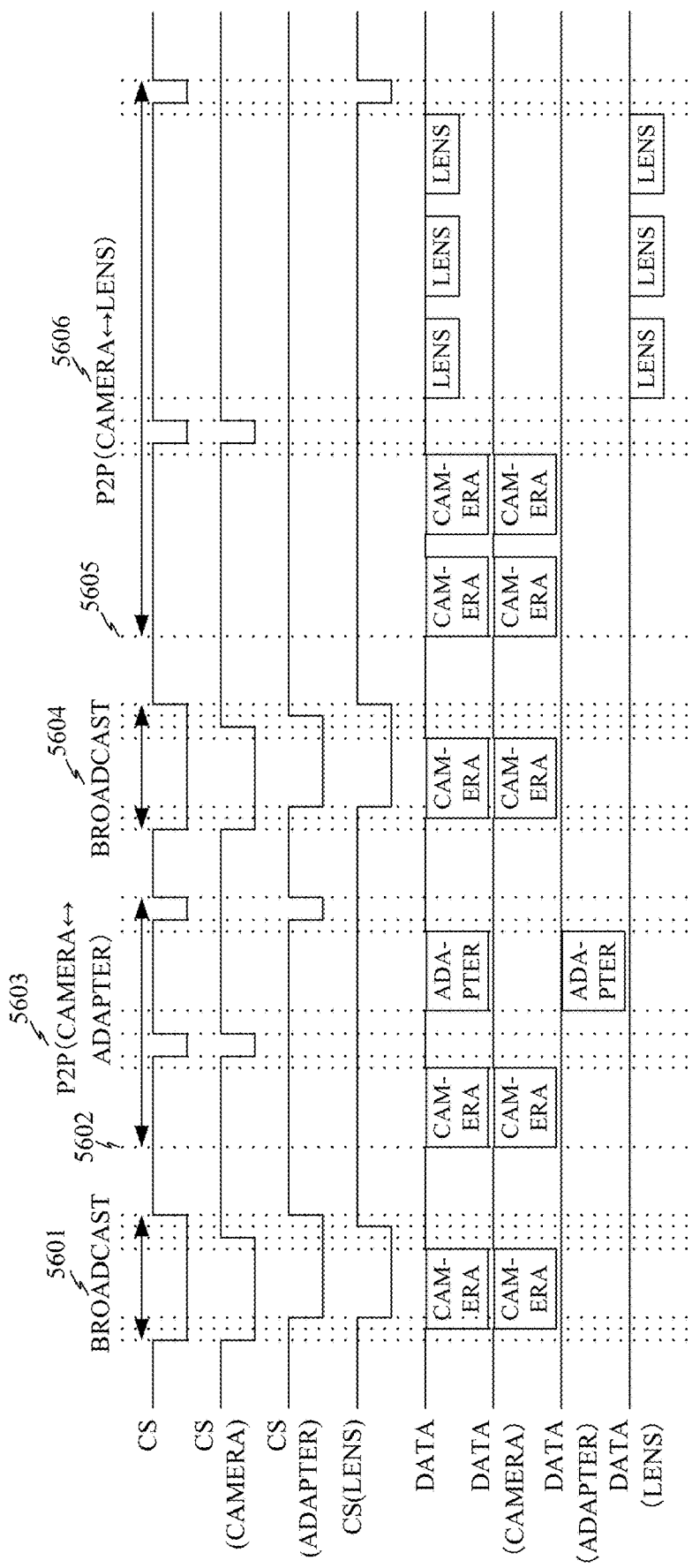
FIG. 21 is a waveform diagram showing a communication waveform in switching the communication mode according to the fifth embodiment.

Referring now to a signal waveform illustrated in FIG. 21, a (communication mode switching) method of switching between the broadcast communication and the P2P communication and a method of selecting a communication partner in the P2P communication will be described. The communication partner in the P2P communication is selected by the broadcast communication. Now assume the following illustrative P2P communication. Initially, the camera microcomputer 5205 selects (designates) the adapter microcomputer 5302 as a communication partner of the P2P communication. Then, the P2P communication is performed with the one-byte data transmission from the camera microcomputer 5205 to the adapter microcomputer 5302 and the one-byte data transmission from the adapter microcomputer 5302 to the camera microcomputer 5205. Next, the camera microcomputer 5205 designates the lens microcomputer 5111 as a communication partner of the P2P communication. Then, the P2P communication is performed with the two-byte data transmission from the camera microcomputer 5205 to the lens microcomputer 5111 and the three-byte data transmission from the lens microcomputer 5111 to the camera microcomputer 5205.

Initially, the camera microcomputer 5205 as the communication master performs the broadcast communication according to the procedure described in FIG. 19A (5601). What is notified by this broadcast communication is the slave designation data which designates a communication partner with the camera microcomputer 5205 in the next P2P communication. The lens microcomputer 5111 and the adapter microcomputer 5302 as the communication slaves determine whether or not they are designated as the communication partner in the P2P communication from slave designation data received by the broadcast communication. With this broadcast communication, the camera microcomputer 5205 and the communication slave designated by the slave designation data switch from the broadcast communication to the P2P communication (5602).

Figure 20:
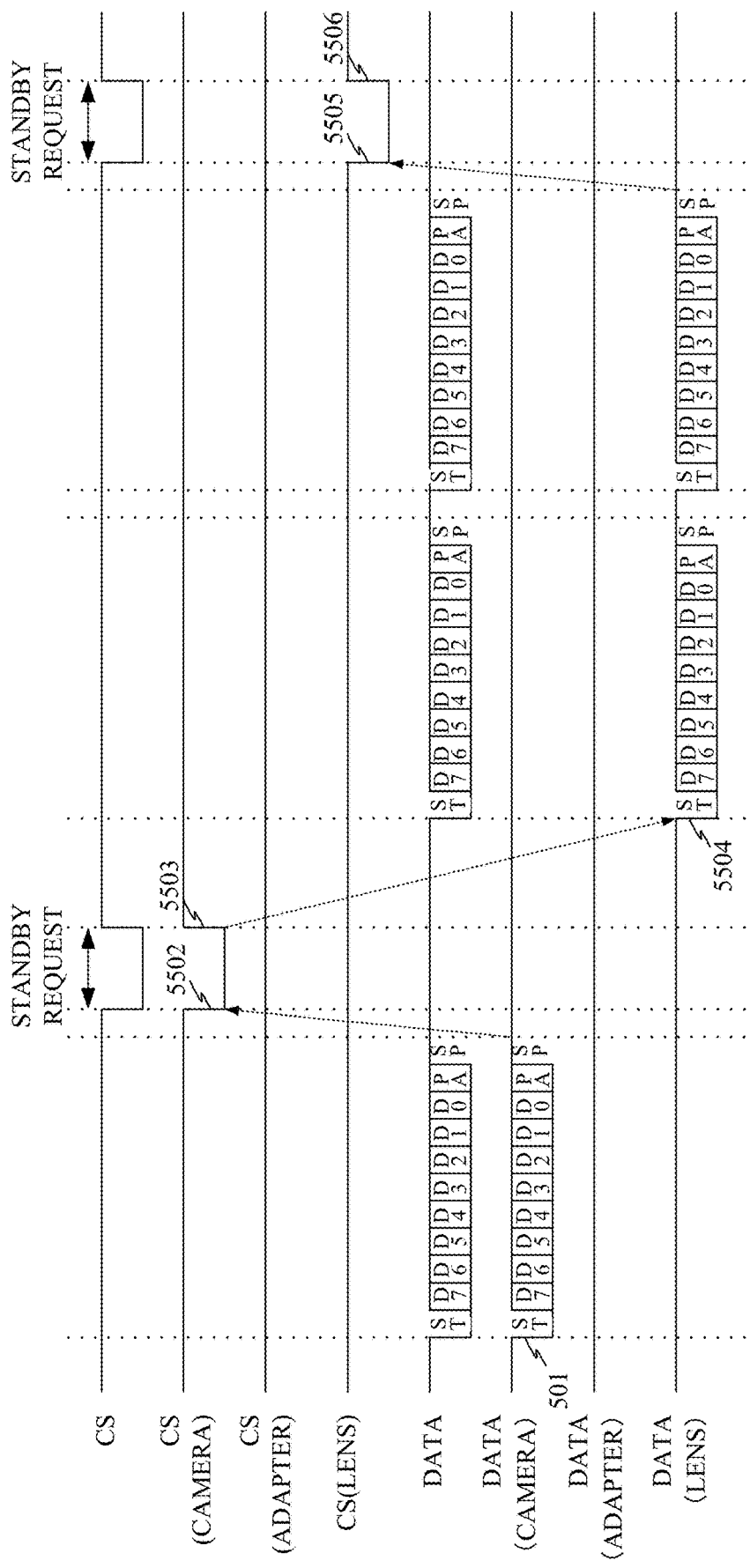
FIG. 20 is a waveform diagram showing a communication waveform in a second communication mode according to the fifth embodiment.

Next, according to the procedure illustrated in FIG. 20, the data is transmitted and received through the P2P communication between the camera microcomputer 5205 and the adapter microcomputer 5302 designated as the communication partner (5603). Herein, the one-byte data is transmitted from the camera microcomputer 5205 to the adapter microcomputer 5302, and then the one-byte data is transmitted from the adapter microcomputer 5302 to the camera microcomputer 5205.

When the P2P communication ends between the camera microcomputer 5205 and the adapter microcomputer 5302, the camera microcomputer 5205 can designate the communication partner in the P2P communication again through the broadcast communication. Herein, the camera microcomputer 5205 sets the lens microcomputer 5111 to the slave designation data in order to designate the lens microcomputer 5111 as the communication partner of the next P2P communication, and performs the broadcast communication according to the procedure described in FIG. 19A (5604). While the adapter microcomputer 5302 ends the P2P communication through this broadcast communication, the lens microcomputer 5111 switches from the broadcast communication to the P2P communication (5605). If the broadcast communication is not performed, the P2P communication continues between the camera microcomputer 5205 and the adapter microcomputer 5302.

Next, the camera microcomputer 5205 and the lens microcomputer 5111 transmit and receive data through the P2P communication according to the procedure described in FIG. 20. Herein, the camera microcomputer 5205 transmits the two-byte data to the lens microcomputer 5111, and then the lens microcomputer 5111 transmits the three-byte data to the camera microcomputer 5205 (5606).

As described above, in the first communication that enables the "one-to-many" communication, a communication partner of the P2P communication through the broadcast communication can be selected, and the communication can be switched between the broadcast communication and the P2P communication.

Referring now to flowcharts in FIGS. 22A and 22B, a description will be given of processing (communication control method) in the broadcast communication mode as the first communication mode performed among the camera body 5200, the interchangeable lens 5100, and the intermediate adapter 5300. A description will now be given of an illustrative broadcast communication from the camera body 5200 to the interchangeable lens 5100 and the intermediate adapter 5300.

Figure 22A:
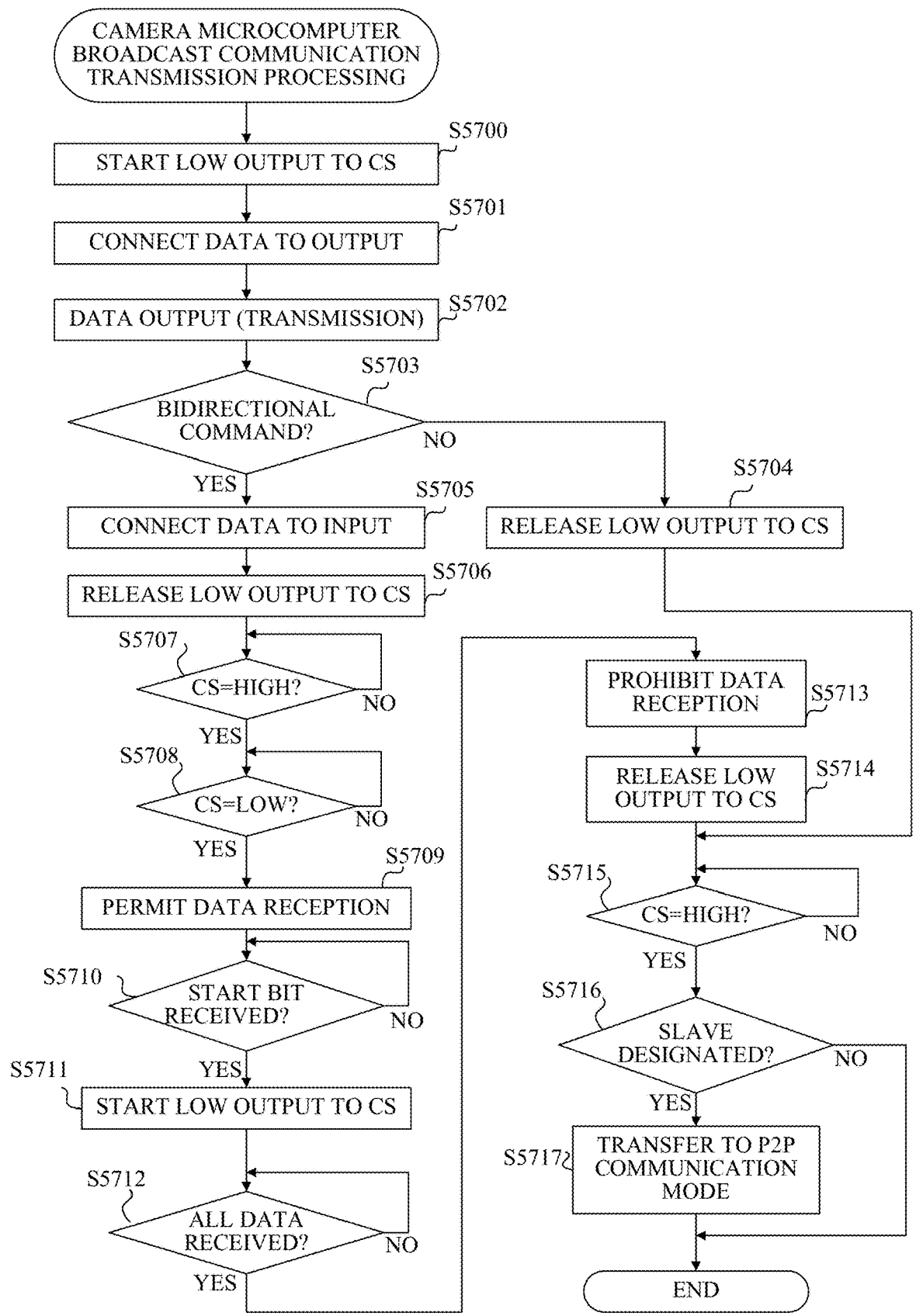
FIG. 22A illustrates a flowchart showing a processing procedure in the first communication mode according to the fifth embodiment.

FIG. 22A illustrates the broadcast communication transmission processing in the broadcast communication mode in which the data is transmitted from the camera microcomputer 5205 to the lens microcomputer 5111 and the adapter microcomputer 5302. The broadcast communication transmission processing starts when the camera microcomputer 5205 satisfies a requirement to start the broadcast communication, such as when it sends a transmission request of the lens data or adapter data, or when the lens microcomputer 5111 and the adapter microcomputer 5302 send a low output to the signal line CS so as to request the broadcast communication to start. The camera microcomputer 5205 executes this processing according to a computer program.

In the following description, S stands for the step. In S5700, the camera microcomputer 5205 turns on (connects) the ground switch 52081 to set the signal line CS to the low level, thereby notifying the lens microcomputer 5111 and the adapter microcomputer 5302 of the start of broadcast communication. The lens microcomputer 5111 and the adapter microcomputer 5302 start the broadcast communication reception processing described in FIG. 22B by receiving a start notice of the broadcast communication.

Next, in S5701, the camera microcomputer 5205 operates the input/output switch 52082 to connect the signal line DATA to the data output unit.

Next, in S5702, the camera microcomputer 5205 transmits the data using the signal line DATA, and proceeds to S5703 when the transmission of all data is completed. The number of bytes of data to be transmitted herein may be any size as long as it is equally recognized among the camera microcomputer 5205, the lens microcomputer 5111, and the adapter microcomputer 5302, and have a size that can be transmitted and received at once by the transmission and reception buffers in each microcomputer 5.

In S5703, the camera microcomputer 5205 determines whether the data transmitted in S5702 is a bidirectional command including the transmission from the lens microcomputer 5111 or the adapter microcomputer 5302. If the transmission data is not a bidirectional command, the camera microcomputer 5205 proceeds to S5704, and if it is a bidirectional command, the camera microcomputer 5205 proceeds to S5705.

In S5704, the camera microcomputer 5205 turns off (cuts off) the ground switch 52081 to release the low output to the signal line CS in order to indicate that the communication processing ends. Then, the flow proceeds to S5715.

In S5705, the camera microcomputer 5205 operates the input/output switch 52082 to connect the signal line DATA to the data input unit.

Next, in S5706, the camera microcomputer 5205 turns off (cuts off) the ground switch 52081 to release the low output to the signal line CS in order to indicate that the communication processing has ended.

Next, in S5707, the camera microcomputer 5205 stands by until the lens microcomputer 5111 and the adapter microcomputer 5302 complete receiving the data or until the signal line CS becomes high. When the signal line CS becomes high, the flow proceeds to S5708.

In S5708, the camera microcomputer 5205 stands by until the signal line CS becomes low in order to wait for the data transmission from the lens microcomputer 5111 or the adapter microcomputer 5302. If the signal line CS becomes low, the flow proceeds to S5709.

In S5709, the camera microcomputer 5205 permits the data reception from the signal line DATA. Next, in S5710, the camera microcomputer 5205 stands by until the start bit of the signal line DATA is detected. If the start bit is detected, the flow proceeds to S5711.

In S5711, the camera microcomputer 5205 turns on (connects) the ground switch 52081 to indicate that the communication processing is in progress, and starts the low output to the signal line CS.

Next, in S5712, the camera microcomputer 5205 stands by until all data are received. When the reception of all the data is completed, the flow proceeds to S5713. The number of bytes of the data to be received herein may be any sizes as long as it is equally recognized among the camera microcomputer 5205, the lens microcomputer 5111, and the adapter microcomputer 5302, and may be a size that can be transmitted and received at once by the transmission and reception buffer in each microcomputer.

Next, in S5713, the camera microcomputer 5205 prohibits the data reception from the signal line DATA.

Then, in S5714, the camera microcomputer 5205 turns off (cuts off) the ground switch 52081 to indicate that the communication processing has ended, and releases the low output to the signal line CS. Thus, the flow proceeds to S5715.

In S5715, the camera microcomputer 5205 stands by until the lens microcomputer 5111 and the adapter microcomputer 5302 complete the data reception or until the signal line CS becomes high. If the signal line CS becomes high, the flow proceeds to S5716.

In S5716, the camera microcomputer 5205 determines whether the communication partner in the P2P communication has been designated for the lens microcomputer 5111 and the adapter microcomputer 5302 based on the data transmitted in S5702. If the camera microcomputer 5205 has designated the communication partner, the flow proceeds to S5717. If not, the camera microcomputer 5205 ends the broadcast communication transmission processing while maintaining the broadcast communication mode.

In S5717, the camera microcomputer 5205 shifts from the broadcast communication mode to the P2P communication mode, and ends the broadcast communication transmission processing.

The above processing can transmit the data using the broadcast communication from the camera body 5200 to the interchangeable lens 5100 and the intermediate adapter 5300.

Figure 22B:
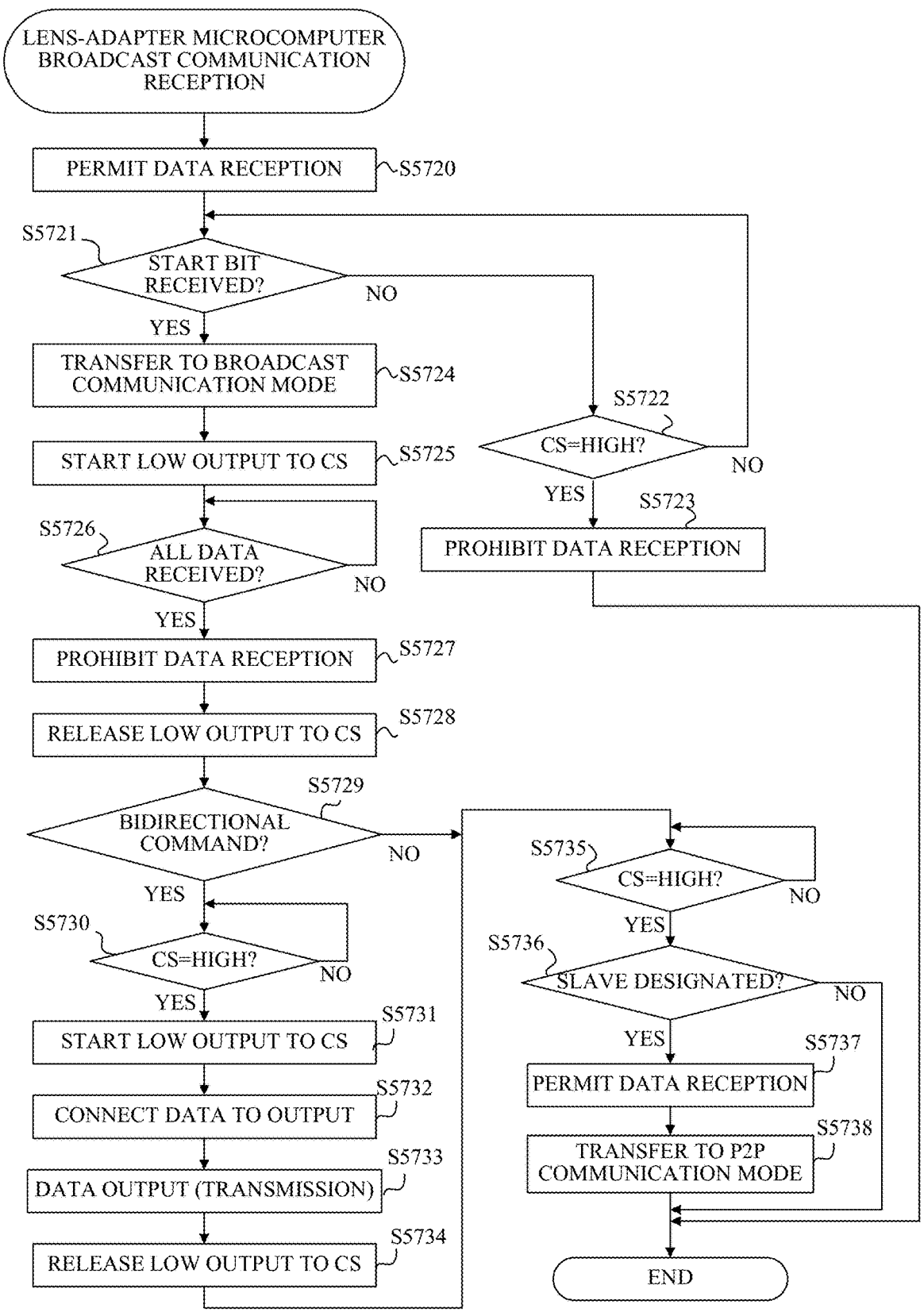
FIG. 22B illustrates another flowchart showing a processing procedure in the first communication mode according to the fifth embodiment.

FIG. 22B illustrates the broadcast communication reception processing in which the lens microcomputer 5111 and the adapter microcomputer 5302 receive data from the camera microcomputer 5205. The lens microcomputer 5111 and the adapter microcomputer 5302 recognize the broadcast communication start notice and start the broadcast communication reception processing in the communication standby when the signal line CS becomes low, as well as the broadcast communication mode or the P2P communication mode. The lens microcomputer 5111 and the adapter microcomputer 5302 execute this processing according to the computer program.

In S5720, the lens microcomputer 5111 and the adapter microcomputer 5302 permit the data to be received from the signal line DATA.

Next, in S5721, the lens microcomputer 5111 and the adapter microcomputer 5302 determine whether or not the start bit of the signal line DATA has been received, and if it has not yet been received, the flow proceeds to S5722, and if it has been received, the flow proceeds to S5724.

In S5722, the lens microcomputer 5111 and the adapter microcomputer 5302 determine whether the signal line CS is high or not. If it is high, the flow proceeds to S5723 to end the reception processing of the broadcast communication, and if it is not high, the flow returns to S5721 to wait for the start bit reception continuously.

In S5723, the lens microcomputer 5111 and the adapter microcomputer 5302 prohibit the data reception from the signal line DATA, and end the broadcast communication reception processing.

In S5724, when the lens microcomputer 5111 and the adapter microcomputer 5302 are in the P2P communication mode, the lens microcomputer 5111 and the adapter microcomputer 5302 shift to the broadcast communication mode.

In S5725, the lens microcomputer 5111 and the adapter microcomputer 5302 turn on (connect) the ground switch 51121 and the ground switch 53031 to start the low output to the signal line CS in order to indicate that the communication processing is in progress.

In S5726, the lens microcomputer 5111 and the adapter microcomputer 5302 wait until all data are received. Then, if the reception of all the data is completed, the flow proceeds to S5727. The number of bytes of the data to be received herein may be any sizes as long as it is equally recognized among the camera microcomputer 5205, the lens microcomputer 5111, and the adapter microcomputer 5302, and may be a size that can be transmitted and received by the transmission and reception buffers at once in each microcomputer 5.

In S5727, the lens microcomputer 5111 and the adapter microcomputer 5302 prohibit the data reception from the signal line DATA.

Next, in S5728, the lens microcomputer 5111 and the adapter microcomputer 5302 turn off (cut off) the ground switch 51121 and the ground switch 53031 to release the low output to the signal line CS in order to indicate that the communication processing has ended.

Next, in S5729, the lens microcomputer 5111 and the adapter microcomputer 5302 determine whether the data received in S5725 is a bidirectional command indicating a transmission derived from itself. If the received data is the bidirectional command, the lens microcomputer 5111 and the adapter microcomputer 5302 proceed to S5730, otherwise proceed to S5735.

In S5730, the lens microcomputer 5111 and the adapter microcomputer 5302 stand by until the other microcomputer 5 completes the data reception or until the signal line CS becomes high. When the signal line CS becomes high, the flow proceeds to S5731.

In S5731, in order to notify the start of broadcast communication, the lens microcomputer 5111 and the adapter microcomputer 5302 turn on (connect) the ground switch 51121 and the ground switch 53031 to set the signal line CS to the low level.

Next, in S5732, the lens microcomputer 5111 and the adapter microcomputer 5302 operate the input/output switch 51122 and the input/output switch 53032 to connect the signal line DATA to the data output unit.

Next, in S5733, the lens microcomputer 5111 and the adapter microcomputer 5302 transmit the data using the signal line DATA, and when all data transmission is completed, the flow proceeds to S5734. The number of bytes of data to be transmitted herein may be any sizes as long as it is equally recognized among the camera microcomputer 5205, the lens microcomputer 5111, and the adapter microcomputer 5302, and may have a size that can be transmitted and received at once by the transmission and reception buffers in each microcomputer 5.

In S5734, the lens microcomputer 5111 and the adapter microcomputer 5302 turn off (cut off) the ground switch 51121 and the ground switch 53031 to release the low output to the signal line CS, to indicate that their own data transmission processing is completed.

Next, in S5735, the lens microcomputer 5111 and the adapter microcomputer 5302 stand by until the other microcomputer 5 completes the data reception or until the signal line CS becomes high. When the signal line CS becomes high, the flow proceeds to S5736.

In S5736, the lens microcomputer 5111 and the adapter microcomputer 5302 determine whether or not the communication partner in the P2P communication is designated by the camera microcomputer 5205 based on the data received in S5726. If the lens microcomputer 5111 and the adapter microcomputer 5302 have been designated as the communication partner, the flow proceeds to S5737, and if so, the broadcast communication mode is maintained and the broadcast communication reception processing ends.

In S5737, the lens microcomputer 5111 and the adapter microcomputer 5302 permit the data reception from the signal line DATA.

Next, in S5738, the lens microcomputer 5111 and the adapter microcomputer 5302 shift from the broadcast communication mode to the P2P communication mode, and ends the broadcast communication reception processing.

The above processing enables the data to be received using the broadcast communication from the camera body 5200 to the interchangeable lens 5100 and the intermediate adapter 5300.

Referring now to flowcharts in FIGS. 23A and 23B, a description will be given of processing performed in the P2P communication mode as the second communication mode among the camera body 5200, the interchangeable lens 5100, and the intermediate adapter 5300. A description will be given of the illustrative P2P communication from the camera body 5200 as the communication master to the intermediate adapter 5300 as the communication slave.

Figure 23A:
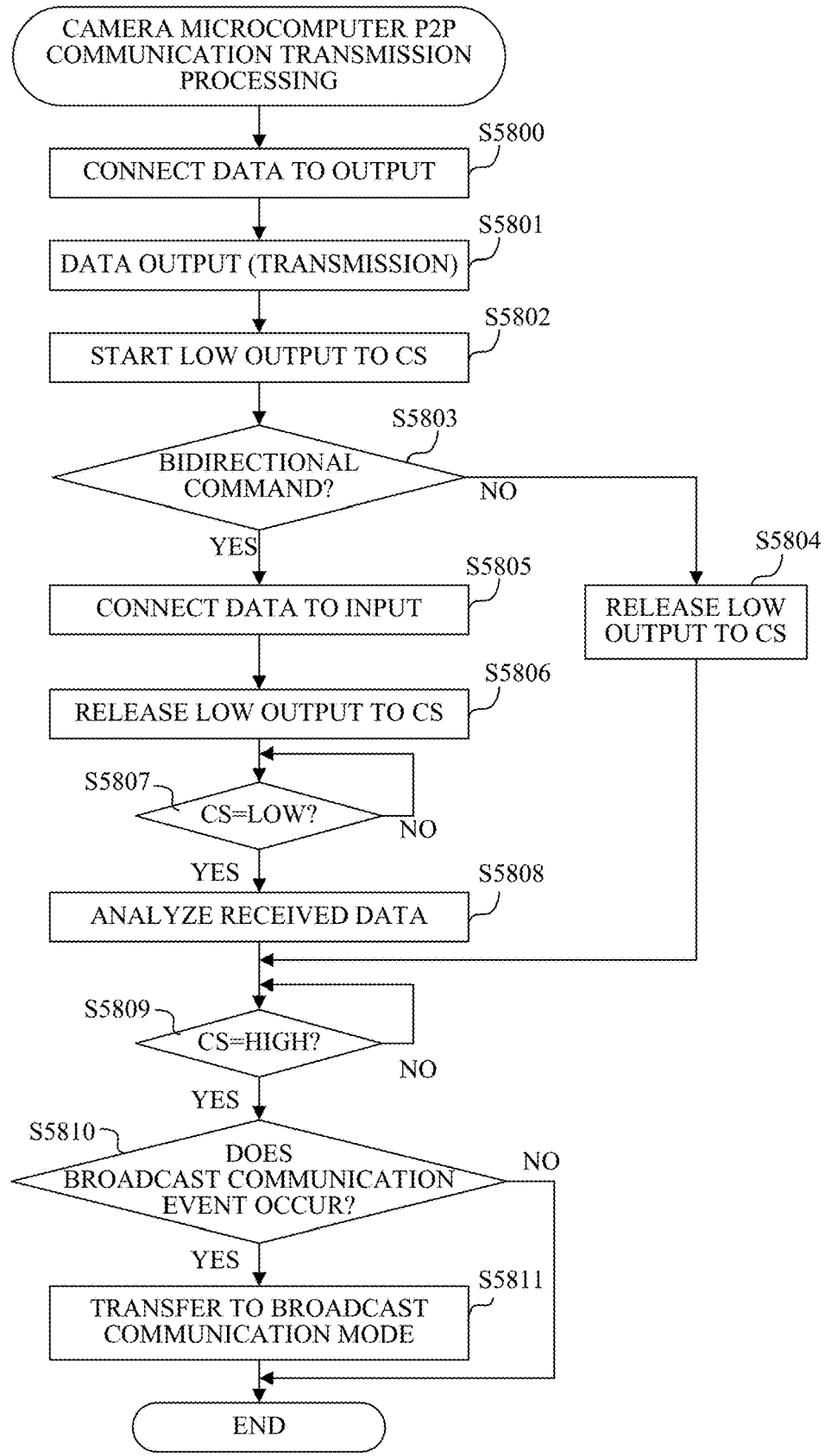
FIG. 23A illustrates a flowchart showing a processing procedure in the second communication mode according to the fifth embodiment.

FIG. 23A illustrates the P2P communication transmission processing performed by the camera microcomputer 5205 as the communication master in the P2P communication mode. The P2P communication transmission processing starts when the camera microcomputer 5205 meets a requirement to start the P2P communication. The camera microcomputer 5205 executes this processing according to a computer program.

In S5800, the camera microcomputer 5205 operates the input/output switch 52082 to connect the signal line DATA to the data output unit.

Next, in S5801, the camera microcomputer 5205 transmits the data using the signal line DATA. Then, when the transmission of all the data is completed, the camera microcomputer 5205 proceeds to S5802. The number of bytes of data to be transmitted herein may have any sizes as long as it is equally recognized between the camera microcomputer 5205 and the adapter microcomputer 5302, and may have a size that can be transmitted and received at once by the transmission and reception buffers in each microcomputer 5. If the camera microcomputer 5205 can divide and transmit the transmission data, the data may be of a size that can be received by the reception buffer in the adapter microcomputer 5302 at once.

In S5802, the camera microcomputer 5205 turns on (connects) the ground switch 52081 to start the low output to the signal line CS, and notifies the adapter microcomputer 5302 of the completion of data transmission by the P2P communication. Upon receiving the data transmission completion of this P2P communication, the adapter microcomputer 5302 starts the P2P communication reception processing described in FIG. 23B.

In S5803, the camera microcomputer 5205 determines whether the data transmitted in S5802 is a bidirectional command that also includes data transmission from the adapter microcomputer 5302. If the transmission data is not the bidirectional command, the camera microcomputer 5205 proceeds to S5804. If it is the bidirectional command, the flow proceeds to S5805.

In S5804, the camera microcomputer 5205 turns off (cuts off) the ground switch 52081 to release the low output to the signal line CS in order to detect that the adapter microcomputer 5302 has completed data reception. Then, the flow proceeds to S5809.

In S5805, the camera microcomputer 5205 operates the input/output switch 52082 to connect the signal line DATA to the data input unit.

Next, in S5806, in order to detect that the data transmission from the adapter microcomputer 5302 is completed, the camera microcomputer 5205 turns off (cuts off) the ground switch 52081 and releases the low output to the signal line CS.

Next, in S5807, the camera microcomputer 5205 stands by until the data transmission from the adapter microcomputer 5302 is completed or until the signal line CS becomes low. Then, when the signal line CS becomes low, the camera microcomputer 5205 determines that the data transmission from the adapter microcomputer 5302 is completed, and the flow proceeds to S5808. The number of bytes of the data to be received herein may have any sizes as long as it is equally recognized between the camera microcomputer 5205 and the adapter microcomputer 5302, and may have a size that can be transmitted and received at one time by the transmission/reception buffer of each microcomputer 5. If the adapter microcomputer 5302 can divide and transmit transmission data, it may be a size receivable by the reception buffer in the camera microcomputer 5205 at once.

In S5808, the camera microcomputer 5205 analyzes the data received from the signal line DATA.

Next, in S5809, the camera microcomputer 5205 stands by until the signal line CS becomes high. Then, when the signal line CS becomes high, this means that the camera microcomputer 5205 completes the current P2P communication and thus the flow proceeds to S5810.

In S5810, the camera microcomputer 5205 determines whether to start the broadcast communication in the next communication. If the camera microcomputer 5205 starts the broadcast communication, the flow proceeds to S5811. If the P2P communication is to continue, the P2P communication transmission processing ends in the P2P communication mode.

In S5811, the camera microcomputer 5205 shifts from the P2P communication mode to the broadcast communication mode, and ends the P2P communication transmission processing.

The above processing can transmit and receive the data using the P2P communication from the camera body 5200 as the communication master to the intermediate adapter 5300.

Figure 23B:
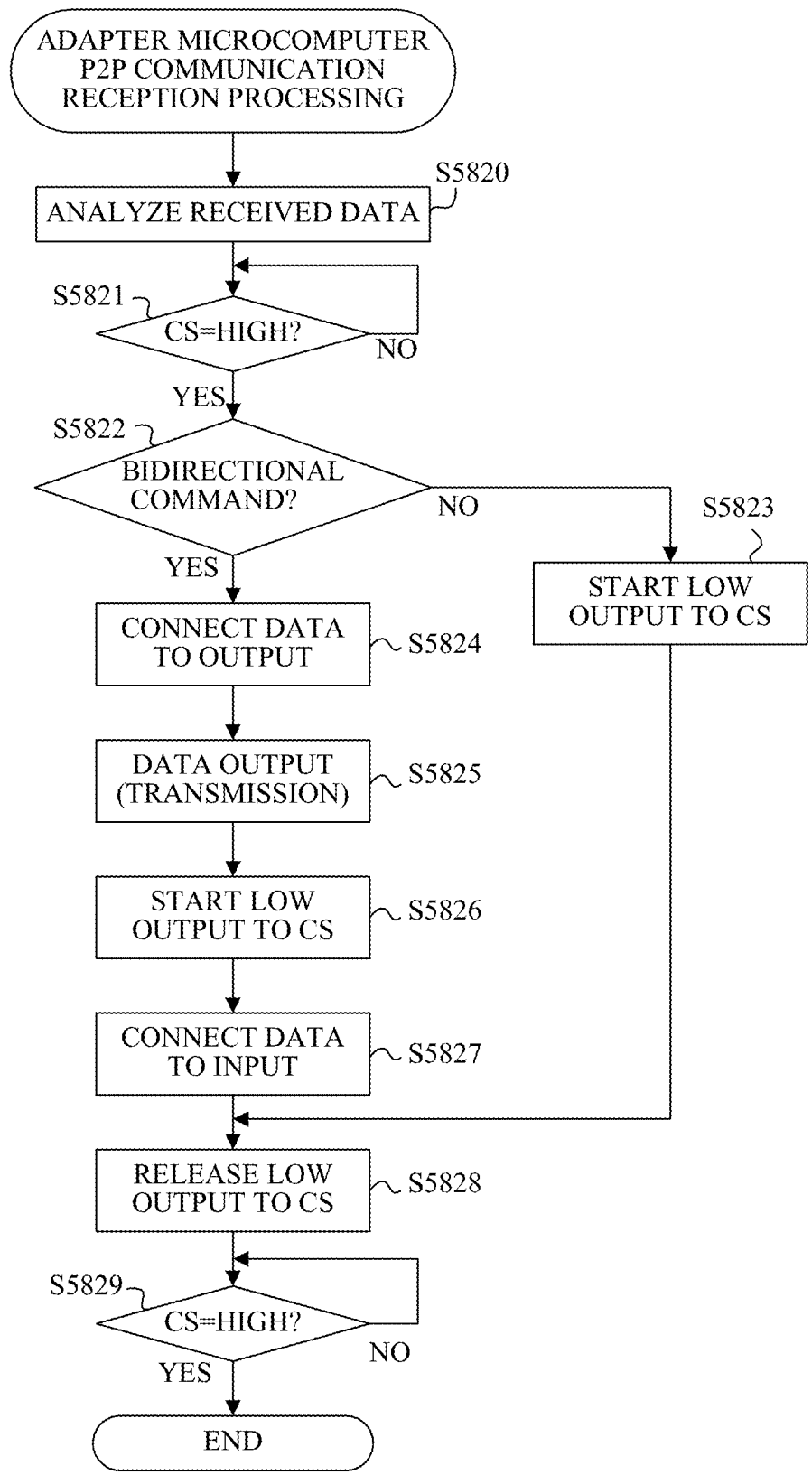
FIG. 23B illustrates another flowchart showing a processing procedure in the second communication mode according to the fifth embodiment.

FIG. 23B illustrates the P2P communication reception processing performed by the adapter microcomputer 5302 in the P2P communication between the camera microcomputer 5205 and the adapter microcomputer 5302 as the communication slave. The P2P communication reception processing starts when the adapter microcomputer 5302 receives the data in the P2P communication. The adapter microcomputer 5302 executes this processing according to a computer program.

In S5820, the adapter microcomputer 5302 analyzes the data received from the signal line DATA.

Next, in S5821, the adapter microcomputer 5302 stands by until the signal line CS becomes high or until the processing is completed in S5804 or S5806. When the signal line CS becomes high, the adapter microcomputer 5302 proceeds to S5822.

In S5822, the adapter microcomputer 5302 determines whether the received data analyzed in S5820 is a bidirectional command that includes the data transmission from the adapter microcomputer 5302. If the received data is not the bidirectional command, the adapter microcomputer 5302 proceeds to S5823, and if it is the bidirectional command, the adapter microcomputer 5302 proceeds to S5824.

In S5823, the adapter microcomputer 5302 starts the low output to the signal line CS by turning on (connecting) and turning off (disconnecting) the ground switch 53031 in order to notify the camera microcomputer 5205 that the data reception has been completed. Then, the flow proceeds to S5828.

In S5824, the adapter microcomputer 5302 operates the input/output switching switch 53032 to connect the signal line DATA to the data output unit.

Next, in S5825, the adapter microcomputer 5302 transmits the data using the signal line DATA, and proceeds to S5826 when the transmission of all data is completed. The number of bytes of the data to be transmitted herein may have any sizes as long as it is equally recognized between the camera microcomputer 5205 and the adapter microcomputer 5302, and may have a size that can be transmitted and received at once by the transmission and reception buffers in each microcomputer 5. If the adapter microcomputer 5302 can divide and transmit the transmission data, it may have a size receivable at once by the reception buffer in the camera microcomputer 5205.

Next, in S5826, in order to notify the camera microcomputer 5205 that the P2P communication has been completed, the adapter microcomputer 5302 turns on (connects) the ground switch 53031 and starts the low output to the signal line CS. Thereby, the adapter microcomputer 5302 notifies the camera microcomputer 5205 of the completion of data transmission by the P2P communication.

Next, in S5827, the adapter microcomputer 5302 operates the input/output switch 53032 to connect the signal line DATA to the data input unit.

Next, in S5828, the adapter microcomputer 5302 turns off (cuts off) the ground switch 53031 and releases the low output to the signal line CS.

Next, in S5829, the adapter microcomputer 5302 stands by until the signal line CS becomes high in order to detect that the camera microcomputer 5205 has completed the P2P communication. When the signal line CS becomes high, the adapter microcomputer 5302 ends the P2P communication reception processing.

The above processing transmits and receives the data using the P2P communication of the intermediate adapter 5300 as the communication slave.

Referring now to a flowchart of FIG. 24, a description will be given of start communication processing among the camera body 5200, the interchangeable lens 5100, and the intermediate adapter 5300, which have different release dates, through the first communication at a higher speed or an optimum communication speed with their guaranteed compatibilities. A description will be given of illustrative communication processing (camera body start processing) performed by the camera body 5200 with the intermediate adapter 5300, when the interchangeable lens 5100 is connected to the camera body 5200 via one intermediate adapter 5300. However, the communication slave may be the interchangeable lens 5100. This processing is performed on all of the plurality of accessories connected to the camera body 5200, including the first communication communicable interchangeable lens. The camera microcomputer 5205 performs the following processing in accordance with a computer program.

In S5900, the camera microcomputer 5205 performs the authentication communication to recognize what type of and how many accessories are attached via the first camera communication circuit 5241. Then, when the authentication of all the mounted accessories (herein, the intermediate adapter 5300 and the interchangeable lens 5100) is completed, the flow proceeds to S5901. The authentication communication is performed at a communication bit rate in accordance with a mutually predefined communication speed. However, if an accessory whose communication bit rate capable of a higher speed communication can be identified by the authentication is attached, the communication bit rate of the P2P communication mode as the second communication mode may be changed for the accessory. The authentication communication is performed within a range of the mutually predefined continuous transmittable data size (referred to as a second continuous transmittable data size hereinafter).

In S5901, the camera microcomputer 5205 performs the initial setting processing that can be started using the authentication information acquired in S5900. The initial setting is, for example, displaying of the attachment state of the accessory on the display unit 206 or setting of the optical information to the signal processing circuit 5203. As the initial setting, the second communication may be used to notify the interchangeable lens 5100 of the information of the intermediate adapter 5300 to acquire the optical information for the intermediate adapter 5300 from the interchangeable lens 5100. Thus, by previously acquiring the information of the attached accessory, the processing using the information can be started early and the camera body 5200 can be quickly started.

Next, in S5902, the camera microcomputer 5205 receives the adapter transmittable size (accessory transmittable size) from the adapter microcomputer 5302 via the first camera communication circuit 5241. The adapter transmittable size is a data size (the number of data or the data amount) that the adapter microcomputer 5302 can transmit continuously. The adapter transmittable size is determined, for example, by the buffer size of the transmit buffer 53033. The adapter transmittable size is also transmitted and received within a range of the second continuous transmittable data size, similar to the authentication communication.

In S5903, the camera microcomputer 5205 compares the adapter transmittable size with the camera receivable size that is a data size continuously receivable by itself. If the camera receivable size is smaller than the adapter transmittable size, the camera microcomputer 5205 sets the camera receivable size to the camera-adapter maximum reception size as a first continuous receivable data size described later in S5904. On the other hand, if the adapter transmittable size is smaller than the camera receivable size, the adapter transmittable size is set to the camera-adapter maximum reception size in S5905. If the adapter microcomputer 5302 can divide the transmission data and transmit it, the flow may transfer from S5903 to S5904.

The camera receivable size is determined, for example, by the buffer size of the reception buffer 52084. The camera-adapter maximum reception size is the maximum data size that the camera microcomputer 5205 can continuously receive from the adapter microcomputer 5302. The subsequent data size received from the adapter microcomputer 5302 of the camera microcomputer 5205 is controlled with the maximum reception size of this camera-adapter as the upper limit.

The camera microcomputer 5205 having proceeded from S5904 and S5905 to S5906 receives information on the memory map for each command from the adapter microcomputer 5302 via the first camera communication circuit 5241. This processing enables the camera microcomputer 5205 to recognize a command that can be handled by the adapter microcomputer 5302. Details of the memory map will be described later with reference to FIG. 25.

Next, in S5907, the camera microcomputer 5205 receives the adapter individual information from the adapter microcomputer 5302 via the first camera communication circuit 5241. The adapter individual information is information indicating an optical member, a mount function, and the like of the intermediate adapter 5300. Due to a large data amount of the adapter individual information, the communication efficiency can be improved by communicating the adapter individual information after the camera-adapter maximum reception size is determined. The adapter individual information is also transmitted and received within a range of the second continuous transmittable data size, similar to the authentication communication.

Next, in S5908, the camera microcomputer 5205 receives the adapter receivable size (accessory receivable size) from the adapter microcomputer 5302 via the first camera communication circuit 5241. The adapter receivable size is a data size that the adapter microcomputer 5302 can continuously receive. The adapter receivable size is determined, for example, by the buffer size of the reception buffer 53034. The adapter receivable size is also transmitted and received within a range of the second continuous transmittable data size, similar to the authentication communication.

Next, in S5909, the camera microcomputer 5205 compares the adapter receivable size with the camera transmittable size as its continuous transmittable data size. If the camera transmittable size is smaller than the adapter receivable size, the camera microcomputer 5205 sets the camera transmittable size to the camera-adapter maximum transmit size as the first continuous transmittable data size described later at S5910. If the adapter receivable size is smaller than the camera transmittable size, the adapter receivable size is set to the camera-adapter maximum transmission size in S5911. If the camera microcomputer 5205 can divide the transmission data and transmit it, the flow may transfer from S5909 to S5911.

The camera transmittable size is determined, for example, by the buffer size of the transmit buffer 52083. The camera-adapter maximum transmission size is the maximum data size continuously transmittable from the camera microcomputer 5205 to the adapter microcomputer 5302. Then, the transmission data size of the camera microcomputer 5205 to the adapter microcomputer 5302 is controlled with this size as the upper limit.

In S5912, the camera microcomputer 5205 transmits the camera individual information to the adapter microcomputer 5302 via the first camera communication circuit 5241. The camera individual information is information such as the mounting function of the camera body 5100. Since the data amount of the camera individual information is large, the communication efficiency can be improved by communicating camera individual information after the camera-adapter maximum transmission size is determined. After this S5912, the camera microcomputer 5205 ends this camera body start processing.

The camera microcomputer 5205 sets the first continuously receivable data size and the first continuous transmittable data size described above for each accessory (the interchangeable lens 5100 or the intermediate adapter 5300). Then, the camera microcomputer 5205 communicates with each accessory in a data size with the first continuously receivable data size and the first continuous transmittable data size set for each accessory as the upper limit.

The above camera body start processing performed when the camera body 5200 starts can set an optimum communication data size even in the combination of the camera body 5200 and accessories (interchangeable lens 5100 and intermediate adapter 5300) having different release dates. The camera body 5200 can be started at a high speed.

Referring now to FIG. 25, a description will be given of a format example of the predefined memory map (data arrangement information) between the camera body 5200 and the accessory (the interchangeable lens 5100 or the intermediate adapter 5300) in the second communication mode (P2P communication mode) of the first communication ("one-to-many" communication). The memory map is defined for each communication command. The memory map 51000 includes a plurality of data 51002, and an address 51001 is assigned to each data. A value 51003 of each data is updated at a fixed value or at any timing. The memory map described herein follows a communication protocol, and the data arrangement in the memory in each microcomputer may be different from the format according to this embodiment.

The memory map is defined for each communication command. When the communication master receives the data in the memory map, the P2P communication is performed by designating the communication command and address corresponding to the data to be received, and the communication slave retrieves the designated data from the memory map and sends it to the communication master using the P2P communication. Similarly, when the communication master transmits the memory map data, the communication slave stores the specified data in the memory map by specifying the communication command and the address corresponding to the data to be transmitted. At this time, a plurality of continuous data may be transmitted and received by specifying the data size together with the address.

Figure 26:
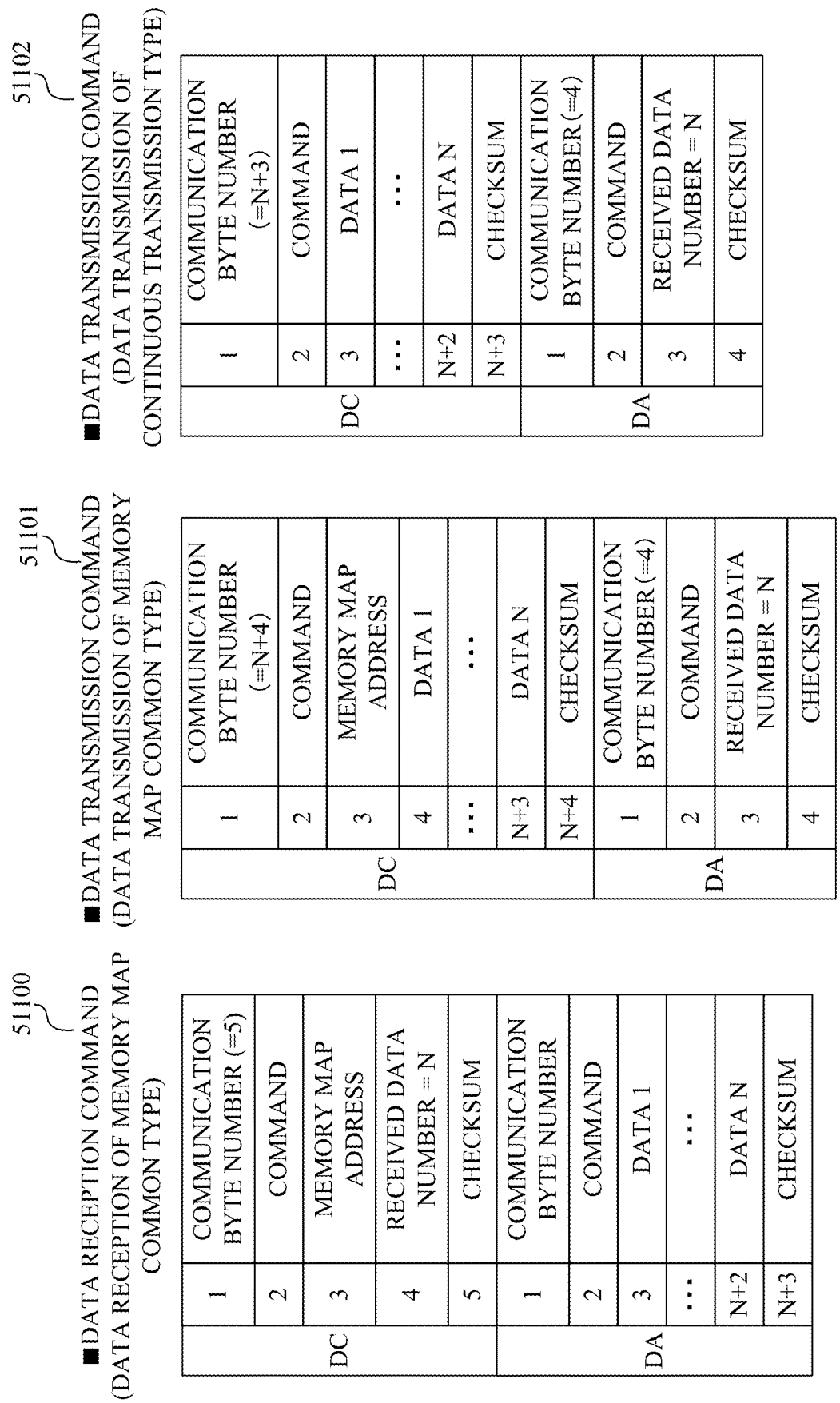
FIG. 26 is a diagram showing a communication command format according to the fifth embodiment.

Referring now to FIG. 26, a description will be given of an illustrative communication command predefined between the camera body 5200 and the accessory in the second communication mode through the first communication. A description will be given of an example in which the camera microcomputer 5205 serves as the communication master and the adapter microcomputer 5302 serves as the communication slave. DC in the table in FIG. 26 denotes transmission data from the communication master to the communication slave, and one-byte data is continuously transmitted in order from 1. DA denotes transmission data from the communication slave to the communication master, and one-byte data is transmitted in order from 1.

A description will be given of a data reception command 51100 as an illustrative communication command (data transmission request) for the communication master to receive data from the communication slave using the memory map. The data DC transmitted from the camera microcomputer 5205 is totally five-byte data including the number of communication bytes, the command, the memory map address, the number N of received data (bytes), and the checksum in this order. The data DA transmitted from the adapter microcomputer 5302 is totally (N+3)-byte data including the number of communication bytes, the command, N data from data 51 to data N, and the checksum in this order. The DA command or checksum is used to detect an error in communication from the communication master to the communication slave. If the error is detected, the communication master again executes (retries) the same communication.

The camera microcomputer 5205 sets the number N of received data so that DA does not exceed the camera-adapter maximum reception size. In other words, the following condition is set:

Number of received data $N \leq$ camera-adapter maximum reception size-3

In addition, the camera-adapter maximum transmission size predefined between the camera body 5200 and the accessory needs to be 5 bytes or more, which is the transmission size of DC.

Next, a data transmission command 51101 will be described as an illustrative communication command for causing the communication master to transmit the data to the communication slave using a memory map. The data DC transmitted from the camera microcomputer 5205 is totally (N+4)-byte data including the number of communication bytes, the command, the memory map address, N data from the data 51 to the data N, and the checksum in this order. The data DA transmitted from the adapter microcomputer 5302 is totally four-byte data including the number of communication bytes, the command, the number N of received data, and the checksum in this order. The DA command and checksum are used to detect an error in communication from the communication slave to the communication master. If the error is detected, the communication slave again executes (retries) the same communication.

The camera microcomputer 5205 sets the number N of transmission data (bytes) so that the DC does not exceed the above camera-adapter maximum transmission size. In other words, the following condition is set:

Number of transmission data $N \leq$ camera-adapter maximum transmission size-4

The camera-adapter maximum reception size predefined between the camera body 5200 and the accessory needs to be four bytes or more, which is the transmission size of the DA.

Next follows a description of a data transmission command 51102 as an illustrative communication command for causing the communication master to transmit the data to the communication slave in order from data at a start address using the memory map. This command intends to transmit a large amount of data from the data at the start address, thus is repeated until the transmission of all data is completed, and is used, for example, to upgrade the adapter microcomputer 5302. The data DC transmitted from the camera microcomputer 5205 is totally (N+3)-byte data including the number of communication bytes, the command, N data from data 51 to data N, and the checksum in this order. The data DA transmitted from the adapter microcomputer 5302 is totally four-byte data including the number of communication bytes, the command, the number N of received data, and the checksum in this order. The DA command and checksum is used to detect an error in communication from the communication slave to the communication master. If the error is detected, the communication slave again executes (retries) the same communication.

The camera microcomputer 5205 sets the number N of transmission data so that DC does not exceed the above camera-adapter maximum transmission size. In other words, the following condition is set:

Number of transmission data $N \leq$ camera-adapter maximum transmission size-3

The camera-adapter maximum reception size predefined between the camera body 5200 and the accessory needs to be four bytes or more, which is the transmission size of the DA.

Referring now to flowcharts in FIGS. 27A and 27B, a description will be given of communication processing performed using the memory map in the second communication mode in the first communication. A description will be given of illustrative communication processing performed between the camera body 5200 as the communication master and the intermediate adapter 5300 as the communication slave, but the communication slave may be the interchangeable lens 5100.

Figure 27A:
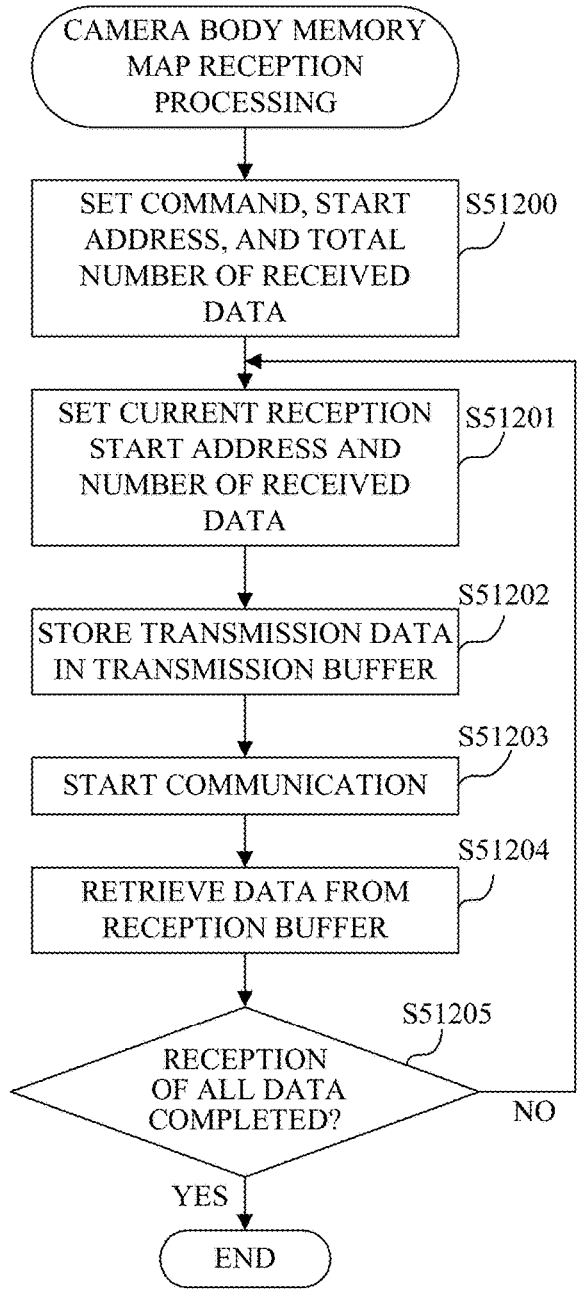
FIGS. 27A and 27B illustrate flowcharts showing a communication processing procedure using the memory map according to the fifth embodiment.
Figure 27B:
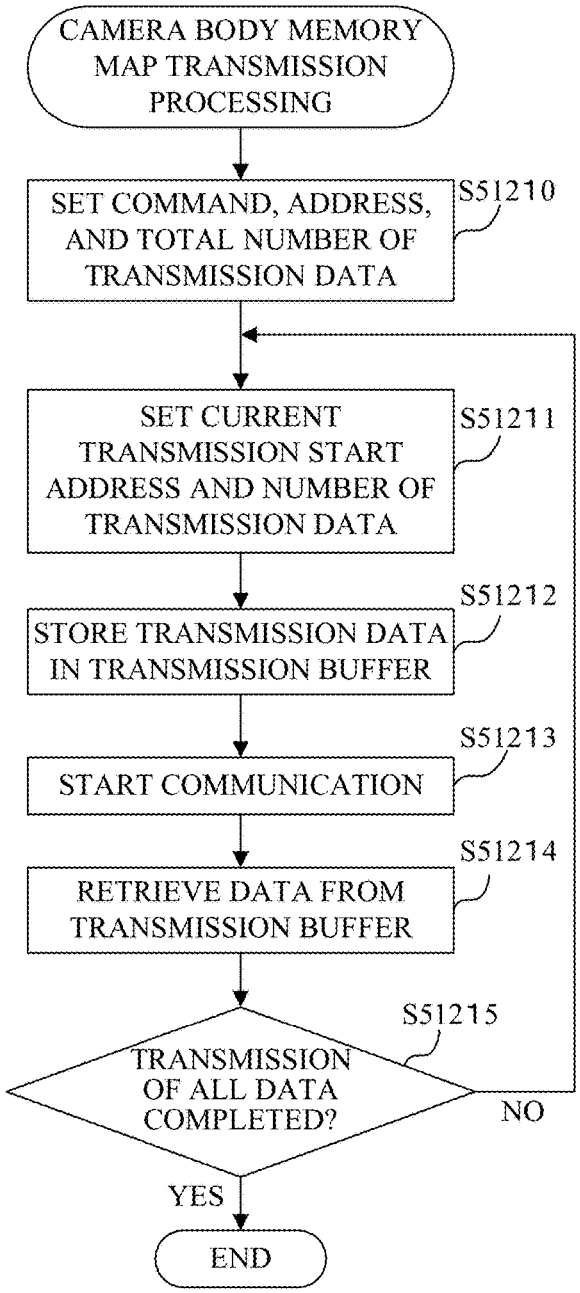

Referring now to FIG. 27A, a description will be given of processing (memory map reception processing) for the camera body 5200 to receive continuous data on the memory map from the intermediate adapter 5300. The camera microcomputer 5205 performs the data reception using the above data reception command 51100.

In S51200, the camera microcomputer 5205 sets a command (data transmission request) corresponding to the data for which the transmission is requested, a start address S_ADR of the memory map, and the total number A_N of received data.

Next, in S51201, the camera microcomputer 5205 sets a memory map address ADR to be transmitted in the current communication and the number N of received data according to the set start address S_ADR and the total number A_N of received data. For example, the following condition is set:

Memory map address ADR=start address S_ADR

Number of received data N=Total number of received data A_N

Then, the number N of received data is limited so that the DA does not exceed the above camera-adapter maximum reception size. In other words, if the number of received data N>camera-adapter maximum reception size-3, then the following condition is reset:

Number of received data N=camera-adapter maximum reception size-3

In addition the following condition is reset:

Start address S_ADR=start address S_ADR+number of received data N

Total number of received data A_N=Total number of received data A_N-number of received data N Thereby, since the number of remaining data is reset to the total number of received data A_N once the data to be transmitted this time is determined, it can be determined whether there is data to be transmitted next.

Next, in S51202, the camera microcomputer 5205 stores the command set in S51200 and S51201, the memory map address ADR, and the number N of received data in the transmission buffer 52083 according to the DC format of the data reception command 51100.

Next, in S51203, the camera microcomputer 5205 transmits DC to the adapter microcomputer 5302 via the first camera communication circuit 5241. The camera microcomputer 5205 receives DA from the adapter microcomputer 5302 via the first camera communication circuit 5241. The camera microcomputer 5205 may divide the transmission data and stores the divided data in the transmission buffer 52083 and repeat the transmission data in S51202 and S51203 so as to transmit the transmission data plural times.

Next, in S51204, the camera microcomputer 5205 retrieves the received data stored in the reception buffer 52084 and stores the data in a predetermined memory. When the camera microcomputer 5205 detects a communication error such as a checksum error in retrieving received data, the following condition is reset:

Start address S_ADR=start address S_ADR-number of received data N

Total number of received data A_N=Total number of received data A_N+Number of received data N Thereby, the start address S_ADR and the total number of received data A_N can be returned to the pre-communication values, and the communication retry control is available.

Next, in S51205, the camera microcomputer 5205 determines whether the reception of all the data from the adapter microcomputer 5302 has been completed, and if the reception is completed, the flow ends, otherwise the flow returns to S51201. In this embodiment, since the remaining data number is set to the total number A_N of received data, if the total number A_N of received data is 1 or more, the camera microcomputer 5205 returns to S51201.

Referring now to a flowchart in FIG. 27B, a description will be given of processing (memory map transmission processing) for the camera body 5200 to transmit the continuous data on the memory map from the intermediate adapter 5300. The camera microcomputer 5205 performs the data transmission using the data transmission commands 51101 and 51102 described above.

In S51210, the camera microcomputer 5205 sets a command (data reception request) corresponding to the data to be transmitted, the start address S_ADR of the memory map, and the total number A_N of transmission data. However, when the data is transmitted using the data transmission command 51102, it is unnecessary to set the start address S_ADR.

Next, in S51211, the camera microcomputer 5205 sets the memory map address ADR and the number N of transmission data to be transmitted in the current communication according to the set start address S_ADR and the total number A_N of transmission data. For example, the following condition is set:

Memory map address ADR=start address S_ADR

Number of transmission data N=Total number of transmission data A_N

Thereafter, the camera microcomputer 5205 limits the number N of transmission data so that the DA does not exceed the above camera-adapter maximum reception size. In other words, when the number of transmission data N>camera-adapter maximum transmission size-4, the following condition is reset:

Number of transmission data N=camera-adapter maximum reception size-4

In addition, the following condition is reset:

Start address S_ADR=start address S_ADR+number of transmission data N

Total number of transmission data A_N=Total number of transmission data A_N-Number of transmission data N Thereby, since the number of remaining data is reset to the total number of transmission data A_N once the data to be transmitted this time is determined, it can be determined whether there is data to be transmitted next. However, when the data is transmitted using the data transmission command 51102, it is unnecessary to set the memory map address ADR and the start address S_ADR.

Next, in S51212, the camera microcomputer 5205 stores the continuous data including the command set in S51210 and S51211, the memory map address ADR, and the number N of transmission data and the checksum in the transmission buffer 52083 according to the DC format of the data transmission commands 51101 and 51102.

Next, in S51213, the camera microcomputer 5205 transmits DC to the adapter microcomputer 5302 via the first camera communication circuit 5241. Thereafter, the camera microcomputer 5205 receives DA from the adapter microcomputer 5302 via the first camera communication circuit 5241. The camera microcomputer 5205 may divide the transmission data, store the divided data in the transmission buffer 52083, and transmit the transmission data a plurality of times by repeating the transmission of DC in S51212 and S51213.

Next, in S51214, the camera microcomputer 5205 retrieves the transmission data stored in the transmission buffer 52083 and stores it in a predetermined memory. When the camera microcomputer 5205 detects a communication error such as a checksum error in retrieving the transmission data, the following condition is reset.

Start address S_ADR=start address S_ADR−number of transmission data N

Total number of transmission data A_N=total number of transmission data A_N+number of transmission data N Thereby, the start address S_ADR and the total number A_N of transmission data can be returned to the pre-communication values, and the communication retry control is available.

Next, in S51215, the camera microcomputer 5205 determines whether the transmission of all data to the adapter microcomputer 5302 has been completed. If the transmission is completed, the flow ends, otherwise the flow returns to S51211. In this embodiment, since the remaining data number is set to the total transmission data number A_N, the camera microcomputer 5205 returns to S51211 if the total transmission data number A_N is 1 or more.

Figure 28:
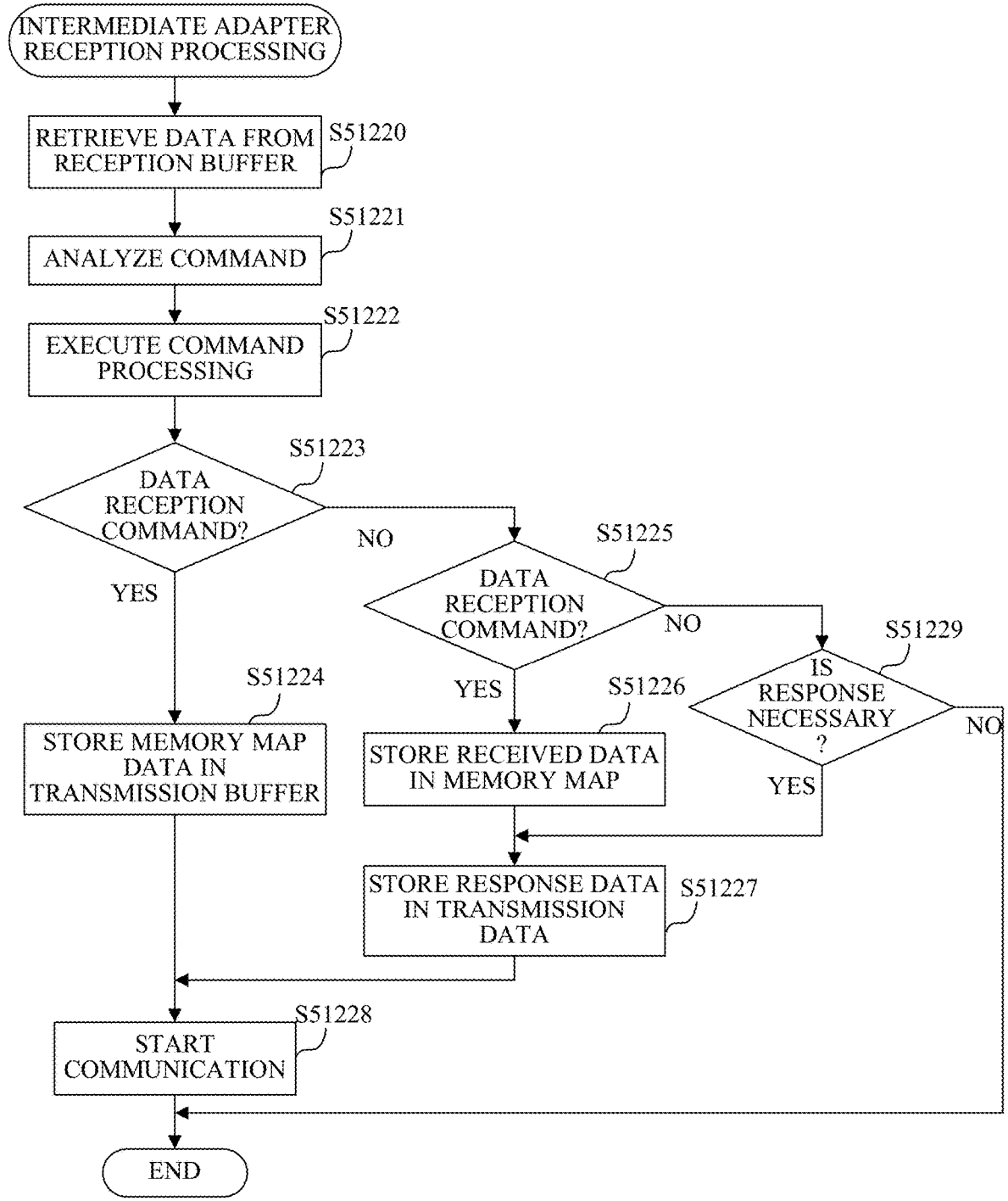
FIG. 28 is a flowchart showing another communication processing procedure using the memory map according to the fifth embodiment.

Referring now to a flowchart in FIG. 28, a description will be given of processing (intermediate adapter communication processing) performed when the intermediate adapter 5300 receives the P2P communication from the camera body 5200. The adapter microcomputer 5302 executes this processing in accordance with a computer program.

In S51220, the adapter microcomputer 5302 retrieves the received data stored in the reception buffer 53034 and stores it in a predetermined memory.

Next, in S51221, the adapter microcomputer 5302 analyzes which command has been received from the reception data stored in a predetermined memory.

Next, in S51222, the adapter microcomputer 5302 performs processing corresponding to the received command, such as storing the received data in the predetermined memory, operating the mount function, and storing information of the mount function in the predetermined memory.

Next, in S51223, the adapter microcomputer 5302 determines whether the received command is a data reception command from the camera microcomputer 5205. If the data reception command has been received, the flow proceeds to S51224; otherwise, the flow proceeds to S51225.

In S51224, the adapter microcomputer 5302 stores data in the transmission buffer 53033 in accordance with the received data reception command. For example, data is retrieved by the number of received data indicated in the data reception command 51100 from the memory map address indicated in the data reception command 51100 among the memory map corresponding to the data reception command 51100. Then, the adapter microcomputer 5302 stores the read data in the transmission buffer 53033 according to the DA format.

On the other hand, in S51225, the adapter microcomputer 5302 determines whether the received command is a data transmission command (51101 or 51102) from the camera microcomputer 5205. If the data transmission command has been received, the flow proceeds to S51226; otherwise, the flow proceeds to S51229.

In S51226, the adapter microcomputer 5302 stores data in the memory map corresponding to the received data transmission command. In other words, the adapter microcomputer 5302 updates existing data with the received data. For example, when the adapter microcomputer 5302 receives the data transmission command 51101, it continuously stores the data received from the camera microcomputer 5205 from the address indicated by the data transmission command 51101 in the memory map. When the adapter microcomputer 5302 receives the data transmission command 51102, it continuously stores the data received from the camera microcomputer 5205 from the start address of the memory map if this is the first time, otherwise from the address next to the address storing the previous data.

Next, in S51227, the adapter microcomputer 5302 stores the data to be responsively transmitted in the transmission buffer 53033 in accordance with the format of DA in the received data transmission command.

On the other hand, in S51229, the adapter microcomputer 5302 determines whether the received data transmission command is a command that requires a response to the camera microcomputer 5205. If so, the flow proceeds to S51227. If not, the flow ends.

The adapter microcomputer 5302 proceeds from S51224 or S51227 to S51228 and transmits the DA stored in the transmission buffer 53033 to the camera microcomputer 5205 via the first adapter communication circuit 5341. Then, the flow ends. The adapter microcomputer 5302 may divide transmission data, store the divided data into transmission buffer 53033, and transmit transmission data a plurality of times by repeating transmission of DA in S51224 or 551227 and 551228.

The above processing enables the intermediate adapter 5300 to communicate with the intermediate adapter 5300 in a continuously communicable range, and thus the communication can be performed at the optimum communication speed according to the communication performance of the intermediate adapter 5300.

This embodiment can provide the "one-to-many" communication between the camera body 5200 and a plurality of accessories including the interchangeable lens 5100 and the intermediate adapter 5300 at a higher speed or at an optimal communication speed with their guaranteed compatibilities even when their release dates are different from each other.

Sixth Embodiment

A sixth embodiment according to the present invention will be described. The sixth embodiment has the same configuration as that of the fifth embodiment, but when the camera and accessories having different release dates are used, this embodiment can perform the communication with an optimal data amount, the guaranteed command compatibilities, and the optimum controls over the accessories. Receiving the memory map size as the memory map information when the camera body starts can provide the communication and control in accordance with the extended state of the memory map in the accessory.

Referring now to FIG. 29, a description will be given of an illustrative extended format of a memory map predefined between the camera body 5200 and the accessory in the second communication mode (P2P communication mode) in the first communication ("one-to-many" communication). The extended format of the memory map is defined for each communication command.

The memory map 51300 has an extended format for the memory map 51000 described in the fifth embodiment, and includes a plurality of data 51302. An address 51301 is assigned to each of the plurality of data 51302. A value 51303 of each data is a fixed value or updated at an arbitrary timing. The address up to the address N−1 among the addresses 51301 is the same address as the memory map 51000, and the subsequent addresses up to the address N+M−1 are extended address areas.

Figure 24:
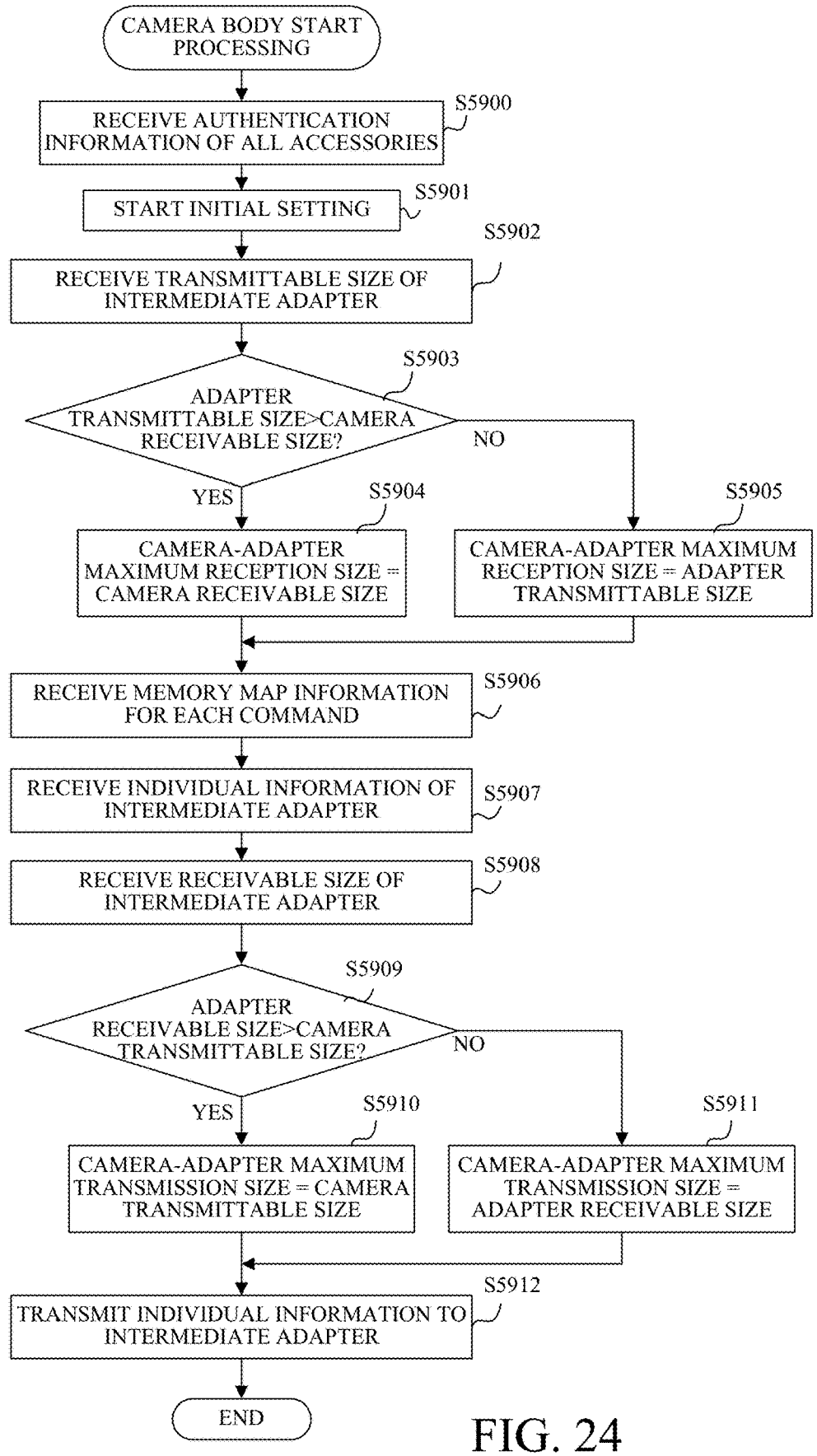
FIG. 24 illustrates a flowchart showing camera start processing procedure according to the fifth embodiment.

In S5906 in the flowchart illustrated in FIG. 24, the adapter microcomputer 5302 corresponding to the memory map 51000 transmits the memory map size N to the camera microcomputer 5205 as memory map information. On the other hand, the adapter microcomputer 5302 corresponding to the memory map 51300 transmits a memory map size N+M−1 to the camera microcomputer 5205 as memory map information.

At this time, as long as the camera microcomputer 5205 corresponds to the memory map 51000, the data is communicated for any of the adapter microcomputers 5302 in the address area up to the address N−1. On the other hand, when the camera microcomputer 5205 corresponds to the memory map 51300, the data communication is performed in the address area up to the address N−1 with the adapter microcomputer 5302 that transmits the memory map size N. The data communication is performed in the address area up to the address N+M−1 with the adapter microcomputer 5302 that transmits the memory map size N+M−1.

This configuration can provide the control within a corresponding data range for each adapter microcomputer 5, and thus the communication and control can be performed according to the extended state of the memory map in the accessory.

What is transmitted as the memory map information to the camera microcomputer 5205 may be information associated with the memory map size, such as a memory map version, instead of the memory map size itself. In other words, it may be information regarding the memory map size.

This embodiment can provide the "one-to-many" communication between the camera body and a plurality of accessories including the interchangeable lens and the intermediate adapter with the guaranteed compatibilities even when these release dates are different from one another, using an optimal data amount and optimal controls over accessories.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2018-123758, filed on Jun. 28, 2018, 2018-165141, filed on Sep. 4, 2018, 2019-110936, filed on Jun. 14, 2019, 2018-143940, filed on Jul. 31, 2018 and 2019-111474, filed on Jun. 14, 2019 each of which is hereby incorporated by reference herein in its entirety.

What is claimed is:

1. An imaging apparatus to which an accessory apparatus is attachable, the imaging apparatus comprising a camera controller configured to communicate with the accessory apparatus,
wherein the camera controller receives first information, and performs communication based on the first information, and
wherein the camera controller requests the accessory apparatus for data having a data size equal to or less than a data size indicated by the first information.

2. The imaging apparatus according to claim 1, wherein the camera controller receives the first information and second information, and performs communication based on the first information and the second information, and
wherein the camera controller transmits data having a data size equal to or less than a data size indicated by the second information.

3. The imaging apparatus according to claim 1, wherein the camera controller transmits individual information of the imaging apparatus based on a setting.

4. The imaging apparatus according to claim 1, wherein the camera controller receives individual information of the accessory apparatus after receiving the first information.

5. The imaging apparatus according to claim 1, wherein the camera controller receives memory map information corresponding to a command after receiving the first information.

6. The imaging apparatus according to claim 5, wherein the camera controller requests the accessory apparatus for data having a data size equal to or less than the data size indicated by the first information while designating data address indicated by the memory map information.

7. The imaging apparatus according to claim 6, wherein the memory map information indicates a value of each data in correspondence with an address of each data.

8. The imaging apparatus according to claim 7, wherein the camera controller receives the memory map information for each of a plurality of communication commands.

9. The imaging apparatus according to claim 8, wherein the value of each data corresponds to a size of each data.

10. The imaging apparatus according to claim 9, wherein the camera controller transmits a first request including a first communication command, first address information indicated by the memory map information corresponding to the first communication command, and first data size information of data indicated by the first address information.

11. The imaging apparatus according to claim 10, wherein the camera controller receives, in response to transmitting the first request, the first communication command and data requested by the first request of which a data size is indicated by the first data size information.

12. The imaging apparatus according to claim 11, wherein the data size indicated by the first data size information is equal to or less than the data size indicated by the first information.

13. The imaging apparatus according to claim 1, wherein a lens apparatus is mounted on the opposite side of the imaging apparatus with respect to the accessory apparatus.

14. The imaging apparatus according to claim 1, further comprising a first communication line and a second communication line which enables communication with the accessory apparatus,
wherein the camera controller is able to perform communication by a first mode and a second mode, wherein in the first mode, a signal level of the first communication line is changed from a first level to a second level after transmission of data via the second communication line, and wherein in the second mode, data is transmitted via the second communication line during maintenance of the signal level of the first communication line at the second level after a change of signal level from the first level to the second level.

15. The imaging apparatus according to claim 1, wherein the accessory apparatus is an adapter unit capable of being attached between the imaging apparatus and a lens unit.

16. The imaging apparatus according to claim 1, wherein the accessory apparatus is a lens unit.

17. An accessory apparatus attachable to an imaging apparatus, the accessory apparatus comprising an accessory controller configured to communicate with the imaging apparatus, wherein the accessory controller transmits first information, and performs communication based on the first information, and wherein the accessory apparatus receives, from the imaging apparatus, a request for data having a data size equal to or less than a data size indicated by the first information.

18. The accessory apparatus according to claim 17, wherein the accessory controller transmits the first information and second information, and performs communication based on the first information and the second information, and wherein the accessory controller receives data having a data size equal to or less than a data size indicated by the second information.

19. The accessory apparatus according to claim 18, wherein the accessory controller receives individual information of the imaging apparatus after transmitting the second information.

20. The accessory apparatus according to claim 17, wherein the accessory controller transmits individual information of the accessory apparatus after transmitting the first information.

21. The accessory apparatus according to claim 17, wherein the accessory controller transmits a memory map information corresponding to a command after transmitting the first information.

22. The accessory apparatus according to claim 21, wherein the accessory controller receives a request for data designated by data address indicated by the memory map information, and transmits corresponding data having a data size equal to or less than the data size indicated by the first information.

23. The accessory apparatus according to claim 22, wherein the memory map information indicates a value of each data in correspondence with an address of each data.

24. The accessory apparatus according to claim 23, wherein the accessory controller transmits the memory map information for each of a plurality of communication command.

25. The accessory apparatus according to claim 24, wherein the value of each data corresponds to a size of each data.

26. The accessory apparatus according to claim 25, wherein the accessory controller receives a first request including a first communication command, first address information indicated by the memory map information corresponding to the first communication command, and first data size information of data indicated by the first address information.

27. The accessory apparatus according to claim 26, wherein the accessory controller transmits, in response to receiving the first request, the first communication command and data requested by the first request of which a data size is indicated by the first data size information.

28. The accessory apparatus according to claim 27, wherein the data size indicated by the first data size information is equal to or less than the data size indicated by the first information.

29. The accessory apparatus according to claim 17, wherein a lens apparatus is mounted on an opposite side to the imaging apparatus with respect to the accessory apparatus.

30. The accessory apparatus according to claim 17, further comprising a first communication line and a second communication line which enables communication with the imaging apparatus, wherein the accessory controller is able to perform communication by a first mode and a second mode, wherein in the first mode, a signal level of the first communication line is changed from a first level to a second level after transmission of data via the second communication line, wherein in the second mode, data is transmitted via the second communication line during maintenance of the signal level of the first communication line at the second level after a change of signal level from the first level to second level.

31. The accessory apparatus according to claim 17, wherein the accessory apparatus is an adapter unit capable of being attached between the imaging apparatus and a lens unit.

32. The accessory apparatus according to claim 17, wherein the accessory apparatus is a lens unit.

33. The accessory apparatus according to claim 17, wherein the accessory controller transmits data requested by the imaging apparatus.

34. A communication control method of an imaging apparatus to which an accessory apparatus is communicatively attachable, the communication control method comprising the steps of:

instructing the imaging apparatus to receive first information;

instructing the imaging apparatus to perform communication based on the first information; and instructing the imaging apparatus to request the accessory apparatus for data having a data size equal to or less than a data size indicated by the first information.

35. A communication control method of an accessory apparatus communicatively attachable to an imaging apparatus, the communication control method comprising the steps of:

instructing the accessory apparatus to transmit first information;

instructing the accessory apparatus to perform communication based on the first information;

instructing the accessory apparatus to receive, from the imaging apparatus, a request for data having a data size equal to or less than a data size indicated by the first information.

36. An imaging apparatus to which an accessory apparatus is attachable, the imaging apparatus comprising a camera controller configured to communicate with the accessory apparatus, wherein the camera controller receives second information, and performs communication based on the second information, and wherein the camera controller transmits data having a data size equal to or less than a data size indicated by the second information.

37. An accessory apparatus attachable to an imaging apparatus, the accessory apparatus comprising an accessory controller configured to communicate with the imaging apparatus, wherein the accessory controller transmits second information, and performs communication based on the second information, and wherein the accessory apparatus receives, from the imaging apparatus, a request for data having a data size equal to or less than a data size indicated by the second information.

38. A communication control method of an imaging apparatus to which an accessory apparatus is communicatively attachable, the communication control method comprising the steps of:

receiving second information and performing communication based on the second information; and transmitting data having a data size equal to or less than a data size indicated by the second information.

39. A communication control method of an accessory apparatus communicatively attachable to an imaging apparatus, the communication control method comprising the steps of:

transmitting second information and performing communication based on the second information; and receiving, from the imaging apparatus, a request for data having a data size equal to or less than a data size indicated by the second information.

* * * * *